(12) United States Patent
Kawaguchi

(10) Patent No.: US 11,513,514 B2
(45) Date of Patent: Nov. 29, 2022

(54) LOCATION PROCESSING DEVICE, FLIGHT VEHICLE, LOCATION PROCESSING SYSTEM, FLIGHT SYSTEM, LOCATION PROCESSING METHOD, FLIGHT CONTROL METHOD, PROGRAM AND RECORDING MEDIUM

(71) Applicant: SZ DJI TECHNOLOGY CO., LTD., Shenzhen (CN)

(72) Inventor: Takayoshi Kawaguchi, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 437 days.

(21) Appl. No.: 16/532,864

(22) Filed: Aug. 6, 2019

(65) Prior Publication Data
US 2019/0361435 A1 Nov. 28, 2019

Related U.S. Application Data

(63) Continuation of application No. PCT/JP2017/005016, filed on Feb. 10, 2017.

(51) Int. Cl.
*B64C 39/02* (2006.01)
*G05D 1/00* (2006.01)
(Continued)

(52) U.S. Cl.
CPC .......... *G05D 1/0027* (2013.01); *B64C 39/024* (2013.01); *B64D 47/08* (2013.01);
(Continued)

(58) Field of Classification Search
CPC .. G05D 1/0027; G05D 1/0016; G05D 1/0038; G05D 1/0044; G05D 1/00;
(Continued)

(56) References Cited

U.S. PATENT DOCUMENTS 6,926,233 B1   8/2005 Corcoran, III
7,894,948 B2 * 2/2011 Stroud .................. G01S 5/0027
                                                              701/120
(Continued)

FOREIGN PATENT DOCUMENTS

CN   102591353 A   7/2012
CN   102847324 A   1/2013
(Continued)

OTHER PUBLICATIONS

The World Intellectual Property Organization (WIPO) International Search Report for PCT/JP2017/005016 dated Apr. 11, 2017 3 pages.
(Continued)

*Primary Examiner* — Yonel Beaulieu
(74) *Attorney, Agent, or Firm* — Anova Law Group, PLLC

(57) ABSTRACT

A location processing device includes a selection member configured to select multiple flight vehicles to form a flight group. The location processing device also includes a determination member configured to determine first relative location information of the multiple flight vehicles of the flight group while instructing an operation device configured to control the multiple flight vehicles to perform operations.

20 Claims, 34 Drawing Sheets

(51) Int. Cl.
  *H04N 5/28*  (2006.01)
  *G01C 21/00* (2006.01)
  *B64D 47/08* (2006.01)
  *H04N 5/247* (2006.01)

(52) U.S. Cl.
  CPC ......... *G01C 21/005* (2013.01); *G05D 1/0016* (2013.01); *G05D 1/0038* (2013.01); *B64C 2201/027* (2013.01); *B64C 2201/146* (2013.01); *H04N 5/247* (2013.01); *H04N 5/28* (2013.01)

(58) Field of Classification Search
  CPC ............ B64C 39/024; B64C 2201/027; B64C 2201/146; B64C 2201/123; B64C 2201/127; B64C 2201/143; B64C 2201/141; B64C 39/02; B64D 47/08; B64D 47/00; G01C 21/005; G01C 21/00; H04N 5/247; H04N 5/28; H04N 5/2257
  See application file for complete search history.

(56) References Cited

U.S. PATENT DOCUMENTS

| | | | |
|---|---|---|---|
| 8,949,090 B2* | 2/2015 | Whitehead | G05D 1/104 703/3 |
| 9,762,795 B2* | 9/2017 | Kweon | H04N 5/23238 |
| 9,997,079 B2* | 6/2018 | Paczan | G08G 5/0008 |
| 10,083,615 B2* | 9/2018 | Chan | G05D 1/042 |
| 10,163,357 B2* | 12/2018 | Venkatraman | G01C 21/20 |
| 10,235,893 B2* | 3/2019 | Umetani | G01S 19/13 |
| 10,437,261 B2* | 10/2019 | Sahasrabudhe | G05D 1/00 |
| 11,034,443 B2* | 6/2021 | Frolov | B64C 37/00 |
| 2005/0230563 A1 | 10/2005 | Corcoran, III | |
| 2006/0055600 A1* | 3/2006 | Reuveni | G08G 5/0052 342/455 |
| 2006/0167596 A1* | 7/2006 | Bodin | G05D 1/0027 701/3 |
| 2009/0118875 A1* | 5/2009 | Stroud | G05D 1/104 701/1 |
| 2010/0114633 A1* | 5/2010 | Sislak | G08G 5/045 701/120 |
| 2010/0168937 A1* | 7/2010 | Soijer | G08G 5/0052 701/11 |
| 2016/0282875 A1 | 9/2016 | Nagamine et al. | |
| 2017/0235316 A1* | 8/2017 | Shattil | H04B 7/024 701/3 |
| 2018/0050450 A1* | 2/2018 | Parrott | B25J 9/0084 |
| 2018/0074520 A1* | 3/2018 | Liu | G08G 5/0052 |
| 2018/0231972 A1* | 8/2018 | Woon | G05D 1/0808 |
| 2021/0197968 A1* | 7/2021 | Kwak | B64C 39/024 |

FOREIGN PATENT DOCUMENTS

| | | |
|---|---|---|
| CN | 103336660 A | 10/2013 |
| CN | 104062980 A | 9/2014 |
| CN | 105425817 A | 3/2016 |
| CN | 105511494 A | 4/2016 |
| CN | 105518415 A | 4/2016 |
| CN | 105518487 A | 4/2016 |
| CN | 105717933 A | 6/2016 |
| CN | 105955308 A | 9/2016 |
| CN | 106227224 A | 12/2016 |
| CN | 106292294 A | 1/2017 |
| JP | 2010188893 A | 9/2010 |
| JP | 2015191254 A | 11/2015 |
| JP | 2016206443 A | 12/2016 |
| RU | 2585204 C1 | 5/2016 |

OTHER PUBLICATIONS

Fan Ding et al, "Study on UAV active cooperative formation flight command and control," China Academic Journal Electronic Publishing House, Nov. 17, 2009.

Ye Hong, et al., "Formation Method and Flight Test of Multiple UAVs Based on Leader-Follower Pattern", Robot, vol. 32, No. 4, Jul. 2010, p. 505-509.

Sen Zhang, et al., "Form Modeling of Multi-fighters in Formation and Its Visual Simulation", Journal of System Simulation, vol. 22, No. 11, Nov. 2010, p. 2667-2671.

* cited by examiner

LOCATION PROCESSING DEVICE, FLIGHT VEHICLE, LOCATION PROCESSING SYSTEM, FLIGHT SYSTEM, LOCATION PROCESSING METHOD, FLIGHT CONTROL METHOD, PROGRAM AND RECORDING MEDIUM

CROSS-REFERENCE TO RELATED APPLICATION

This application is a continuation application of International Application No. PCT/JP2017/005016 filed on Feb. 10, 2017, the entire content of which is incorporated herein by reference.

TECHNICAL FIELD

The present disclosure relates to a location processing device, a location processing system, a location processing method a program, and a recording medium that are configured for processing location information of multiple flight vehicles. The present disclosure also relates to a flight vehicle, a flight system, a flight control method, a program, and a recording medium that are configured for flight based on processed location information.

BACKGROUND

In recent years, there are known scenarios in which multiple unmanned aerial vehicles ("UAVs") fly in collaboration in a region. In order to enable the multiple UAVs to fly in collaboration, a predetermined flight program may be executed, for example, to enable the multiple UAVs to fly in collaboration (refer to Patent Document 1). In Patent Document 1, multiple flight vehicles such as multiple UAVs, move to specified locations in the air and hover and then flash, based on instructions received from a ground station. As such, an observer may simulate observing the constellation.

PRIOR TECHNOLOGY DOCUMENT

Patent Document

Patent Document 1: Japanese Patent Application Publication No. 2016-206443.

CONTENT OF THE PRESENT DISCLOSURE

Technical Issues Addressed by the Present Disclosure

The flight vehicle disclosed in Patent Document 1 can fly along a predetermined flight path or flight locations, but if the flight path or the flight locations are not pre-set, it may be difficult for the flight vehicle to fly. As such, the system disclosed in Patent Document 1 cannot specify a flight path in real time, and the flexibility if relatively low when a UAV is in flight.

In addition, if the flight of the UAV is controlled by an operation device (e.g., a transmitter), the intention of the operator may be reflected in real time to specify the flight path of the UAV or the flight location. However, multiple operation devices may be needed fort operating multiple UAVs, making it difficult to operation multiple UAVs in collaboration.

SUMMARY

Technical Solutions for Addressing the Issues

In accordance with an aspect of the present disclosure, there is provided a location processing device. The location processing device includes a selection member configured to select multiple flight vehicles to form a flight group. The location processing device also includes a determination member configured to determine first relative location information of the multiple flight vehicles of the flight group while instructing an operation device configured to control the multiple flight vehicles to perform operations.

In accordance with another aspect of the present disclosure, there is provided a location processing method. The location processing method includes selecting multiple flight vehicles and forming a flight group including the selected multiple flight vehicles. The location processing method also includes determining first relative location information of the multiple flight vehicles of the flight group while instructing an operation device configured to control the multiple flight vehicles to perform operations.

In addition, the above summary has not listed all of the features of the present disclosure. Also, the sub-combinations of the listed combinations of features may also constitute an aspect of the present disclosure.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
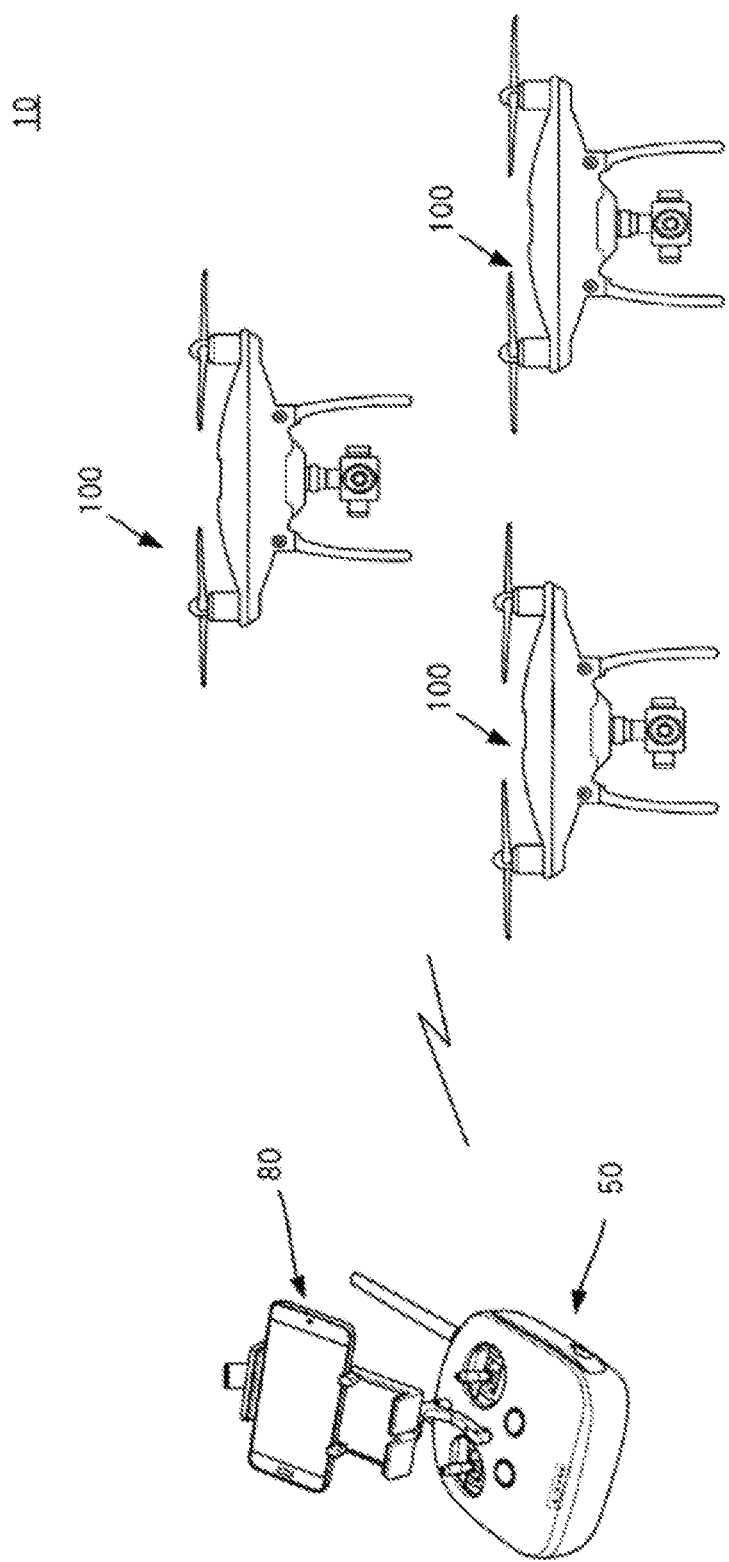
FIG. 1 is a schematic illustration of a configuration of a flight system, according to an example embodiment.

Next, the present disclosure will be explained through various embodiments. However, the following embodiments do not limit the scope of the claims. Not all combinations of features described in the embodiments are necessary for the technical solutions of the present disclosure.

The claims, specification, drawings accompanying the specification, and the abstract included in the specification contain copyright protected items. The copyright owner has no objection to the facsimile reproduction by anyone of the patent document or the patent disclosure, as it appears in the Patent and Trademark Office patent file or records, but otherwise reserves all copyright rights whatsoever.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "communicatively couple(d)" or "communicatively connect(ed)" indicates that related items are coupled or connected through a communication channel, such as a wired or wireless communication channel. The term "unit" or "module" may encompass a hardware component, a software component, or a combination thereof. For example, a "unit" or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

In the following embodiments, the UAV is used as an example of the flight vehicle. A UAV may include an aircraft movable in the air. In the accompanying drawings, the unmanned aerial vehicle is labeled by "UAV." The flight control method defines operations of the flight vehicle and the flight system. In addition, a program may be recorded on a recording medium (e.g., various programs executed by the UAV).

In the following embodiments, a flight system is used as an example of a location processing system. A portable terminal is used as an example of a location processing device. The portable terminal may include a smart phone or a tablet terminal. The location processing method may define the operations of the location processing device and the location processing system. In addition, a program may be recorded on a recording medium (e.g., various programs executed by the portable terminal).

FIG. 1 is a schematic illustration of a configuration of a flight system 10. The flight system 10 may include a UAV 100, a transmitter 50, and a portable terminal 80. The UAV 100, the transmitter 50, and the portable terminal 80 may communicate with one another through a wired or wireless communication (e.g., wireless location area network ("LAN")).

Figure 2:
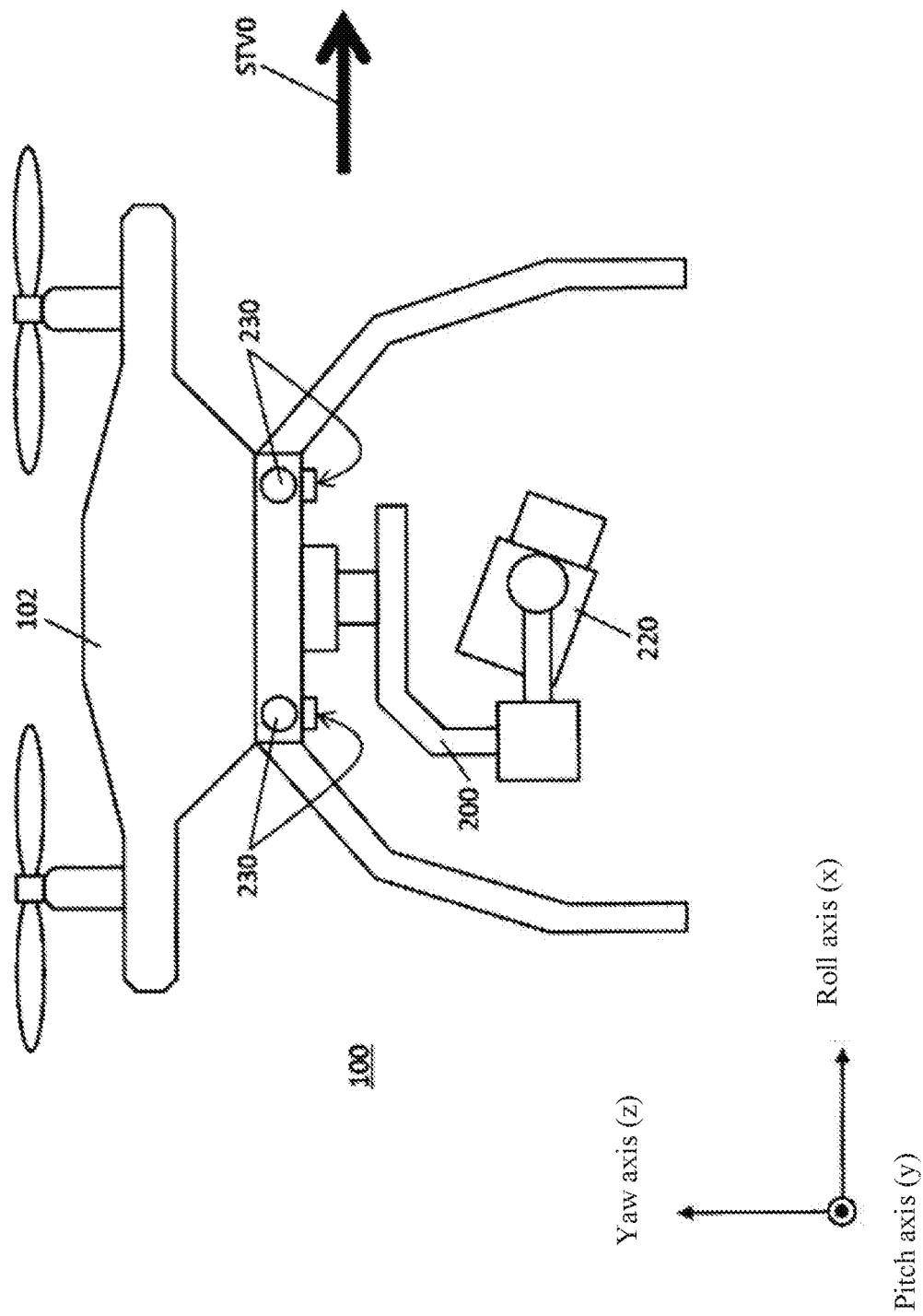
FIG. 2 is a schematic illustration of an appearance of a UAV, according to an example embodiment.
Figure 3:
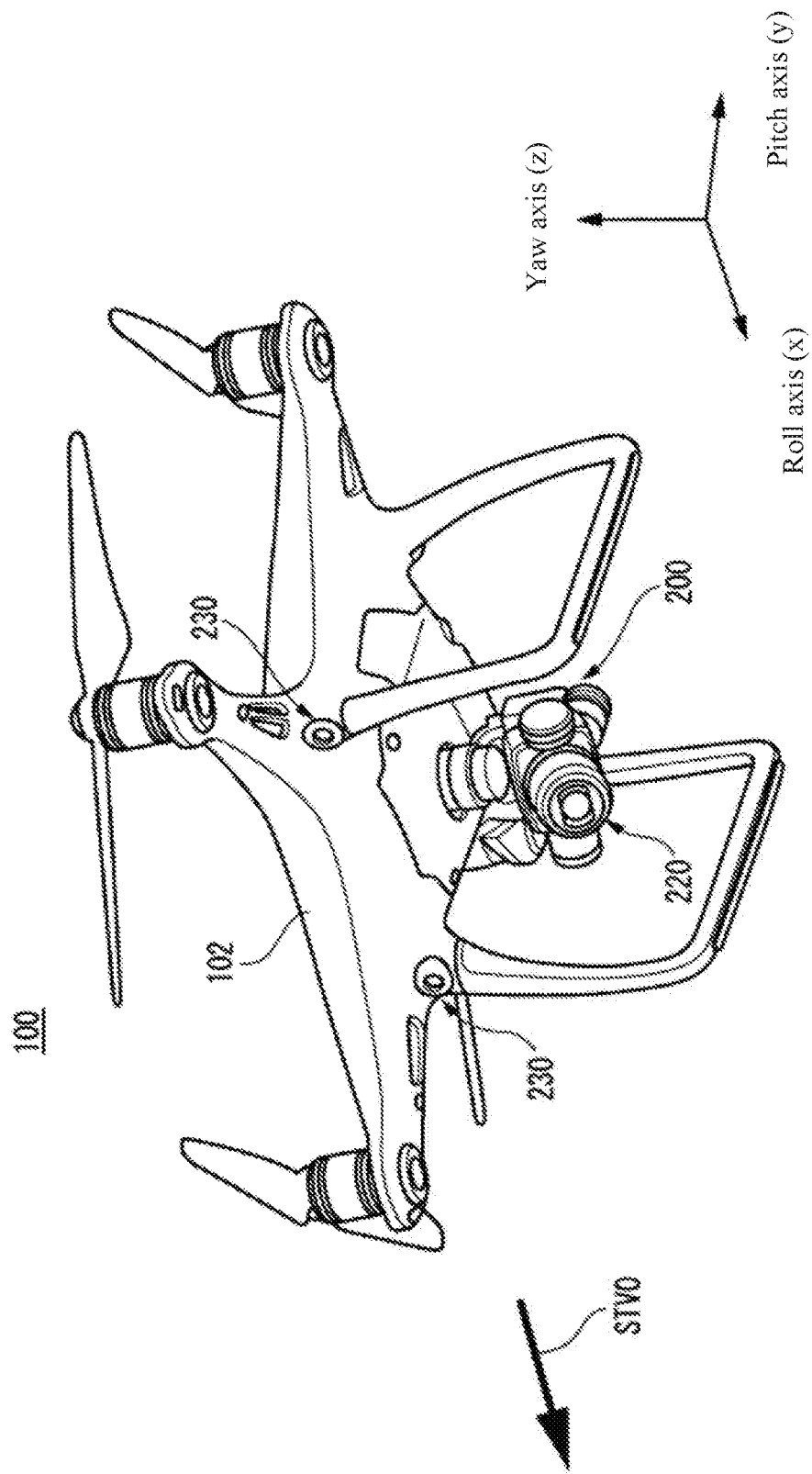
FIG. 3 is a schematic illustration of a detailed appearance of the UAV, according to an example embodiment.

Next, the example configuration of the UAV 100 will be described. FIG. 2 is a schematic illustration of an appearance of the UAV 100. FIG. 3 is a schematic illustration of a detailed appearance of the UAV 100. FIG. 2 represents a side view of the UAV 100 when the UAV 100 flies in a moving direction STV0, FIG. 3 represents a perspective view of the UAV 100 when the UAV 100 flies in the moving direction STV0.

As shown in FIG. 2 and FIG. 3, a roll axis (referencing to an X axis) may be defined as a direction parallel with the ground and along the moving direction STV0. A pitch axis (referencing to a Y axis) may be defined as a direction parallel with the ground and perpendicular with the roll axis. A yaw axis (referencing to a Z axis) may be defined as a direction perpendicular with the ground and the roll axis and the pitch axis.

The configuration of the UAV 100 may include a UAV body 102, a universal joint 200, an imaging device 220, and multiple imaging devices 230. The imaging devices 220, 230 are examples of an imaging member.

The UAV body 102 may include multiple rotors (e.g., propellers). The UAV body 102 may drive the UAV 100 to fly by controlling the rotation of the multiple rotors. For example, the UAV body 102 may use four rotors to drive the flight of the UAV 100. The number of the rotors is not limited to four. In addition, in some embodiments, the UAV 100 may be a fixed-wing airplane that may not include any rotor.

The imaging device 220 may be a camera configured to capture an image of an object to be imaged that is in an expected imaging range (e.g., the camera may be used for aerial photographing of a sky above an object, scenes such as mountains, rivers, buildings on the ground).

The multiple imaging devices 230 may be cameras used for sensing purposes that capture images of the surrounding environment of the UAV 100 for controlling the flight of the UAV 100. Two imaging devices 230 may be provided at the head (e.g., the front side) of the UAV 100. Further, another two imaging devices 230 may be provided at the bottom side of the UAV 100. The two imaging devices 230 at the front side may form a pair to function as a stereo camera. The two imaging devices 230 at the bottom side may form a pair to function as a stereo camera. Three-dimensional spatial data may be generated for the surrounding environment of the UAV 100 based on images captured by multiple imaging devices 230. In some embodiments, the number of imaging devices 230 included in the UAV 100 is not limited to four. The UAV 100 may include at least one imaging device 230. In some embodiments, the UAV 100 may include at least one imaging device 230 at the head, the tail, a side, the bottom side, and the top side, respectively. The field of view set in the imaging device 230 may be greater than the field of view set in the imaging device 220. The imaging device 230 may include a single focus lens or a fisheye lens.

Figure 4:
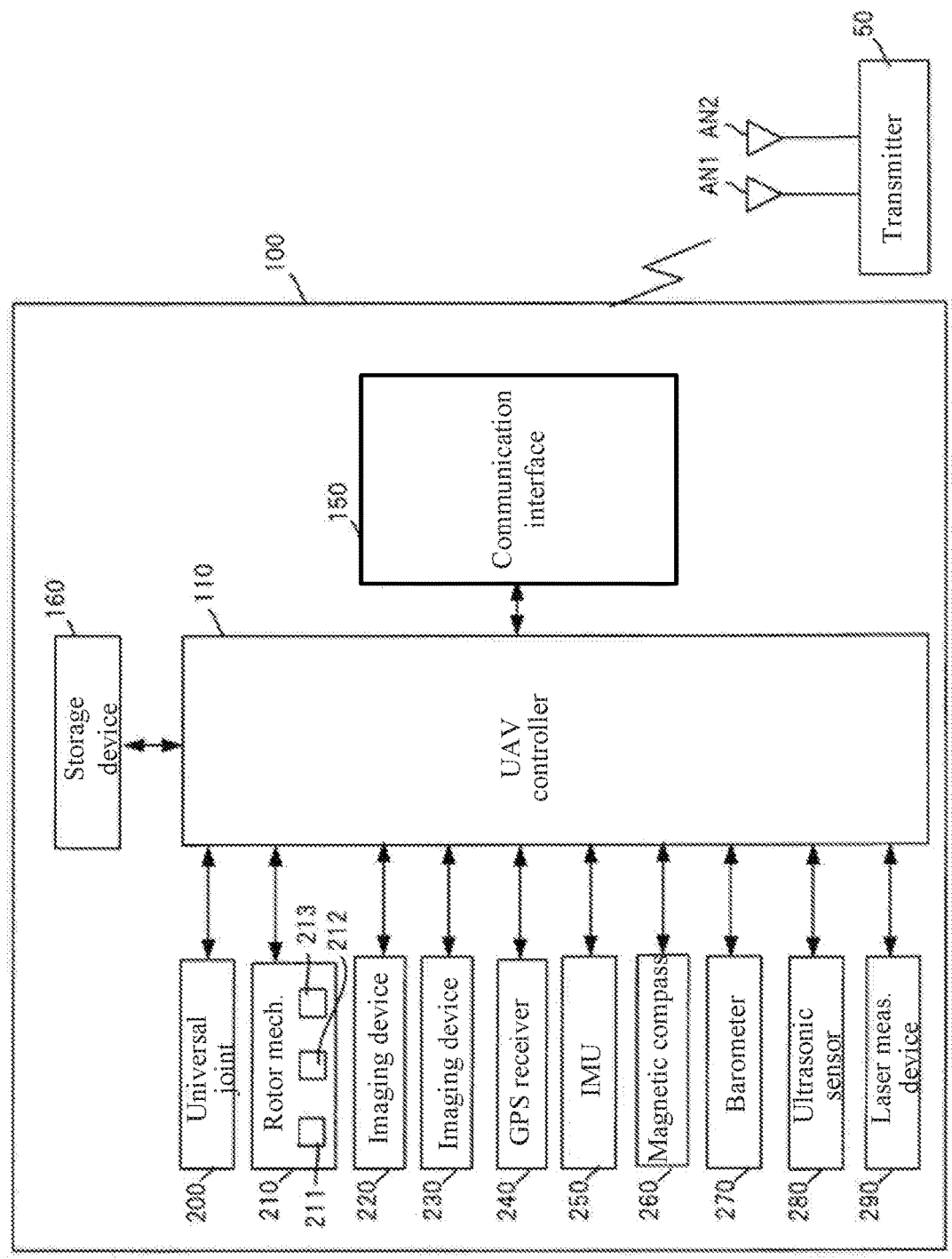
FIG. 4 is a schematic diagram of a hardware configuration of the UAV, according to an example embodiment.

FIG. 4 is a schematic diagram of a hardware configuration of the UAV 100. The configuration of the UAV 100 may include a UAV controller 110, a communication interface 150, a storage device 160, a universal joint 200, a rotor mechanism 210, an imaging device 220, an imaging device 230, a GPS receiver 240, an Inertial Measurement Unit ("IMU") 250, a magnetic compass 260, a barometer 270, an ultrasonic sensor 280, and a laser measurement device 290. The communication interface 150 may be an example of a communication member. The ultrasonic sensor 280 and the laser measurement device 290 may be examples of a distance measurement sensor.

The UAV controller 110 may include a Central Processing Unit ("CPU"), a Micro Processing Unit ("MPU"), or a Digital Signal Processor ("DSP"). The UAV controller 110 may be configured to execute signal processing for controlling the overall actions of various members of the UAV 100, to execute data input and output processing with respect to other members, and to execute data computation processing and data storage processing.

In some embodiments, the UAV controller 110 may control the flight of the UAV 100 based on a program stored in the storage device 160. In some embodiments, the UAV controller 110 may control the flight of the UAV 100 based on instructions received from the remote transmitter 50 through the communication interface 150. In some embodiments, the storage device 160 may be detachable from the UAV 100.

In some embodiments, the UAV controller 110 may determine a surrounding environment of the UAV 100 based on analysis of multiple images captured by multiple imaging devices 230. In some embodiments, the UAV controller 110 may control the flight, e.g., avoiding obstacles, based on the surrounding environment if the UAV 100.

In some embodiments, the UAV controller 110 may obtain information regarding the current date and time. In some embodiments, the UAV controller 110 may obtain the date and time information representing the current date and time from the GPS receiver 240. In some embodiments, the UAV controller 110 may obtain the date and time information representing the current date and time from a timer (not shown) carried by the UAV 100.

In some embodiments, the UAV controller 110 may obtain location information indicating a location of the UAV 100. For example, the UAV controller 110 may obtain location information indicating the latitude, longitude, and altitude of the UAV 100 from the GPS receiver 240. The UAV controller 110 may obtain latitude and longitude information indicating the latitude and longitude of the UAV 100 from the GPS receiver 240, and the altitude information indicating the altitude of the UAV 100 from the barometer 270, as the location information. In some embodiments, the UAV controller 110 may obtain a distance between a transmitting point of an ultrasonic wave generated by the ultrasonic sensor 280 and a reflecting point of the ultrasonic wave, and may use the distance as the altitude information.

In some embodiments, the UAV controller 110 may obtain facing direction information from the magnetic compass 260 indicating the facing direction of the UAV 100. The facing direction information may indicate, e.g., an orientation of the facing direction of the head of the UAV 100.

In some embodiments, the UAV controller 110 obtain location information indicating a location where the UAV 100 should exist when the imaging device 220 captures images in a desired imaging range. In some embodiments, the UAV controller 110 may obtain location information indicating a location where the UAV 100 should exist from the storage device 160. In some embodiments, the UAV controller 110 may obtain location information indicating a location where the UAV 100 should exist from the transmitter 50 through the communication interface 150. To photograph or image in the desired imaging range, the UAV controller 110 may determine a location where the UAV 100 can exist by referencing to a three-dimensional map database. In addition, the UAV controller 110 may obtain location information of the location that is a location where the UAV 100 should exist.

In some embodiments, the UAV controller 110 may obtain imaging information indicating respective imaging ranges of the imaging device 220 and the imaging device 230. In some embodiments, the UAV controller 110 may obtain field of view ("FOV") information indicating the FOVs of the imaging device 220 and the imaging device 230 from the imaging device 220 and the imaging device 230, respectively, and may use the FOV information as a parameter for determining the imaging range. In some embodiments, the UAV controller 110 may obtain information indicating the imaging directions of the imaging device 220 and the imaging device 230, and may use the information as a parameter for determining the imaging ranges. In some embodiments, the UAV controller 10 may obtain attitude information indicating the attitude status of the imaging device 220 from the universal joint 200, and may use the attitude information as information that indicates the imaging direction of the imaging device 220. In some embodiments, the UAV controller 110 may obtain information of the facing direction of the UAV 100. In some embodiments, the information indicating the attitude status of the imaging device 220 may indicate an angle the universal joint 200 rotates from reference rotation angles of the pitch axis and the yaw axis. In some embodiments, the UAV controller 110 may obtain location information indicating a location where the UAV 100 is located, and may use the location information as a parameter for determining an imaging range. In some embodiments, the UAV controller 110 may specify an imaging range indicating a geographical range for imaging by the imaging device 220 based on the field of views and the imaging directions of the imaging device 220 and the imaging device 230, and the location where the UAV 100 is located, and may generate imaging information indicating the imaging range, thereby obtaining the imaging information.

In some embodiments, the UAV controller 110 may obtain imaging information indicating the imaging range where the imaging device 220 should be imaging. In some embodiments, the UAV controller 110 may obtain the imaging information indicating the imaging range where the imaging device 220 should be imaging from the storage device 160. In some embodiments, the UAV controller 110 may obtain the imaging information indicating the imaging range where the imaging device 220 should be imaging from the transmitter 50 through the communication interface 150.

In some embodiments, the UAV controller 110 may obtain stereo information (e.g., three-dimensional information) indicating the stereo shape (e.g., three-dimensional shape) of an object existing in the surrounding of the UAV 100. The object may be a part of a scene, such as a building, a road, a vehicle, a tree, etc. The stereo information may include, for example, three-dimensional spatial data. The UAV controller 110 may generate, based on each image obtained by the multiple imaging devices 230, the stereo information indicating the stereo shape of the object existing in the surrounding of the UAV 100. In some embodiments, the UAV controller 110 may obtain the stereo information related to the stereo shape of the object existing in the surrounding of the UAV 100 by referencing to a three-dimensional map database managed by a network server.

In some embodiments, the UAV controller 110 may obtain image data captured by the imaging device 220 and the imaging device 230.

In some embodiments, the UAV controller 110 may control the universal joint 200, the rotor mechanism 210, the imaging device 220, and the imaging device 230. The UAV controller 110 may control the imaging range of the imaging device 220 through changing the imaging direction or field of view of the imaging device 220. In some embodiments, the UAV controller 110 may control the imaging range of the imaging device 220 supported by the universal joint 200 by controlling a rotation mechanism of the universal joint 200.

In the present disclosure, the imaging range refers to a geographical range imaged by the imaging device 220 or the imaging device 230. The imaging range may be defined by the latitude, the longitude, and the altitude. In some embodiments, the imaging range may be a range of three-dimensional spatial data defined by the latitude, the longitude, and the altitude. In some embodiments, the imaging range may be specified based on the field of view and the imaging direction of the imaging device 220 or the imaging device 230, and the location of the UAV 100. The imaging direction of the imaging device 220 and the imaging device 230 may be defined by the orientation faced by the front side of the imaging device 220 and the imaging device 230 that is provided with an imaging lens, and the pitch angle. The imaging direction of the imaging device 220 may be a direction specified by an orientation of the head of the UAV 100 and the attitude status of the imaging device 220 relative to the universal joint 200. The imaging direction of the imaging device 230 may be a direction specified by the orientation of the head of the UAV 100 and the location where the imaging device 230 is disposed.

In some embodiments, the UAV controller 110 may control the flight of the UAV 100 through controlling the rotor mechanism 210. That is, the UAV controller 110 may control the location of the UAV 100 that includes the latitude, the longitude, and the altitude through controlling the rotor mechanism 210. In some embodiments, the UAV controller 110 may control the imaging range of the imaging device 220 and the imaging device 230 through controlling the flight of the UAV 100. In some embodiments, the UAV controller 110 may control the field of view of the imaging device 220 through controlling a zoom lens included in the imaging device 220. In some embodiments, using the digital zoom function of the imaging device 220, the UAV controller 110 may control the field of view of the imaging device through digital zooming.

In some embodiments, the imaging device 220 may be fixedly mounted to the UAV 100. Under the condition that the imaging device 220 is not moved, the UAV controller 110 may enable the imaging device 220 to photograph an expected imaging range in an expected environment by making the UAV 100 to move toward a specific location at a specific date and time. Alternatively, when the imaging device 220 does not include the zoom function, and the field of view of the imaging device 220 cannot be changed, the UAV controller 110 may cause the UAV 100 to move toward a specific location at a specific date and time, thereby enabling the imaging device 220 to photograph the expected imaging range in the expected environment.

In some embodiments, the UAV controller 110 may obtain, through the communication interface 150, relative location information of multiple UAVs 100 that belong to a same flight group and that fly in collaboration. The UAV controller 110 may set the relative location information by storing the relative location information in the storage device 160. As such, the UAV controller 110 may be an example of a setting member. By setting the relative location information, flight control may be performed by combining the relative location information (e.g., by maintaining a relative location relationship).

In some embodiments, the communication interface 150 may communicate with the transmitter 50. The communication interface 150 may receive, from the remote transmitter 50, various instructions and information for the UAV controller 110.

In some embodiments, the storage device 160 may storage one or more programs executable by the UAV controller 110 for controlling the universal joint 200, the rotor mechanism 210, the imaging device 220, the imaging device 230, the GPS receiver 240, the IMU 250, the magnetic compass 260, the barometer 270, the ultrasonic sensor 280, and the laser measurement device 290. The storage device 160 may be a computer-readable recording medium, which may include at least one of the following flash memories: a Static Random Access Memory ("SRAM"), a Dynamic Random Access Memory ("DRAM"), an Erasable Programmable Read Only Memory ("EPROM"), an Electrically Erasable Programmable Read-Only Memory ("EEPROM"), and a USB storage device. The storage device 160 may be disposed inside the UAV body 102. The storage device 160 may be detachable from the UAV body 102.

In some embodiments, the universal joint 200 may rotate around at least one axis and may rotatably support the imaging device 220. In some embodiments, the universal joint 200 may rotatably support the imaging device 220 using the yaw axis, the pitch axis, and the roll axis as centers. In some embodiments, the universal joint 200 may cause the imaging device 220 to rotate based on at least one of the yaw axis, the pitch axis, and the roll axis as a center, to change the imaging direction of the imaging device 220.

In some embodiments, the rotor mechanism 210 may include: multiple rotors 211, multiple driving electric motors 212 for driving the multiple rotors to rotate, and a current sensor 213 configured to measure the current value (actual measurement value) of a driving current for driving the driving electric motors 212. The driving current may be supplied to the driving electric current 212.

In some embodiments, the imaging device 220 may capture images of an object to be imaged within an expected imaging range and generate data for the captured images. The image data obtained through imaging by the imaging device 220 may be stored in a storage device of the imaging device 220 or the storage device 160.

In some embodiments, the imaging device may capture images of the surrounding of the UAV 100 and may generate data of the captured images. The image data of the imaging device 230 may be stored in the storage device 160.

In some embodiments, the GPS receiver 240 may receive multiple signals transmitted by multiple navigation satellites (e.g., GPS satellites), which indicate the time and location (e.g., coordinates) of each GPS satellite. The GPS receiver 240 may calculate the location of the GPS receiver 240 (i.e., the location of the UAV 100) based on the multiple received signals. The GPS receiver 240 may output location information of the UAV 100 to the UAV controller 110. In addition, the UAV 110 may replace the GPS receiver 240 to calculate the location information of the GPS receiver 240. The information indicating the time and location of each GPS satellite included in the multiple signals received by the GPS receiver 240 may be input into the UAV controller 110.

In some embodiments, the IMU 250 may detect the attitude of the UAV 100, and may output the detection result to the UAV controller 110. The IMU 250 may detect the accelerations in three axes directions: front-rear, left-right, and up-down, and the angular velocities in three axes directions: the pitch axis, the roll axis, and the yaw axis, as the attitude of the UAV 100.

In some embodiments, the magnetic compass 260 may detect an orientation of the head of the UAV 100, and may output the detection result to the UAV controller 110.

In some embodiments, the barometer 270 may detect the flight height of the UAV 100, and may output the detection result to the UAV controller 110.

In some embodiments, the ultrasonic sensor 280 may transmit an ultrasound wave, detect the ultrasound wave reflected by the ground and object, and may output the detection result to the UAV controller 110. The detection result may indicate the distance from the UAV 100 to the ground, i.e., the height. The detection result may indicate the distance from the UAV 100 to the object.

In some embodiments, the laser measurement device 290 may emit a laser beam to an object, and receive a reflected laser beam from the object. The laser measurement device 290 may measure the distance between the UAV 100 and the object based on the reflected laser beam. An example of the laser based distance measurement method includes a flight of time method.

Figure 5:
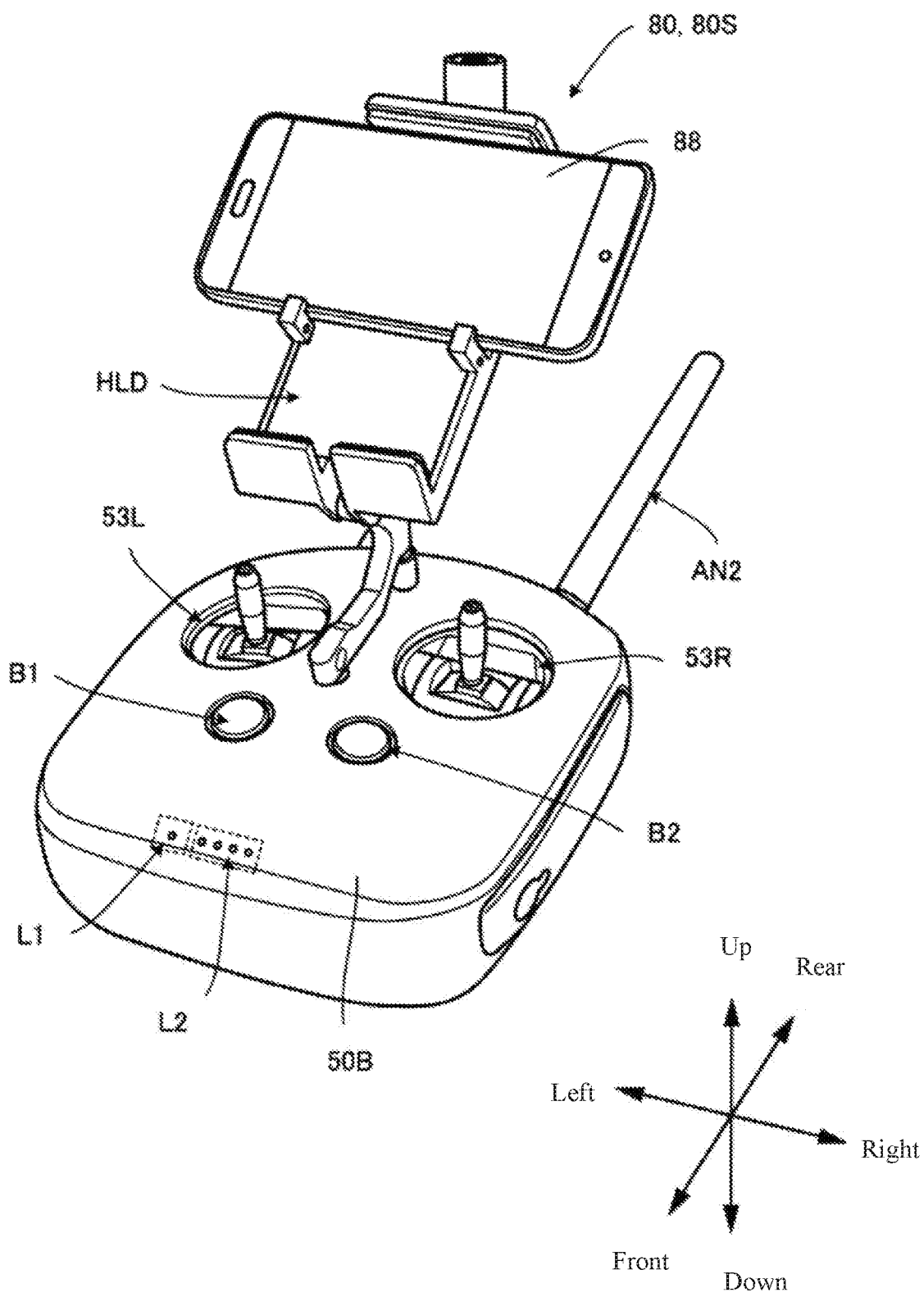
FIG. 5 is a schematic illustration of a perspective view of appearances of a transmitter and a portable terminal (smart phone), according to an example embodiment.

Next, the configuration of the transmitter 50 and the portable terminal 80 will be described. FIG. 5 is a schematic perspective view of the appearance of the portable terminal 80 mounted with the transmitter 50. FIG. 5 shows a smart phone 80S as an example of the portable terminal 80. The up, down, front, rear, left, and right directions relative to the transmitter 50 respectively follow the directions of the arrows shown in FIG. 5. The transmitter 50 may be used by a person using the transmitter 50 (referred to herein as an "operator") using both hands to hold the transmitter 50.

In some embodiments, the transmitter 50 may have a housing 50B made of a resin, and may have a substantial square bottom surface. The transmitter 50 may have a substantially rectangular shape having a height smaller than a side of the button surface (i.e., a substantial box shape). A left control joystick 53L and a right control joystick 53R may be disposed protruding at a substantial center portion of the housing surface of the transmitter 50.

In some embodiments, the left control joystick 53L and the right control joystick 53R may be used respectively for remote control (e.g., the front-rear movement, left-right movement, up-down movement, and change of facing direction of the UAV 100). The left control joystick 53L and the right control joystick 53R may be used by the operator during operations that control the movement of the UAV 100. FIG. 5 shows the positions of the left control joystick 53L and the right control joystick 53R at an initial state when they are not under an external force exerted by the operator's hands. The left control joystick 53L and the right control joystick 53R may automatically restore to predetermined positions (e.g., the initial positions shown in FIG. 5) after the external force exerted by the operator has been released.

In some embodiments, a power button B1 of the transmitter 50 may be disposed at the near front side (i.e., the operator side) of the left control joystick 53L. When the operator presses the power button B1 for one time, the remaining capacity of a battery (not shown) disposed inside the transmitter 50 may be displayed at a battery remaining capacity display L2. When the operator presses the power button B1 again, the power source of the transmitter 50 may be connected to provide power to various parts (referring to FIG. 7) of the transmitter so that they can be used.

In some embodiments, a Return to Home ("RTH") button B2 may be disposed at the near front side (i.e., the operator side) of the right control joystick 53R. When the operator presses the RTH button B2, the transmitter may transmit a signal to the UAV 100 that is configured to cause the UAV 100 to automatically restore or return to a predetermined location. As such, the transmitter 50 may cause the UAV 100 to automatically return to the predetermined location (e.g., a takeoff location stored in the UAV 100). For example, under the condition when the operator cannot view the body of the UAV 100 during outdoor aerial photographing using the UAV 100, or under the condition when the transmitter 50 cannot be operated due to strong electromagnetic wave interference or unexpected malfunction, the user may use the RTH button B2.

In some embodiments, a remote status display L1 and the battery remaining capacity display L2 may be disposed at the near front side (i.e., the operator side) of the power button B1 and the RTH button B2. The remote status display L1 may be formed by a Light Emission Diode ("LED"), and may display a wireless connection status between the transmitter 50 and the UAV 100. The battery remaining capacity display L2 may be formed by an LED, and may display the remaining capacity of the battery (not shown) disposed inside the transmitter 50.

In some embodiments, at the rear side of the left control joystick 53L and the right control joystick 54R, and two antennas AN1 and AN2 may be disposed protruding from the rear side surface of the housing 50B of the transmitter 50. Based on the operations of the operator on the left control joystick 54L and the right control joystick 54R, the antennas AN1 and AN2 may transmit a signal (i.e., a signal for controlling movement of the UAV 100) generated by a transmitter controller 61 to the UAV 100. The signal may be one of operation input signals input by the transmitter 50. The antennas AN1 and AN2 may cover a transmitting and receiving range of, for example, 2 km. In addition, under the condition of the UAV 100 transmitting images captured by the imaging devices 220, 230 included in the UAV 100 that is wirelessly connected with the transmitter 50, or under the condition of the UAV 100 transmitting various data obtained by the UAV 100, the antennas AN1 and AN2 may receive such images or various data.

In FIG. 5, although it is shown that the transmitter 50 does not include a display, it may nonetheless include a display.

In some embodiments, the portable terminal 80 may be mounted to a supporting frame HLD. The supporting frame HLD may be jointly mounted to the transmitter 50. As such, the portable terminal 80 may be mounted to the transmitter 50 through the supporting frame HLD. The portable terminal 80 and the transmitter 50 may be connected through a cable (e.g., a USB cable). In some embodiments, the portable terminal 80 may not be mounted on the transmitter 50. Instead, the portable terminal 80 and the transmitter 50 may be separately and independently disposed.

Figure 6:
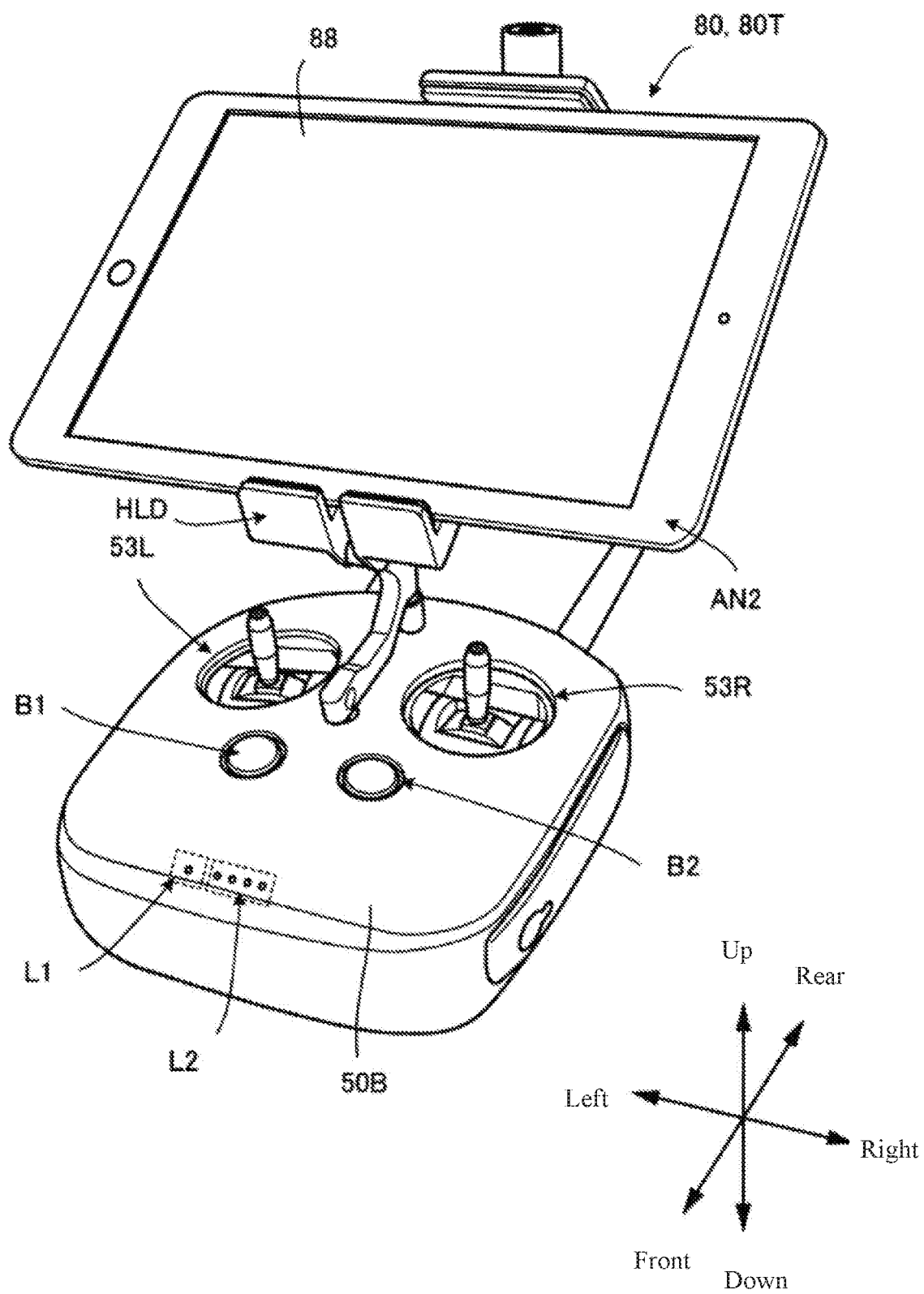
FIG. 6 is a schematic illustration of a perspective view of appearances of a transmitter and a portable terminal (tablet terminal), according to an example embodiment.

FIG. 6 is a schematic perspective view of the appearance of the transmitter 50 and the portable terminal 80. FIG. 6 shows a tablet 80T as an example of the portable terminal 80.

Figure 7:
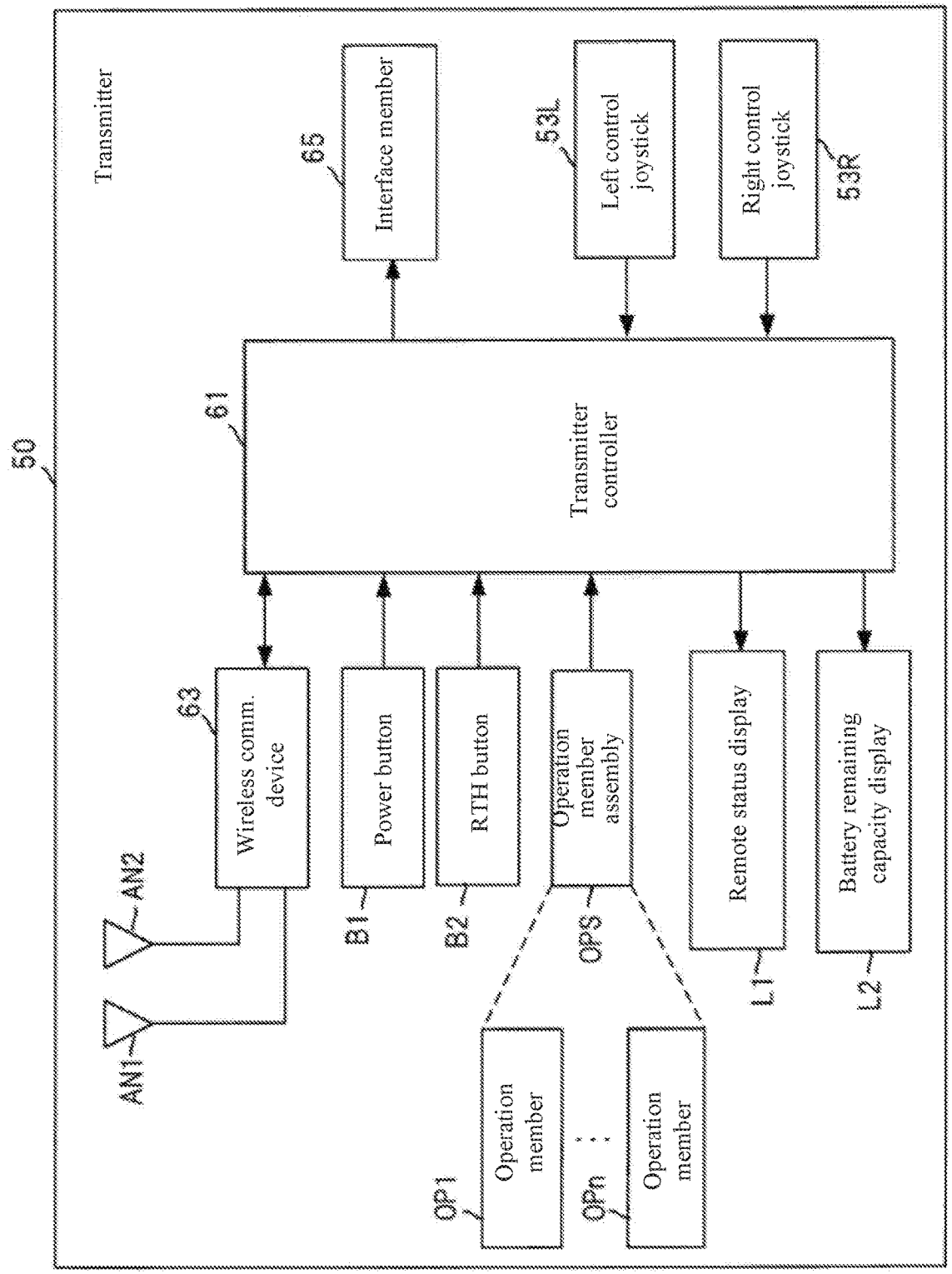
FIG. 7 is a schematic diagram of a hardware configuration of the transmitter, according to an example embodiment.

FIG. 7 is a schematic diagram of a hardware configuration of the transmitter 50. The configuration of the transmitter 50 may include: the left control joystick 54L, the right control joystick 54R, a transmitter controller 61, a wireless communication device 63, an interface member 65, the power button B1, the RTH button B2, an operation member assembly OPS, the remote status display L1, the battery remaining capacity display L2, and a display DP. The transmitter 50 is an example of an operation device configured to instruct the control of the UAV 100.

In some embodiments, the left control joystick 53L may be operated by a left hand of the operator to remotely control the movement of the UAV 100. The right control joystick 53R may be operated by a right hand of the operator to remotely control the movement of the UAV 100. The movement of the UAV 100 may include, for example, at least one of a forward direction movement, a backward direction movement, a left direction movement, a right direction movement, an ascending direction movement, a descending direction movement, a movement of rotating the UAV 100 to the left direction, or a movement of rotating the UAV 100 to the right direction, or a combination thereof. The same also applies to the following descriptions.

In some embodiments, when the power button B1 is pressed once, a signal corresponding to the one time pressing may be input to the transmitter controller 61. The transmitter controller 61 may display, based on the signal, the remaining capacity of the battery (not shown) disposed inside the transmitter 50 on the battery remaining capacity display L2. As such, the operator may easily confirm the remaining capacity of the battery disposed inside the transmitter 50. In addition, when the power button B1 is pressed twice, a signal corresponding to the pressing twice operation may be transmitted to the transmitter controller 61. The transmitter controller 61 may instruct, based on this signal, the battery (not shown) disposed inside the transmitter 50 to provide power to various parts of the transmitter 50. As such, the power of the transmitter 50 is connected, and the operator may start using the transmitter 50 in an easy manner.

In some embodiments, when the RTH button B2 is pressed, a signal corresponding to the pressing operation may be input to the transmitter controller 61. The transmitter controller 61 may generate, based on this signal, a signal configured to cause the UAV 100 to automatically restore to a predetermined location (e.g., the takeoff location of the UAV 100), and may transmit the signal to the UAV 100 through the wireless communication device 63 and the antennas AN1, AN2. AS such, the operator may cause the UAV 100 to automatically restore (return to) the predetermined location through simple operations of the transmitter 50.

In some embodiments, the operation member assembly OPS may be formed by multiple operation members OP (e.g., operation member OP1, . . . , operation member OPn) (n: integer greater than 2). The operation member assembly OPS may be formed by other operation members (e.g., various operation members configured to provide assist in the remote control of the UAV 100 using the transmitter 50) other than the left control joystick 54L, the right control joystick 54R, the power button B1, and the RTH button B2 shown in FIG. 4. The various operation members described herein may include, for example, a button indicating that still image photographing of the imaging device 220 of the UAV 100 has been used, a button indicating the start and end of the video recording of the dynamic imaging of the imaging device 220 of the UAV 100, a dial for adjusting a slant degree in a slant direction of the universal joint 200 (referring to FIG. 4) of the UAV 100, a button for switching a flight mode of the UAV 100, and a dial for setting the imaging device 220 of the UAV 100.

The remote status display L1 and the battery remaining capacity display L2 have been described with reference to FIG. 6. Such descriptions are omitted here.

In some embodiments, the transmitter controller 61 may include a processor (e.g., a CPU, MPU, or DSP). The transmitter controller 61 may be configured to control the overall signal processing of operations of various parts of the transmitter 50, data input and output processing with other various parts, and data computation processing and data storage processing.

In some embodiments, the transmitter controller 61 may obtain data of images captured by the imaging device 220 of the UAV 100 through the wireless communication device 63, and may store the data of images into a storage device (not shown), and may output the data of the images to the portable terminal 80 through the interface member 65. In other words, the transmitter controller 61 may display data of the aerial images captured by the imaging device of the UAV 100 on the portable terminal 80. As such, the aerial images captured by the imaging device 220 of the UAV 100 may be displayed on the portable terminal 80.

In some embodiments, the transmitter controller 61 may generate, through the operations by the operator on the left control joystick 53L and the right control joystick 53R, an instruction signal for controlling flight of the UAV 100 that is specified by such operations. The transmitter controller 61 may transmit the instruction signal to the UAV 100 through the wireless communication device 63 and the antennas AN1, AN2, to remotely control the UAV 100. As such, the transmitter 50 may remotely control the movement of the UAV 100.

In some embodiments, the transmitter controller 61 may generate an operation input signal based on an operation of any button or any operation member of the transmitter 50, and may transmit the operation input signal to the UAV 100 through the wireless communication device 63. Under such conditions, the UAV 100 may receive the operation input signal from the transmitter 50, and can recognize that the transmitter 50 is under control of an operator.

In some embodiments, the wireless communication device 63 may be connected with the two antennas AN1, AN2. Through the two antennas AN1, AN2, the wireless communication device 63 may execute the transmission and reception of information and data with the UAV 100 through a predetermined wireless communication method (e.g., WiFi®).

In some embodiments, the interface member 65 may execute the input and output of information and data between the transmitter 50 and the portable terminal 80. The interface member 65 may be a USB port (not shown) disposed on the transmitter 50. The interface member 65 may be other interface other than the USB port.

Figure 8:
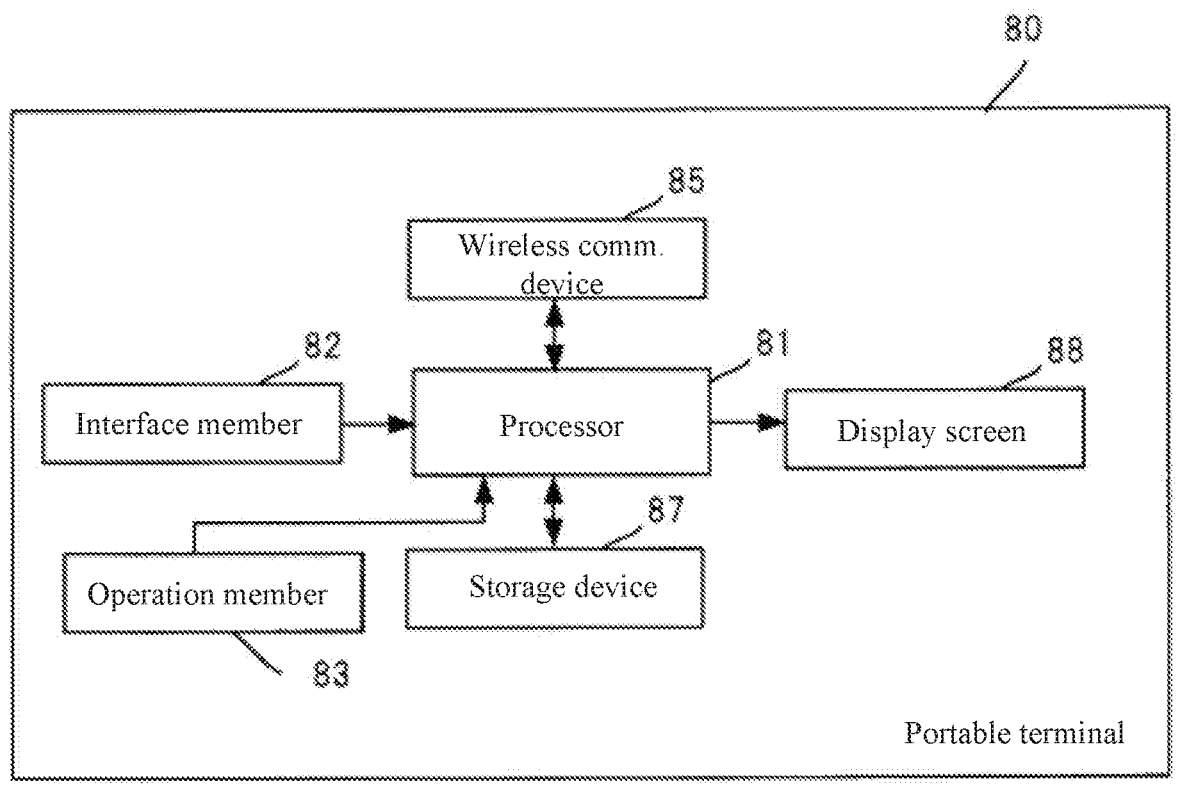
FIG. 8 is a schematic diagram of a hardware configuration of the portable terminal, according to an example embodiment.

FIG. 8 is a schematic diagram of a hardware configuration of the portable terminal 80. The portable terminal 80 may include a processor 81, an interface member 82, an operation member 83, a wireless communication device 85, a storage device 87, and a display screen 88. The portable device 80 is an example of a location processing device.

In some embodiments, the processor 81 may include one or more of a CPU, MPU, or DSP. The processor 81 may be configured to control the overall signal processing of the operations of various parts of the portable terminal 80, the input and output processing of the data with other various parts, and the data computation processing and the data storage processing.

In some embodiments, the processor 81 may obtain data and information from the UAV 100 through the wireless communication device 85. The processor 81 may obtain data and information from the transmitter 50 through the interface member 82. The processor 81 may obtain data and information input through the operation member 83. The processor 81 may obtain data and information stored in the storage device 87. The processor 81 may transmit the data and information to the display screen 88 to show display information based on the data and information.

In some embodiments, the processor 81 may execute an application program configured to instruct control of the UAV 100. The application program may include a relative location processing application program configured to process relative location information that enables multiple UAVs 100 to fly in collaboration. The processor 81 may generate various data used by the application program.

In some embodiments, the interface member 82 may execute input and output of information and data between the transmitter 50 and the portable terminal 80. The interface member 82 may be, for example, a USB connector (not shown) provided at the portable terminal 80. The interface member 82 may also be any other suitable interface other than the USB connector.

In some embodiments, the operation member 83 may receive data and information input by the operator of the portable terminal 80. The operation member 83 may include a button, a key, a touch screen, a microphone, etc. In some embodiments, the operation member 83 and the display screen 88 are formed by touch screens. Under this condition, the operation member 83 may receive a touch operation, a click operation, and a drag operation.

In some embodiments, the wireless communication device 85 may communicate with the UAV 100 through various wireless communication methods. The wireless communication methods may include, for example, communication through wireless LAN, Bluetooth®, a near field wireless communication, or a public wireless route. The wireless communication device 85 may be an example of an output member.

In some embodiments, the storage device 87 may include, for example, a ROM storing a program defining operations of the portable terminal 80, and storing the data of set values, and a RAM configured to temporarily store various information and data used by the processor 81 in processing. The storage device 87 may include any other storage device other than the ROM and RAM. The storage device 87 may be provided inside the portable terminal 87. The storage device 87 may be configured to be detachable from the portable terminal 80. The program may include an application program.

In some embodiments, the display screen 88 may include, for example, a Liquid Crystal Display ("LCD"), and may be configured to display various information and data output from the processor 81. The display screen 88 may display data of aerial images captured by the imaging device 220 of the UAV 100. The display screen 88 may display a relative location processing image used by the relative location processing application program.

Figure 9:
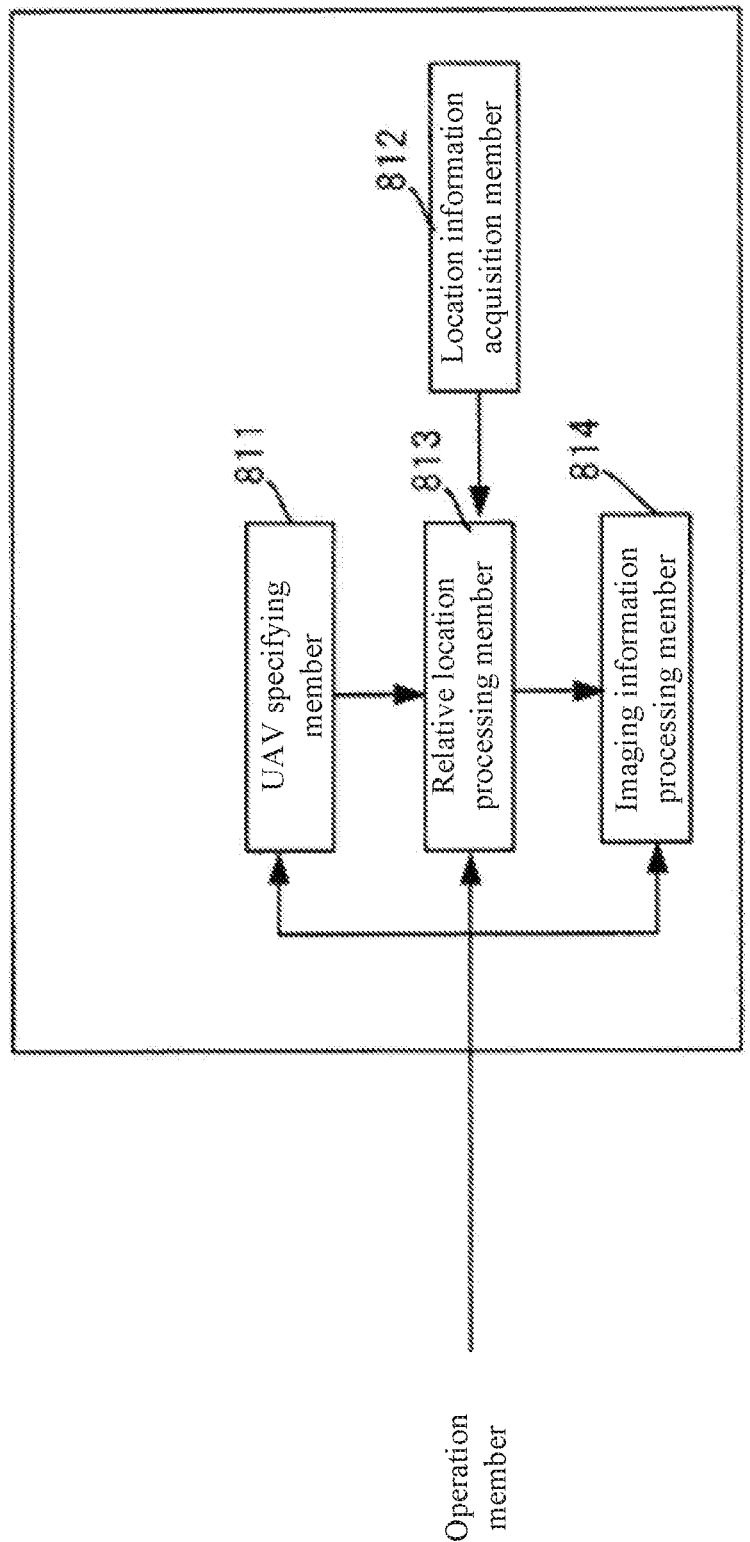
FIG. 9 is a schematic diagram of a functional configuration of the portable terminal, according to an example embodiment.

FIG. 9 is a schematic diagram of a functional configuration of the portable terminal 80. The processor 81 may execute a program stored in the storage device 87, therefore, may include a UAV specifying member 811, a location information acquisition member 812, a relative location processing member 813, and an imaging information processing member 814. The UAV specifying member 811 may be an example of a selection member. The location information acquisition member 812 may be an example of an acquisition member. The relative location processing member 813 may be an example of a determination member.

In some embodiments, the UAV specifying member 811 may specify (select), from multiple UAVs 100 (e.g., 3 UAVs), multiple UAVs 100 (e.g., 2 UAVs) that form a flight group. In other words, the UAV specifying member 811 may specify multiple UAVs 100 to form one or more flight groups. The UAV specifying member 811 may specify the UAVs 100 based on specifying information input to the operation member 83. The specifying information input to the operation member 83 may be touch information with respect to the touch screen, or an input (e.g., a key input, a button input, a voice input) configured to recognize identification information of the UAV 100.

In some embodiments, through the operation member 83, the UAV specifying member 811 may specify, from among multiple UAVs 100 displayed at various processing images (e.g., a relative location processing image), multiple UAVs 100 for forming a flight group. The UAV specifying member 811 may determine locations of the multiple UAVs 100 displayed at the processing image based on location information of each UAV 100 obtained by the location information acquisition member 812.

In some embodiments, the location information acquisition member 812 may obtain the location information (e.g., current location information) of the UAV 100. The location information acquisition member 812 may obtain the location information of the UAV 100 through the wireless communication device 85. The location information acquisition member 812 may obtain the location information of the UAV 100 through the transmitter 50 and the interface member 82. The location information of the UAV 100 may include absolute location information of the UAV 100.

In some embodiments, the location information of the UAV 100 may include location information received by the GPS receiver 240 of the UAV 100. The location information of the UAV 100 may include location information obtained by referencing to the three-dimensional map database. The location information of the UAV 100 may include the height information obtained by the barometer 270, the ultrasonic sensor 280, or the laser measurement device 290.

In some embodiments, the absolute location information may be location information (e.g., latitude, longitude, altitude information) defined by a location of an object, such as a UAV 100. Correspondingly, relative location information may be location information defined by a location relationship between multiple objects such as multiple UAVs (e.g., distance and direction information relative to a reference location).

In some embodiments, the relative location processing member 813 may determine relative location information of multiple UAVs 100 included in the same flight group. The relative location information of the multiple UAVs 100 may also be referred to as relative location relationship information of each of the multiple UAVs 100. The relative location processing member 813 may determine a relative location relationship during a flight of multiple UAVs 100 and during a flight operation using the transmitter 50.

In some embodiments, the relative location processing member 813 may use one specific UAV 100 of the multiple UAVs 100 included in the same flight group as a reference to determine location information of other UAVs 100 relative to the specified UAV 100, as the relative location information.

In some embodiments, the relative location processing member 813 may determine a location as a reference (e.g., a reference location) in the flight group based on the locations (absolute locations) of the multiple UAVs 100 included in the same flight group. The relative location processing member 813 may use the reference location as a reference to determine location information of multiple UAVs 100 respectively relative to the reference location, as the relative location information.

In some embodiments, through the operation member 83, for one or more UAVs included in the multiple UAVs 100 displayed in various processing images (e.g., a relative location processing image), the relative location processing member 813 may use a drag operation to change the location of the one or more UAVs, thereby changing the relative location information. In other words, the relative location processing member 813 may adjust the relative location information through a drag operation. The relative location processing member 813 may obtain, through the operation member 83, values of distances between multiple UAVs 100, and may determine the relative location information based on the distances.

Next, determination of the relative location information of the multiple UAVs 100 included in the same flight group will be described.

The multiple UAVs 100 included in the same flight group may fly in collaboration respectively. The flight group may be formed through the portable terminal 80. The relative location information may be determined through the portable terminal 80.

Figure 10:
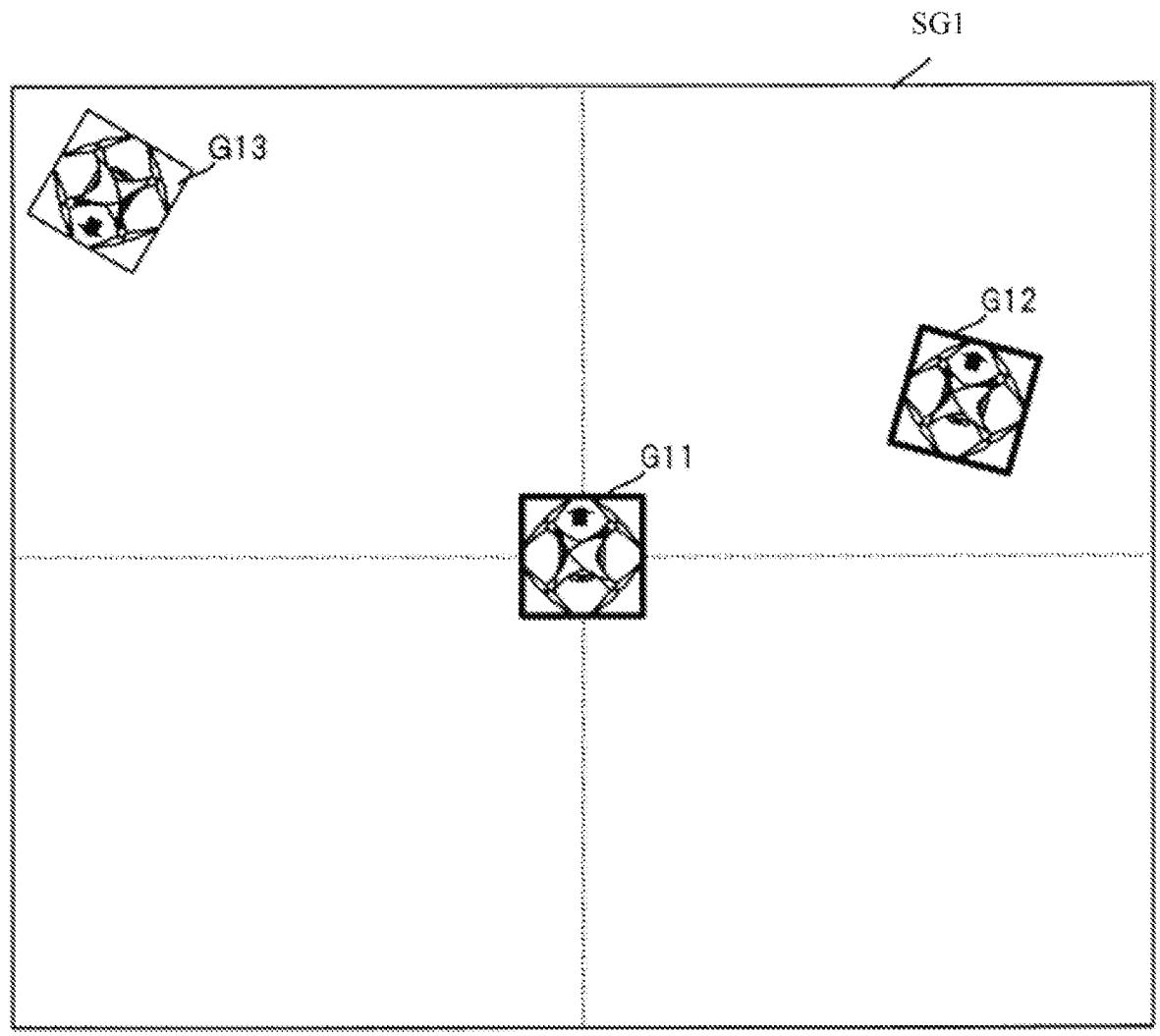
FIG. 10 is a schematic illustration of UAVs included in a same flight group as shown in a location relationship processing image, according to an example embodiment.

FIG. 10 is a schematic illustration of determining UAVs 100 belonging to the same flight group at a location relationship processing image SG1. The location relationship processing image SG1 may be displayed on at least a portion of the display screen 88. Subsequent location relationship processing images SG1 are the same.

The location relationship processing image SG1 shown in FIG. 10 displays UAV images G11~G13. The UAV images G11, G12, G13 are displayed corresponding to the absolute locations of each UAV 100, and represent the locations of 3 UAVs 100G11, 100G12, 100G13 (all not shown). The region represented by the location relationship processing image SG1 may correspond to a region where UAVs 100 are located in an actual space, or may be shown with a predetermined scale with respect to the actual spatial region. The display locations of the UAV images G11~G13 on the location relationship processing image SG1 may correspond to locations of the absolute locations obtained by the location information acquisition member 812. The UAV image may be an example of an image of a flight vehicle.

In FIG. 10, the UAV image G11 may be displayed at a center location of the location relationship processing image SG1, such that the UAV image G11 is at a conspicuous location. In addition, other UAV images G12 and/or G13 may be displayed at the center location.

In FIG. 10, the operation member 83 may receive touch operations on UAV images G11, G12. The relative location processing member 813 may obtain touch operation information of the operation member 83, and may specify the UAVs 100G11, 100G12 corresponding to the UAV images G11, G12 as UAVs 100 for forming a flight group. In another aspect, the relative location processing member 813 may not obtain touch operation information of the operation member 83 on the UAV image G13. Therefore, the UAV 100G13 corresponding to the UAV image G13 may not be specified as a UAV 100 for forming the flight group.

Figure 11:
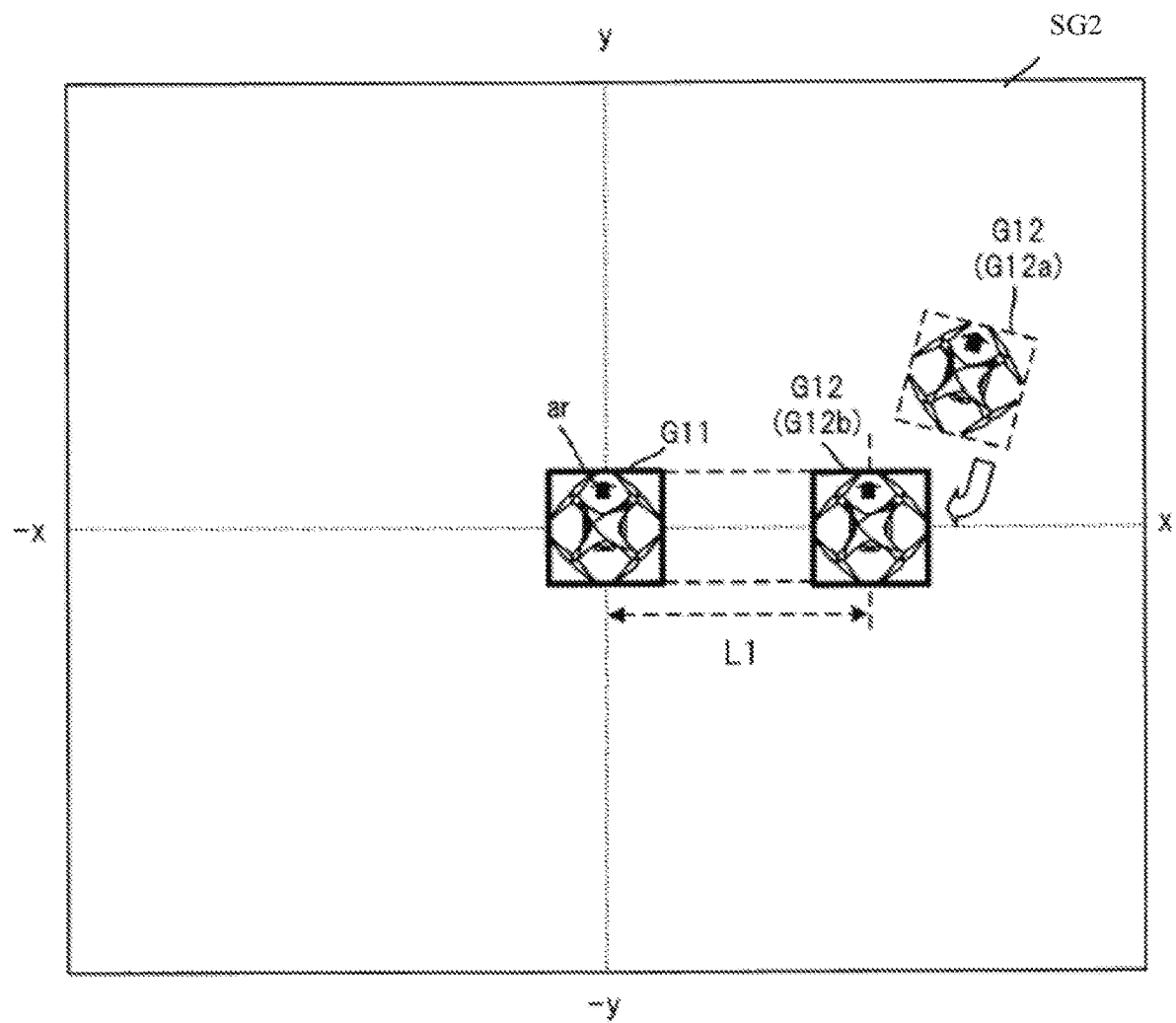
FIG. 11 is a schematic illustration of location adjustment of the UAVs in the horizontal direction as shown in the location relationship processing image, according to an example embodiment.

FIG. 11 schematically illustrates a horizontal location adjustment of a UAV 100 displayed at a location relationship processing image SG2. FIG. 11 also shows the location relationship between the selected multiple UAVs 100, as observed from above.

FIG. 11 shows the UAV images G11, G12 that are selected at the location relationship processing image SG1 shown in FIG. 10, and does not display the UAV image G13 that is not selected. In FIG. 11, the operation member 83 may receive a drag operation of the UAV image G12. The relative location processing member 813 may obtain relevant drag operation information of the operation member 83, and based on the drag operation, change the display location of the UAV image G12. In FIG. 11, in the horizontal coordinates xy coordinates, to make the distance of the UAV 100G12 relative to the UAV 100G11 in the x direction to be distance M1 (e.g., 50 cm), and the distance in the y direction to be 0, the relative location processing member 813 may adjust the location of the UAV image G12 on the location relationship processing image SG2 based on the operation member 83. In this situation, the UAV image G12a may be moved to the location of the UAV image G12b through the drag operation. The display screen 88 may display relative location information (e.g., distance information) corresponding to the drag operation. As such, the operator of the portable terminal 80 may understand in detail the distance change caused by the drag operation.

In FIG. 11, the arrow ar depicted in each UAV image G12 represents the facing direction of the imaging device 220 or 230, i.e., the imaging direction. The following illustration has the same meaning. The imaging device 220 may function as a main camera. The imaging device 230 may function as an auxiliary camera.

Figure 12:
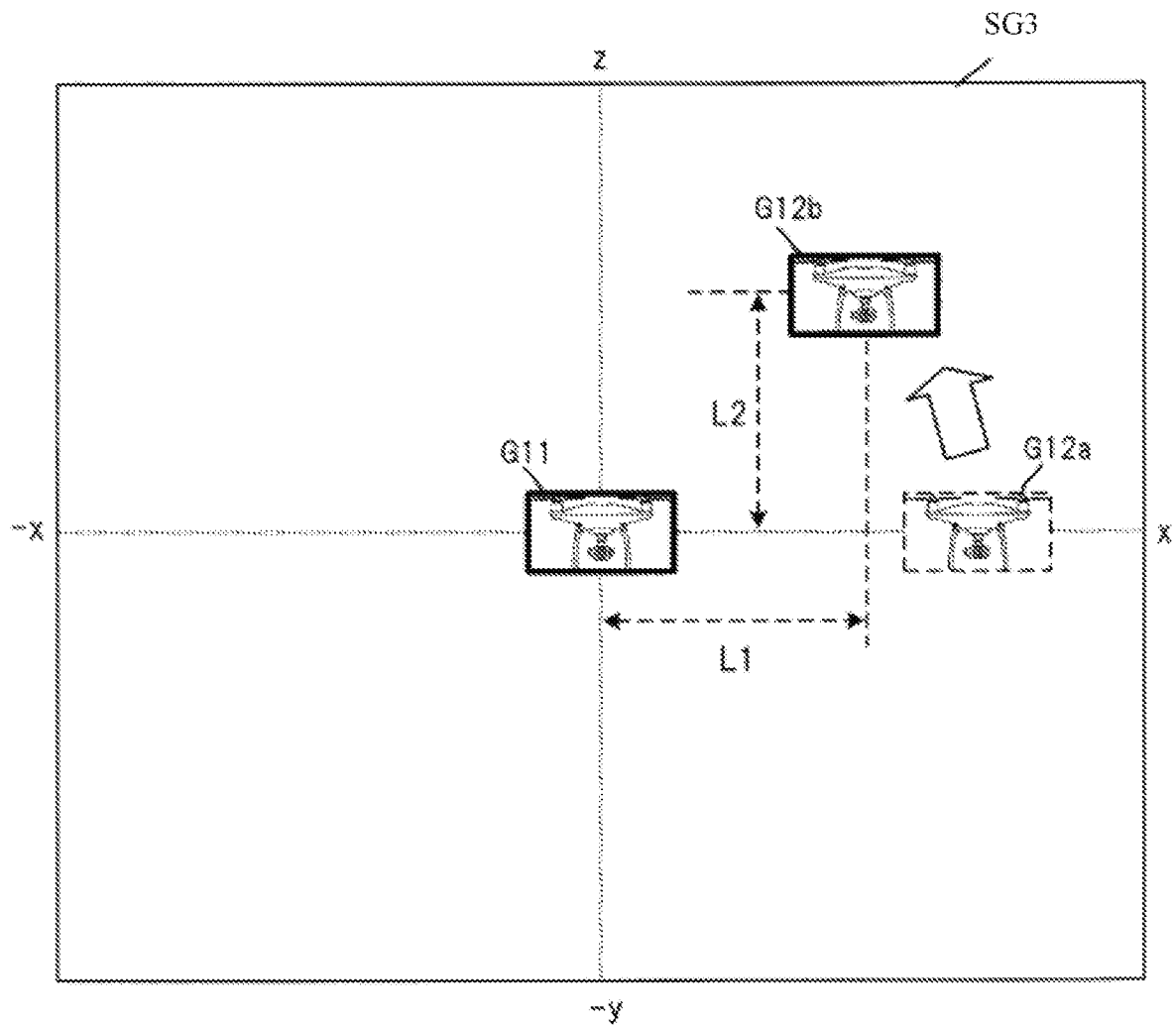
FIG. 12 is a schematic illustration of location adjustment of the UAVs in the height direction as shown in the location relationship processing image, according to an example embodiment.

FIG. 12 schematically illustration a height direction (gravity direction) location adjustment of the UAV 100 at a location relationship processing image SG3. FIG. 12 also shows the location relationship of the selected multiple UAVs 100 as observed from the horizontal direction.

FIG. 12 shows the UAV images G11, G12 that are selected at the location relationship processing image SG1 shown in FIG. 10, and does not show the UAV image G13 that is not selected. In FIG. 12, the operation member 83 may receive a drag operation on the UAV image G12. The relative location processing member 813 may obtain relevant drag operation information of the operation member 83, and based on the drag operation, change the display location of the UAV image G12. In FIG. 12, in the xy coordinates that represent coordinates in the height direction, in order to make the distance of the UAV 100G12 relative to the UAV 100G11 in the x direction to be distance M1, and the distance in the z direction to be distance M2 (e.g., 80 cm), the relative location processing member 813 may adjust a location of the UAV image G12 on the location relationship processing image SG3 through the operation member 83. In this situation, the UAV image G12a may be moved to the location of the UAV image G12b through the drag operation.

In some embodiments, when setting the relative location information, the display may be in a sequence of the location relationship processing images SG1, SG2, and SG3, and the relative location information may be determined and set in the sequence of horizontal direction and height direction. In some embodiments, when determining the relative location information, the display may be in the sequence of the location relationship processing images SG1, SG2, and SG3, the relative location information may be determined and set in a sequence of the height direction and horizontal direction.

Based on the adjustment examples of FIG. 11 and FIG. 12, the operator of the portable terminal 80 may confirm the display locations of the UAV images G11, G12 corresponding to actual UAVs 100G11, 100G12 on the display screen 88, and may, in the meantime, adjust the locations of the UAV images G11, G12 in a simple manner. Through the simple operations, portable terminal 80 may determine the relative location relationship between the UAV image G11 and UAG image G12. In addition, the operator of the portable terminal 80 may recognize direction for implementing the location adjustment in the three-dimensional space (e.g., the horizontal direction, the height direction), thereby adjusting the relative location relationship. Further, the operator of the portable terminal 80 may determine a distance between the UAVs 100G11, 100G12 through intuitive operations (e.g., drag operation) on the displayed image.

Differing from FIG. 11, FIG. 12, the operation member 83 may input the detailed value of the distance between the UAVs 100G11 and 100G12. The relative location processing member 813 may determine the distance information (e.g., 50 cm in the horizontal direction, 80 cm in the height direction) as the relative location information. AS such, the operator of the portable terminal 80 may determine the relative location information without using the display screen 88.

As described above, by determining the relative location information in a three-dimensional space that includes the horizontal direction and the height direction, the portable terminal 80 may define or specify the relative location relationship between multiple UAVs 100 in a flight range that the UAVs are allowed to fly, i.e., in the three-dimensional space. AS such, the portable terminal 80 may determine the relative location information based on the actual flight situation of the UAVs 100.

The present disclosure is not limited to determining relative location information in the three-dimensional space, but may also include determining relative location information in a two-dimensional space. For example, on the premise that the multiple UAVs 100 are configured on a same plane (e.g., the horizontal plane), the portable terminal 80 may determine where each UAV 100 is arranged on the plane.

Figure 13:
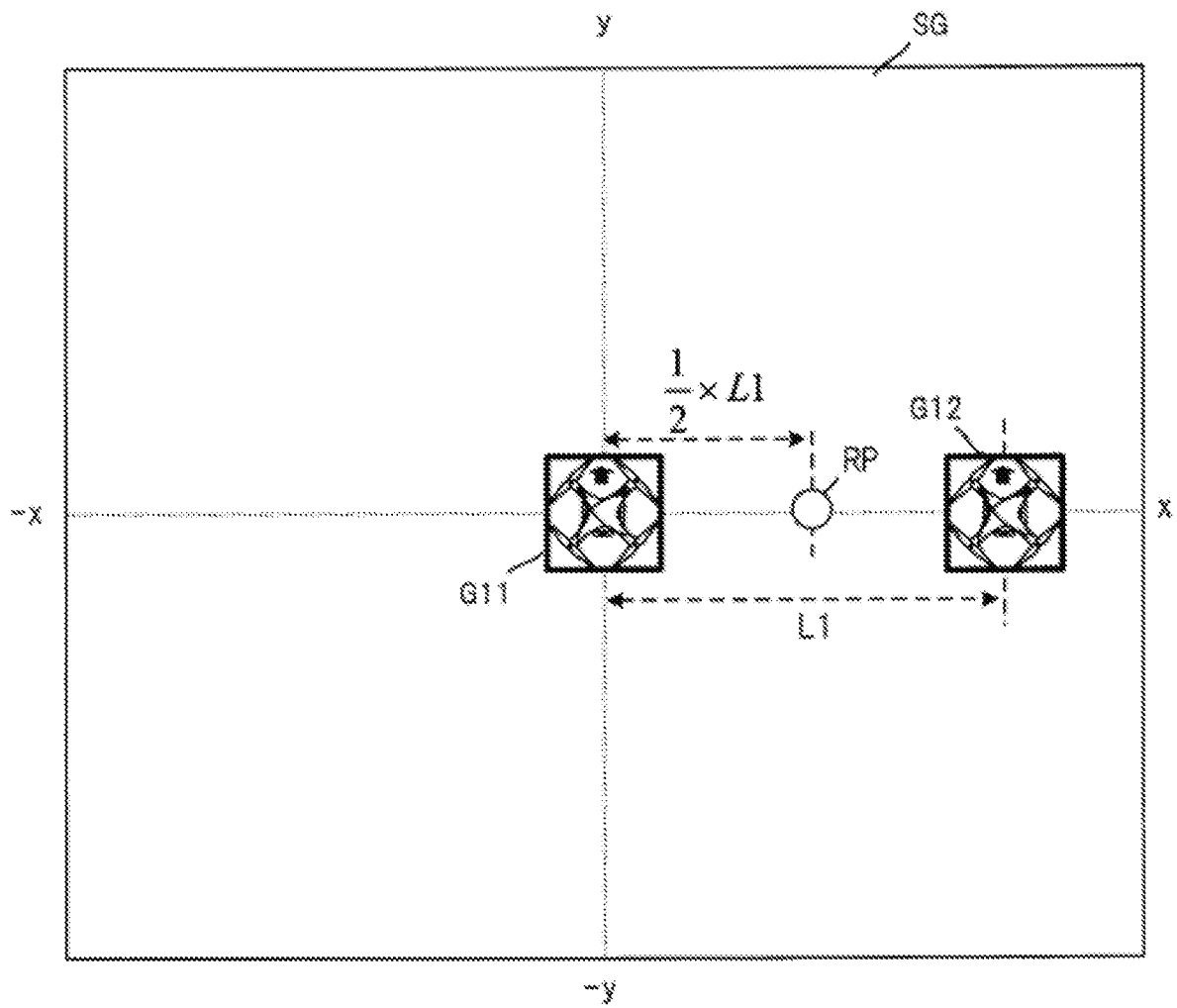
FIG. 13 is a schematic illustration of horizontal direction reference locations of multiple UAVs that form a flight group, according to an example embodiment.

FIG. 13 is a schematic illustration of a horizontal direction reference location of multiple UAVs 100 that form a flight group. In FIG. 13, the flight group may include 2 UAVs 100G11, 100G12 corresponding to the UAV images G11, G12. The reference location in the flight group for determining the relative location relationship may be represented by the reference location RP. The horizontal direction reference location RP may be a horizontal direction middle location, a center location, a center of gravity location, or other location that may be a reference, of the multiple UAVs 100G11, 100G12 included in the same flight group.

In FIG. 13, as an example of the reference location RP, the horizontal direction center location of the UAVs 100G11, 100G12 is shown. The relative location information of the multiple UAVs 100G11, 100G12 may include location information of the UAVs 100G11, 100G12 in the horizontal direction relative to the reference location RP. Specifically, the relative location information of the UAV 100G11 relative to the reference location RP may include information indicating a distance of (½)×M1 in the (−x) direction. The relative location information of the UAV 100G12 relative to the reference location RP may include information indicating a distance of (½)×M1 in the (+x) direction.

Figure 14:
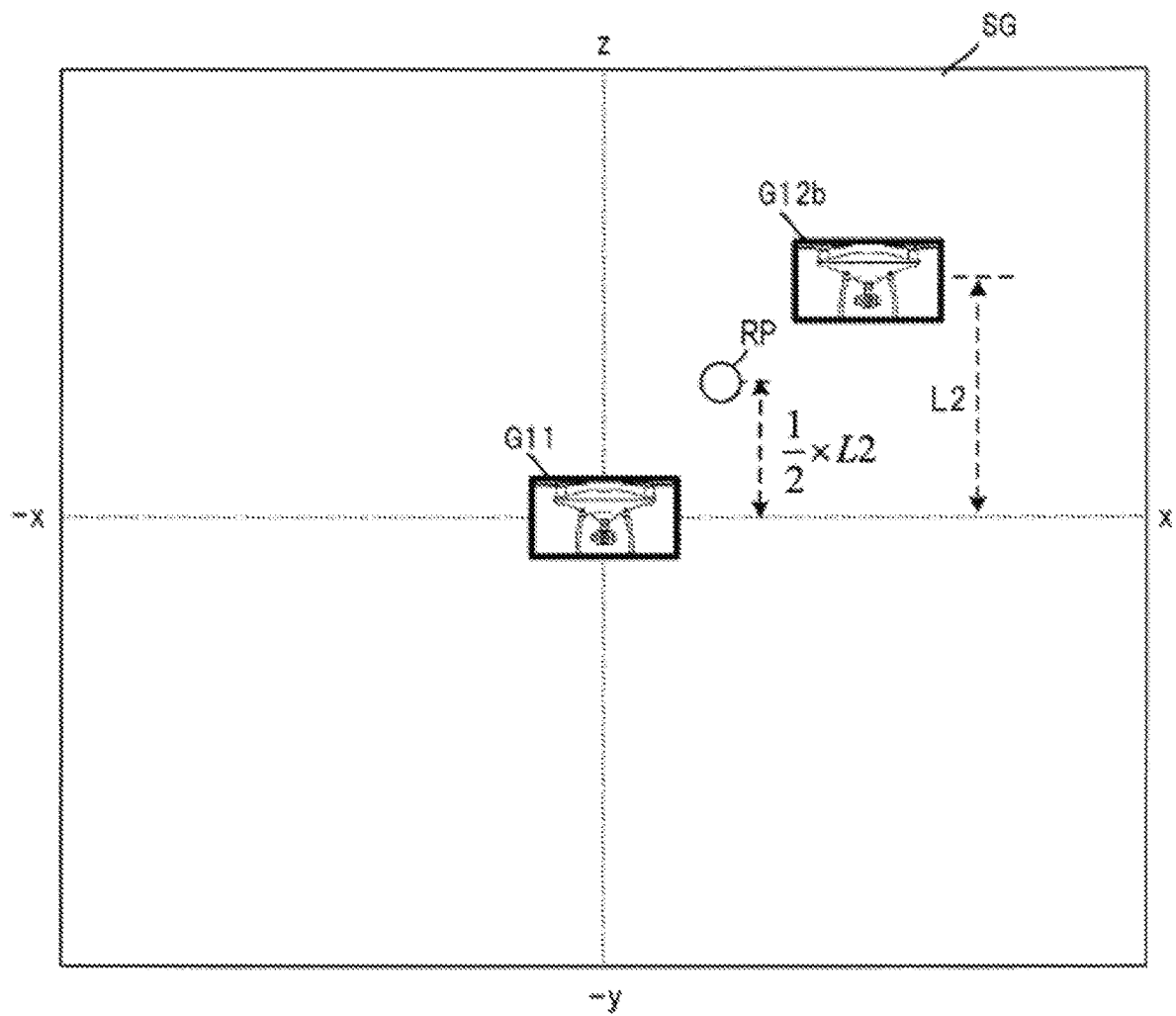
FIG. 14 is a schematic illustration of height direction reference locations of multiple UAVs that form a flight group, according to an example embodiment.

FIG. 14 is a schematic illustration of a height direction reference location of multiple UAVs 100 that form a flight group. In FIG. 14, the flight group include 2 UAVs 100G11, 100G12 corresponding to the UAV images G11, G12. The reference location in the flight group for determining the relative location relationship may be represented by the reference location RP. The height direction reference location RP may include a height direction middle location, a center location, a center of gravity location, or other location that can be a reference, of the multiple UAVs 100G11, 100G12 included in the same flight group.

In FIG. 14, as an example of the reference location RP, a height direction center location of the UAVs 100G11, 100G12 is shown. The relative location information of multiple UAVs 100G11, 100G12 may include location information of the UAVs 100G11, 100G12 relative to the reference location RP in the height direction. Specifically, the relative location information of the UAV 100G11 relative to the reference location RP may include information indicating a distance of (½)×M2 in the (−z) direction. The relative location information of the UAV 100G12 relative to the reference location RP in the height direction may include information indicating a distance of (½)×M2 in the (+z) direction.

As described above, the relative location processing member 813 may determine the relative location information of each UAV 100 relative to the reference location RP. As such, based on a difference between each UAV 100 and the reference location RP, the portable terminal 80 may easily generate the relative location information. In addition, when multiple UAVs 100 fly, the portable terminal 80 may cause the UAVs 100 to be in a flight state using a reference location of the flight group as a reference. As such, for multiple UAVs 100, the portable terminal 80 may provide a flight method for simply expanding a single UAV 100 flight state to multiple UAVs 100, thereby making the operations of the UAVs 100 by the operator of the transmitter 50 easier.

In some embodiments, the relative location processing member 813 may cause the relative location information of multiple UAVs 100G11, 100G12 to include distance information in at least one of the horizontal direction and the height direction, and include the identification information of the UAVs 100G11, 100G12. In this situation, the relative location information may jointly include the identification information and the distance information of the UAVs 100G11, 100G12. The identification information of the UAV 100 may be, for example, an individual identification number provided when manufactured, a user identification number set for the operator, or any other identification information.

As described above, the relative location information may jointly include the identification information of the UAVs 100G11, 100G12, and the relative location information of the UAVs 100G11, 100G12. As such, during the flight of the UAV 100G11 or during flight operations through the transmitter 50, with respect to the reference location RP, the flight system 10 may define or specify which UAV 100 should fly at which location.

Next, determination of an arrangement of multiple UAVs 100 that form a flight group is described.

Figure 15:
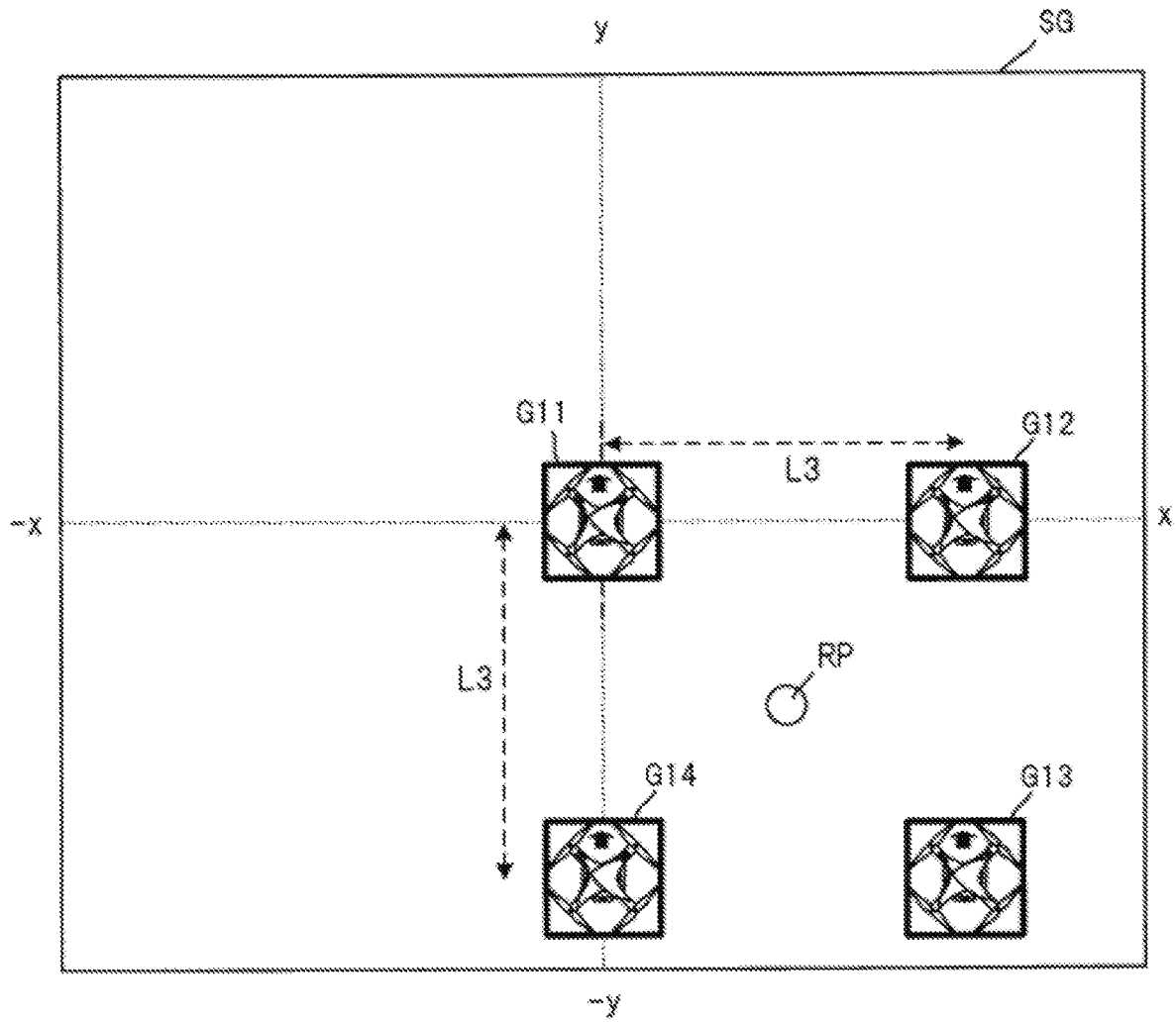
FIG. 15 is a schematic illustration of a first arrangement determination of multiple UAVs that form a flight group, according to an example embodiment.

FIG. 15 is a schematic illustration of a first arrangement determination of multiple UAVs 100 that form a flight group.

In FIG. 15, using the reference location RP as a center location, four UAV images G11, G12, G13, and G14, i.e., UAVs 100G11, 100G12, 100G13, and 100G14, are symmetrically arranged surrounding the reference location RP. In FIG. 15, at the vertices of a square having a length L3, UAVs 100G11, 100G12, 100G13, and 100G14 are respectively disposed. In FIG. 15, the UAV image G11 corresponding to the UAV 100G11 may be located at a center location of the xy coordinates. The UAV 100G11 may be a UAV 100, for which the portable terminal 80 that processes relative location information instructs flight control through the mounted transmitter 50. The first arrangement determination may be an arrangement when the +y direction is a forward moving direction when the flight group moves forward.

Figure 16:
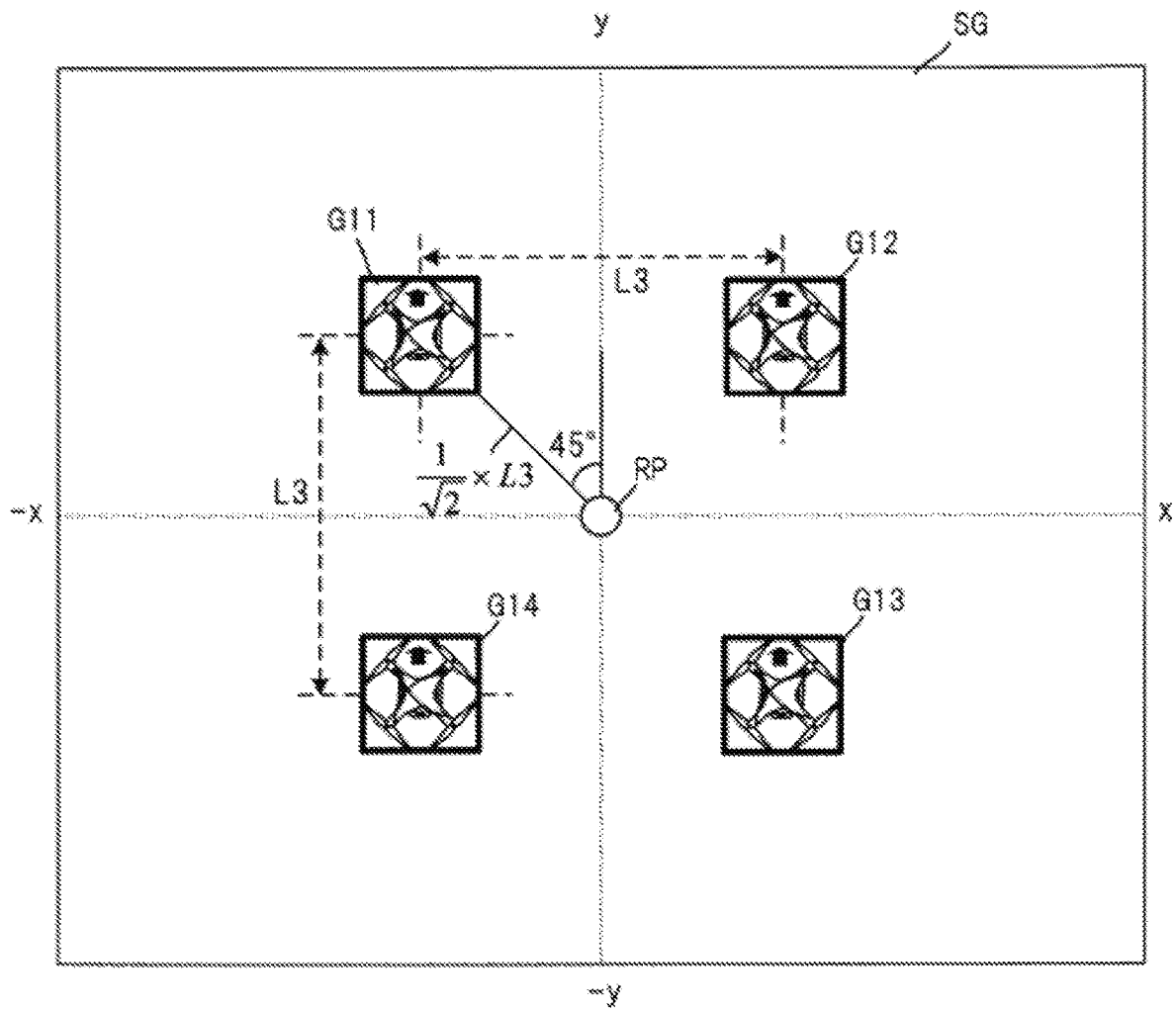
FIG. 16 is a schematic illustration of a second arrangement determination of multiple UAVs that form a flight group, according to an example embodiment.

FIG. 16 is a schematic illustration of a second arrangement determination of multiple UAVs 100.

The second arrangement determination is basically the same as the first arrangement determination. However, the reference location RP in FIG. 16 is the center location of the xy coordinates. In FIG. 16, the location of the UAV 100G11 relative to the reference location RP is in a 45° slant angle from the +y direction toward the −x direction, and has a distance of $(1/\sqrt{2}) \times L3$. The relative location information may include this information. The relative location information may also include the respective locations of the UAVs 100G12, 100G13, 100G14 relative to the reference location RP. The second arrangement determination may be an arrangement when the +y direction is the forward moving direction when the flight group moves forward.

Figure 17:
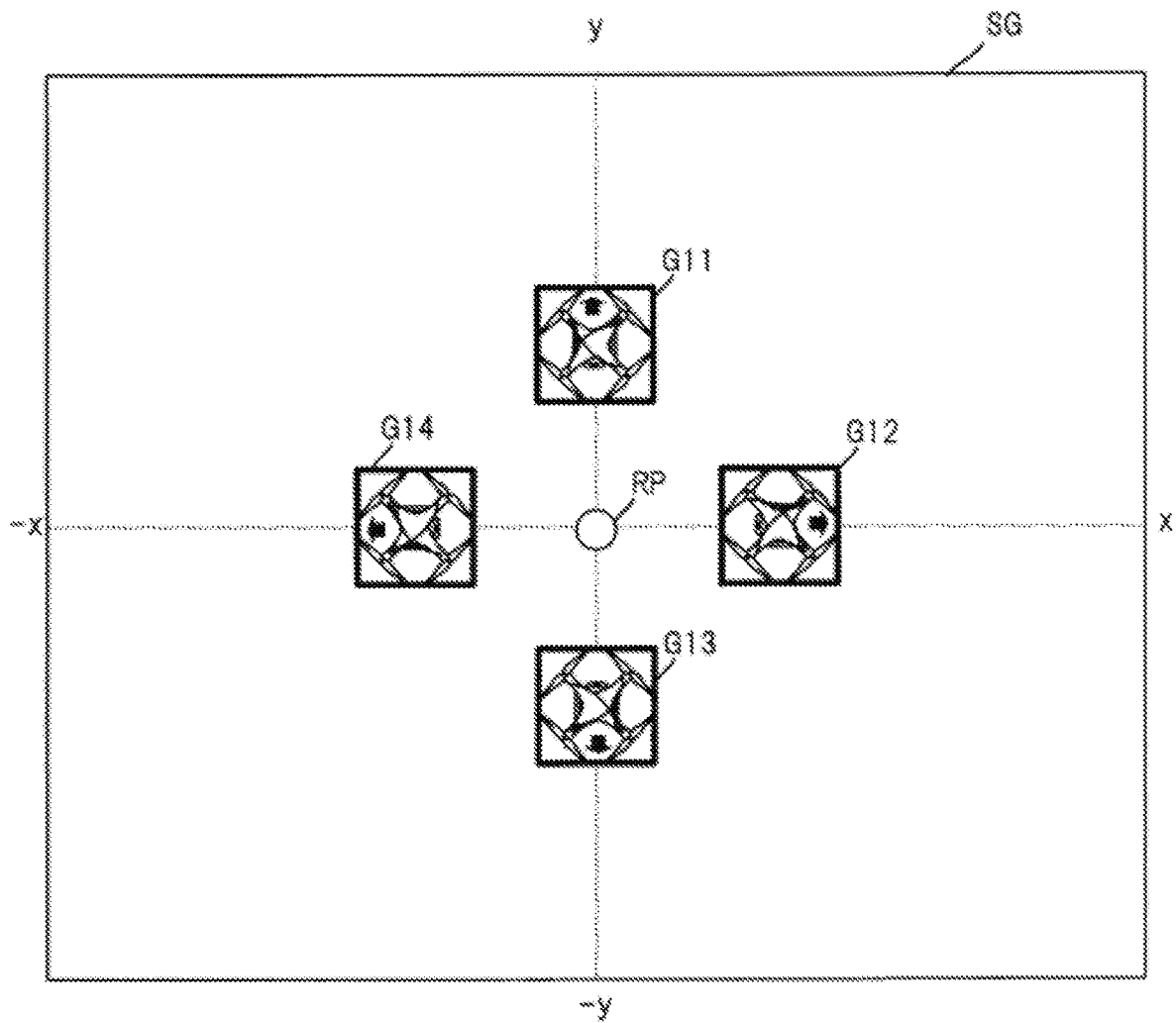
FIG. 17 is a schematic illustration of a third arrangement determination of multiple UAVs that form a flight group, according to an example embodiment.

FIG. 17 is a schematic illustration of a third arrangement determination of multiple UAVs 100 that form a flight group.

Compared with the second arrangement determination, the third arrangement determination differs in that the facing directions of each imaging device 220 or 230 included in each UAV 100 are different, and the imaging directions of each imaging device 220 or 230 when performing photographing are different. In FIG. 17, the relative location processing member 813 may determine relative location information of multiple UAVs 100. In the meantime, the imaging information processing member 814 may determine imaging direction information of each of the multiple UAVs 100. The imaging information processing member 814 may determine imaging direction information of each UAV 100 based on the number of UAVs 100 forming the flight group.

The imaging information processing member 814 may store the number of UAVs specified to be included in the same flight group in the storage device 87 a priori, and may retrieve the number therefrom. For example, when the number of UAVs forming a flight group is 4, the imaging information processing member 814 may calculate and determine information regarding imaging directions with a 90 degree difference, which evenly divides a circumference, i.e., 360 degrees, into 4 portions. The imaging information processing member 814 may determine directions in which the multiple UAVs 100 are observed from the reference location RP as the imaging directions of each of the UAVs 100, and may determine the imaging direction information.

In FIG. 17, the UAV 100G11 may use the up direction as the imaging direction. The UAV 100G12 may use the right direction as the imaging direction. The UAV 100G13 may use the down direction as the imaging direction. The UAV 100G14 may use the left direction as the imaging direction. Such imaging directions may be included in the determined imaging direction information.

In some embodiments, when the imaging information processing member 814 determines the imaging direction of each of the UAVs 100, the imaging information processing member 814 may determine field of view information of each imaging device 220 or 230 of each UAV 100, and may determine the imaging range based on the field of view. The imaging information processing member 814 may determine the field of view information of each imaging device 220 or 230 of each UAV 100 based on the number of UAVs that for the flight group. For example, when the number of UAVs forming the flight group is 4, the imaging information processing member 814 may calculate and determine 90 degrees that evenly divides a circumference, i.e., 360 degrees, into 4 portions, and include the 90 degrees and more in the field of view information.

In some embodiments, if each UAV 100 can capture images based on the imaging direction and the field of view information, the UAV 100 may obtain images of 360-degree surrounding of the flight group. As such, the image processing device (e.g., portable terminal 80) may obtain these captured images and perform a predetermined image processing to obtain a panoramic image and a stereo image of the surrounding of the flight group.

Figure 18:
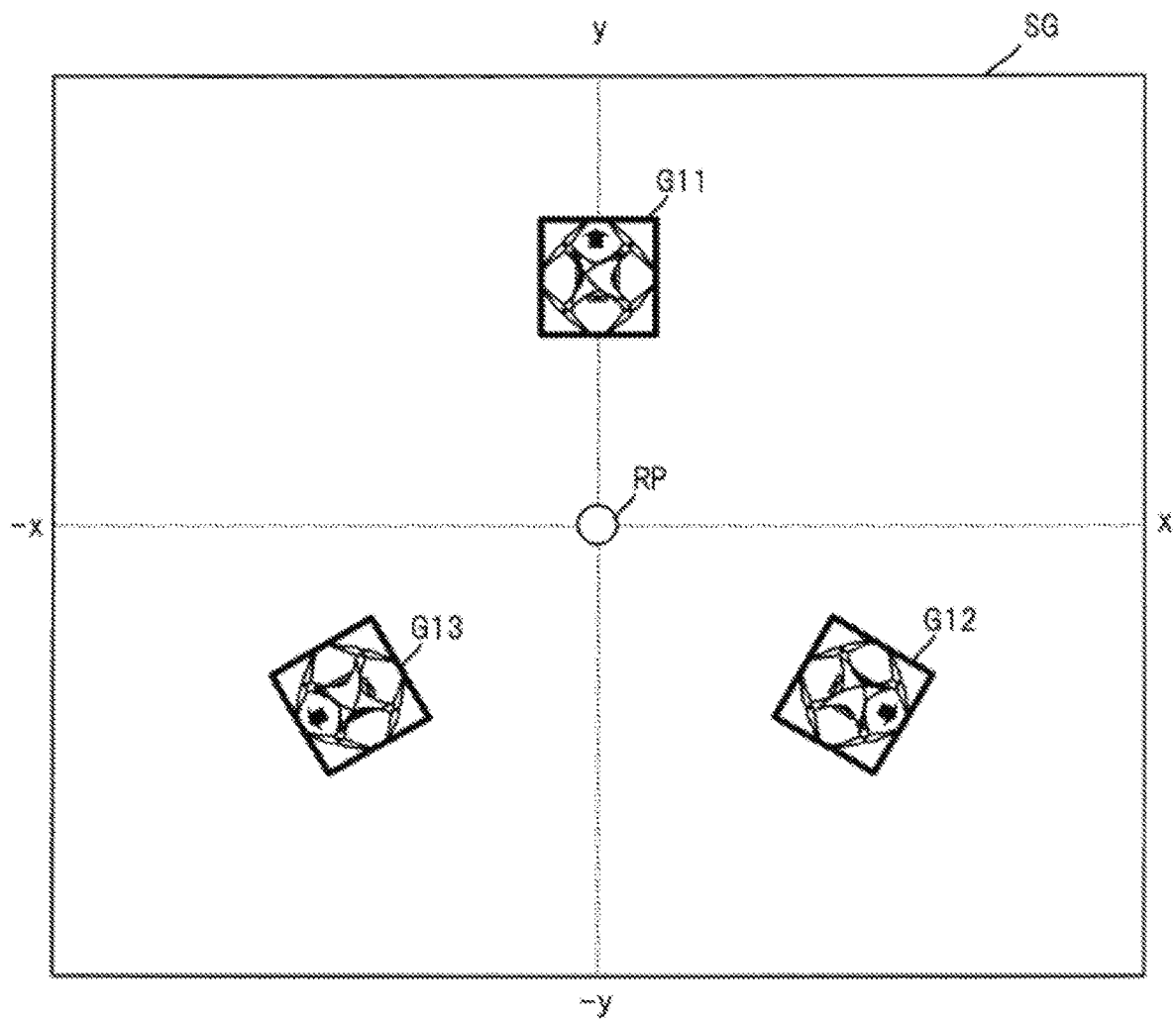
FIG. 18 is a schematic illustration of a fourth arrangement determination of multiple UAVs that form a flight group, according to an example embodiment.

FIG. 18 schematically illustrates a fourth arrangement determination of the multiple UAVs 100 that form the flight group.

The fourth arrangement determination and the third arrangement determination are basically the same, except that the number of UAVs forming the flight group is 3. In addition, the UAVs 100G11, 100G12, 100G13 corresponding to the UAV images G11, G12, G13 are arranged at the apex locations of an equilateral triangle. Therefore, the imaging information processing member 814 may calculate a phase difference to divide 1 circumference (i.e., 360 degrees) into 3 portions evenly or uniformly, i.e., 120 degrees, and include 120 degrees and more in the imaging direction information.

In FIG. 18, the UAV 100G11 may use the up direction (e.g., a moving direction of the flight group when moving forward) as the imaging direction, the UAV 100G12 may use a direction that is the imaging direction of the UAV 100G11 rotating 120 degrees clockwise as the imaging direction, and the UAV 100G13 may use a direction that is the imaging direction of the UAV 100G12 rotating 120 degrees clockwise as the imaging direction. These imaging directions may be included in the imaging direction information.

In some embodiments, the imaging information processing member 814 may calculate 120 degrees for dividing 1 circumference (i.e., 360 degrees) evenly into 3 portions, and may determine the above field of view information. If each UAV 100 captures images, the UAV 100 may obtain images of the 360-degree surrounding of the flight group. As such, the image processing device (e.g., portable terminal 80) may obtain these images and perform a predetermined image processing to obtain a panoramic image and a stereo image of the surrounding of the flight group.

Figure 19:
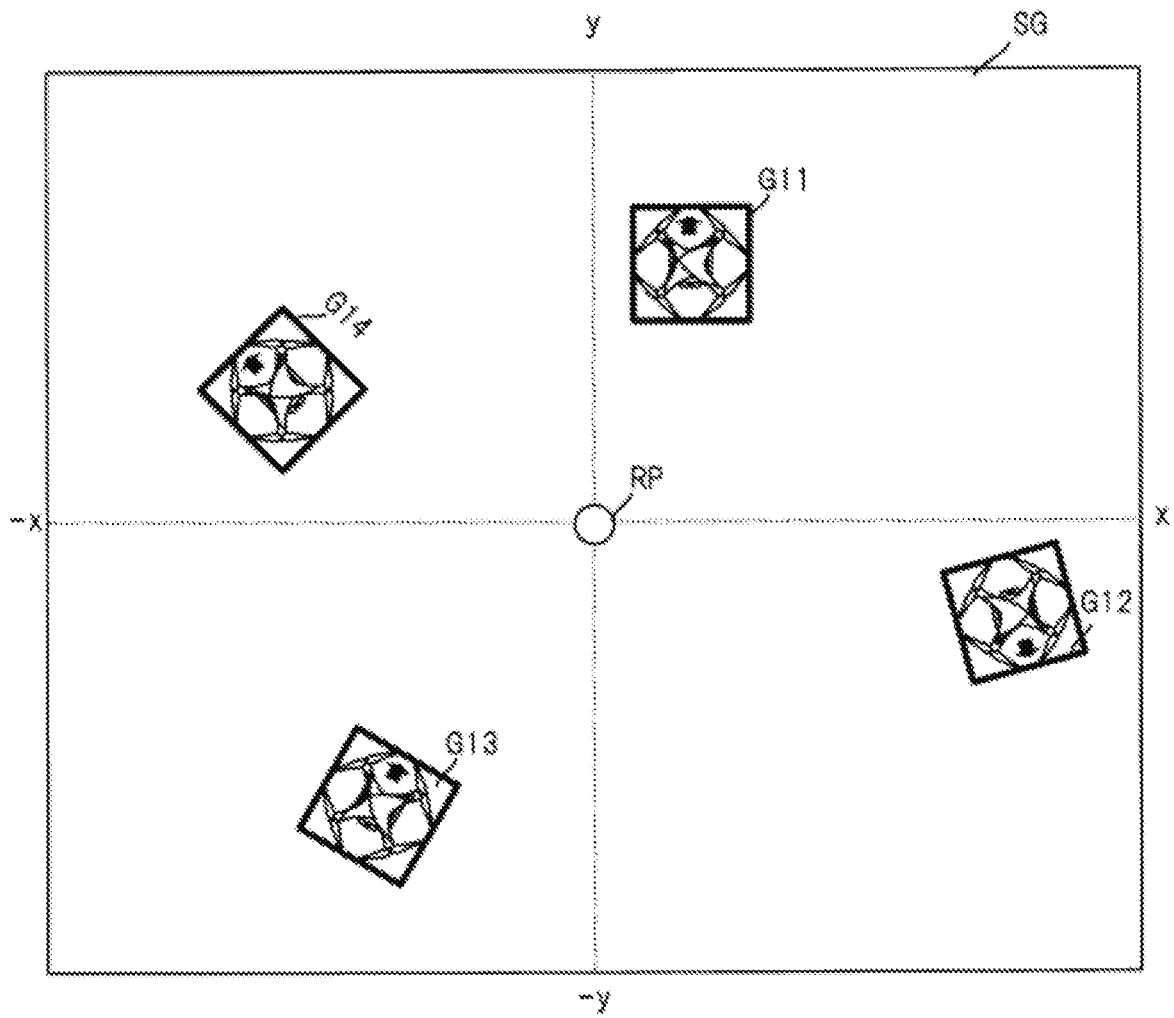
FIG. 19 is a schematic illustration of a fifth arrangement determination of multiple UAVs that form a flight group, according to an example embodiment.

FIG. 19 is a fifth arrangement determination of multiple UAVs 100 that form a flight group.

As shown in the fifth arrangement determination, multiple UAVs 100G11~100G14 may be asymmetrically arranged relative to the reference location RP, and the relative location information may be determined. The imaging direction information of the UAVs 100G11~100G14 may be determined to have non-uniform, irregular imaging directions.

In some embodiments, the imaging information processing member 814 may obtain the imaging direction and the field of view imaging parameter of each UAV 100 as input information through the operation member 83, rather than making a determination based on the number of UAVs 100. As such, without the symmetry, when it is difficult to determine, in a unified manner, the imaging direction and field of view parameter through computation, the portable terminal 80 may determine the imaging parameter of multiple UAVs 100 individually.

As described above, the present disclosure can not only determine, set symmetric, uniform, or regular parameters, such as relative location information and imaging direction, but can also determine, set asymmetric, non-uniform, or irregular parameters, such as relative location information and imaging direction. Before flight, parameters such as the relative location information, imaging direction for each of the UAVs 100G11~100G14 may be set and stored. Therefore, the UAVs 100G11~100G14 that forms a same flight group can maintain the set relative location information, the imaging direction and field of view indicated by the imaging parameter, while fly in collaboration.

Next, operations of the flight system 10 will be described.

Figure 20:
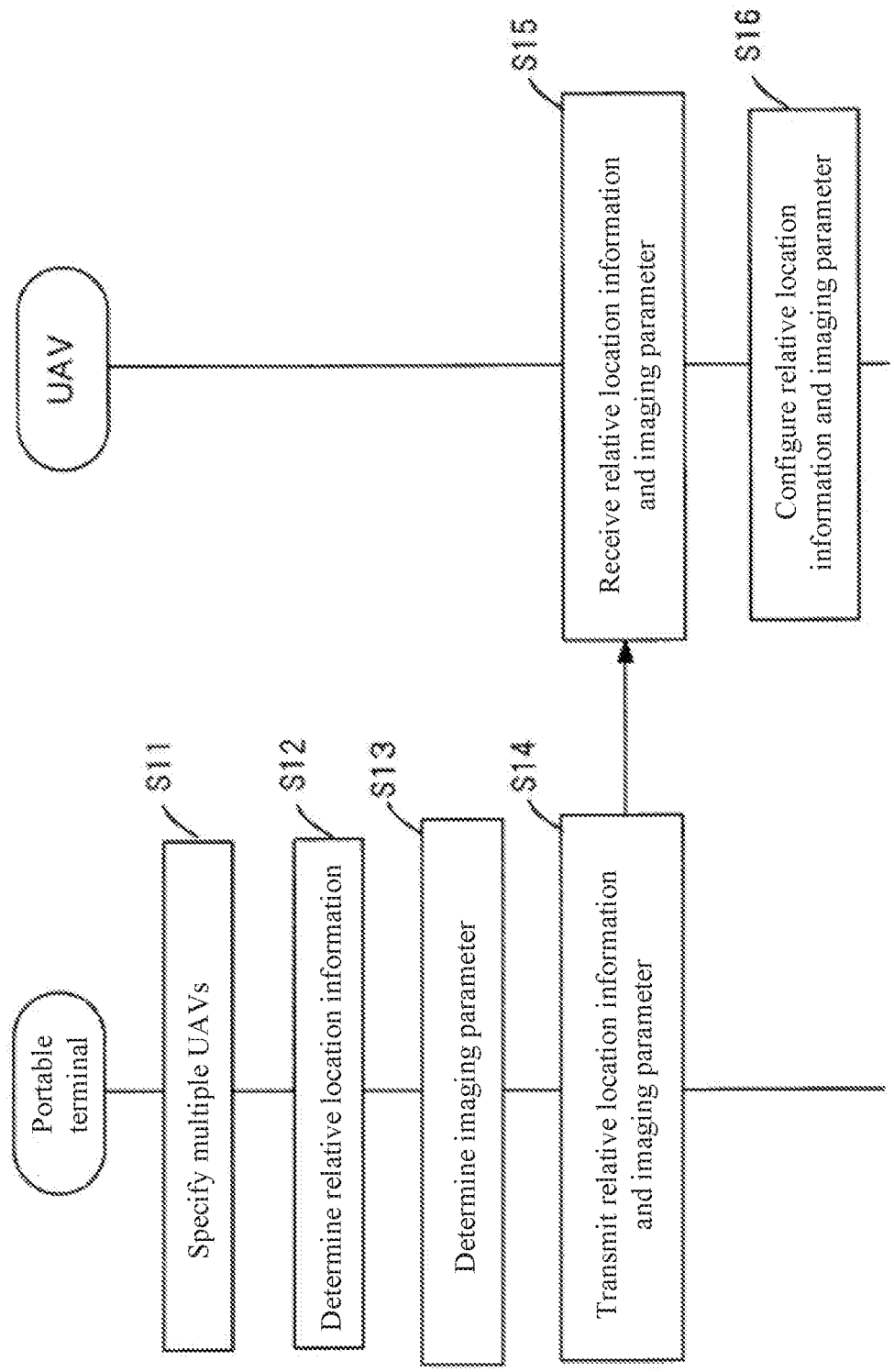
FIG. 20 is a flow chart illustrating operations of a flight system, according to an example embodiment.

FIG. 20 is a flow chart illustrating the operations of the flight system 10.

The location information acquisition member 812 may specify multiple UAVs 100 that forms a flight group from multiple UAVs 100 (S11). The relative location processing member 813 may determine relative location information of the multiple UAVs 100 that belong to the same flight group (S12). The imaging information processing member 814 may determine imaging parameters (e.g., imaging direction and field of view information) of each of the multiple UAVs 100 (S13). The wireless communication device 85 or the interface member 82 may transmit the determination information (e.g., the relative location information and the imaging parameters) to each of the multiple UAVs 100 (S14).

In each of the multiple UAVs 100, the communication interface 150 may receive the determination information from the portable terminal 80 (S15). The UAV controller 110 may set or configure the determination information by storing the received determination information in the storage device 160, thereby setting the relative location information and the imaging parameters (S16). Before the multiple UAVs 100 fly in collaboration, the relative location information may be set (e.g., saved in the storage device 160) for each of the UAVs 100.

In addition, S14 shows a situation where the portable terminal 80 transmits the determination information. Other methods may be used to output the determination information. For example, the processor 81 may record the determination information in any suitable recording medium. Under this condition, even if the UAV 100 and the portable terminal 80 cannot communicate with one another, the determination information may be set for each UAV 100 based on the recording medium.

Through the portable terminal 80, when the transmitter 50 is used to instruct the flight control during the flight of the UAV 100, the relative location information of multiple UAVs 100 of the flight group may be determined. The determined information may be set for the UAV 100. The portable terminal 80 may perform flight operation for the UAV 100 through the transmitter 50. Even for a flight path or flight location that is not set a priori, multiple UAVs 100 can still fly in collaboration. Even when the UAVs 100 fly in collaboration, the portable terminal 80 may specify the flight path in real time through the transmitter 50, thereby increasing the flexibility of the UAV in a collaborative flight. In addition, by providing the relative location information to each UAV 100 of the flight group, the portable terminal 80 may cause multiple UAVs to fly in collaboration through a single transmitter 50.

In addition, through the flight system 10, when instructing the flight control through the transmitter 50 during a flight of the UAV 100, relative location information of the multiple UAVs 100 belonging to the same flight group may be determined. The determined information may be set for the UAV 100. The flight system 10 may perform flight operations for the UAV 100 through the transmitter 50. Even for a flight path or a flight location that is not set a priori, multiple UAVs 100 may still fly in collaboration. As such, even when the UAVs fly in collaboration, the flight system 10 may use the transmitter to specify the flight path, etc., in real time, thereby increasing the flexibility of the UAV in collaborative flight. In addition, by providing the relative location information to each UAV 100 in the flight group, the flight system 10 may cause multiple UAVs to fly in collaboration through a single transmitter 50.

The above described that the portable terminal 80 may use GPS to detect location information of multiple UAVs 100, display the location information on the display screen 88, and adjust the relative location relationship between the UAV images G11~G13 through a touch operation or drag operation. Alternatively, the relative location processing member 813 may calculate, based on multiple location information (e.g., absolute location information) detected through GPS of each of multiple UAVs 100, a difference between the multiple location information, and may determine the difference as the relative location information of the multiple UAVs 100.

In other words, based on the location information obtained by the GPS, the portable terminal 80 may determine relative location information of multiple UAVs 100 without operations through the operation member 83. As such, no special operation is needed to determine the relative location information, thereby increasing the convenience for the user.

In addition, the transmitter may include some functions of the portable terminal 80. Under this condition, the transmitter 50 may be omitted. Further, the portable terminal 80 may include some functions of the transmitter 50. Under this condition, the transmitter 50 may also be omitted.

Next, consider the scenario where the relative location information is set for multiple UAVs of a flight group, and the UAVs fly according to operation signals of the transmitter. The relative location information may be the same as the relative location information described above.

Figure 21:
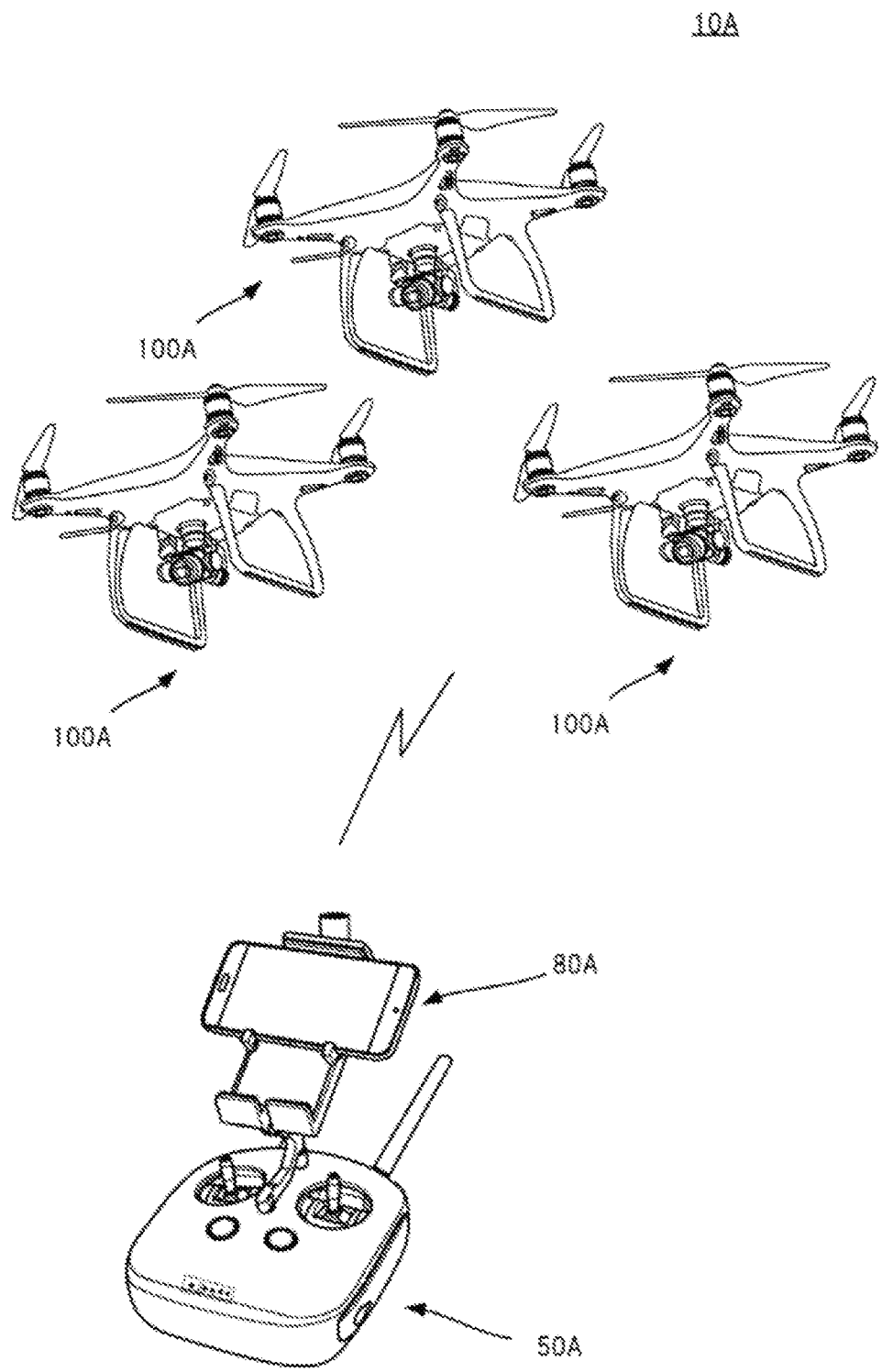
FIG. 21 is a schematic illustration of a configuration of a flight system, according to another example embodiment.

FIG. 21 is a schematic illustration of the configuration of a flight system 10A. The flight system 10A includes a UAV 100A, a transmitter 50A, and a portable terminal 80A. The UAV 100A, the transmitter 50A, and the portable terminal 80A may communicate with one another through wired or wireless communication (e.g., wireless LAN). Some configurations and operations may be the same as those described above, which may be omitted or simplified.

Figure 22:
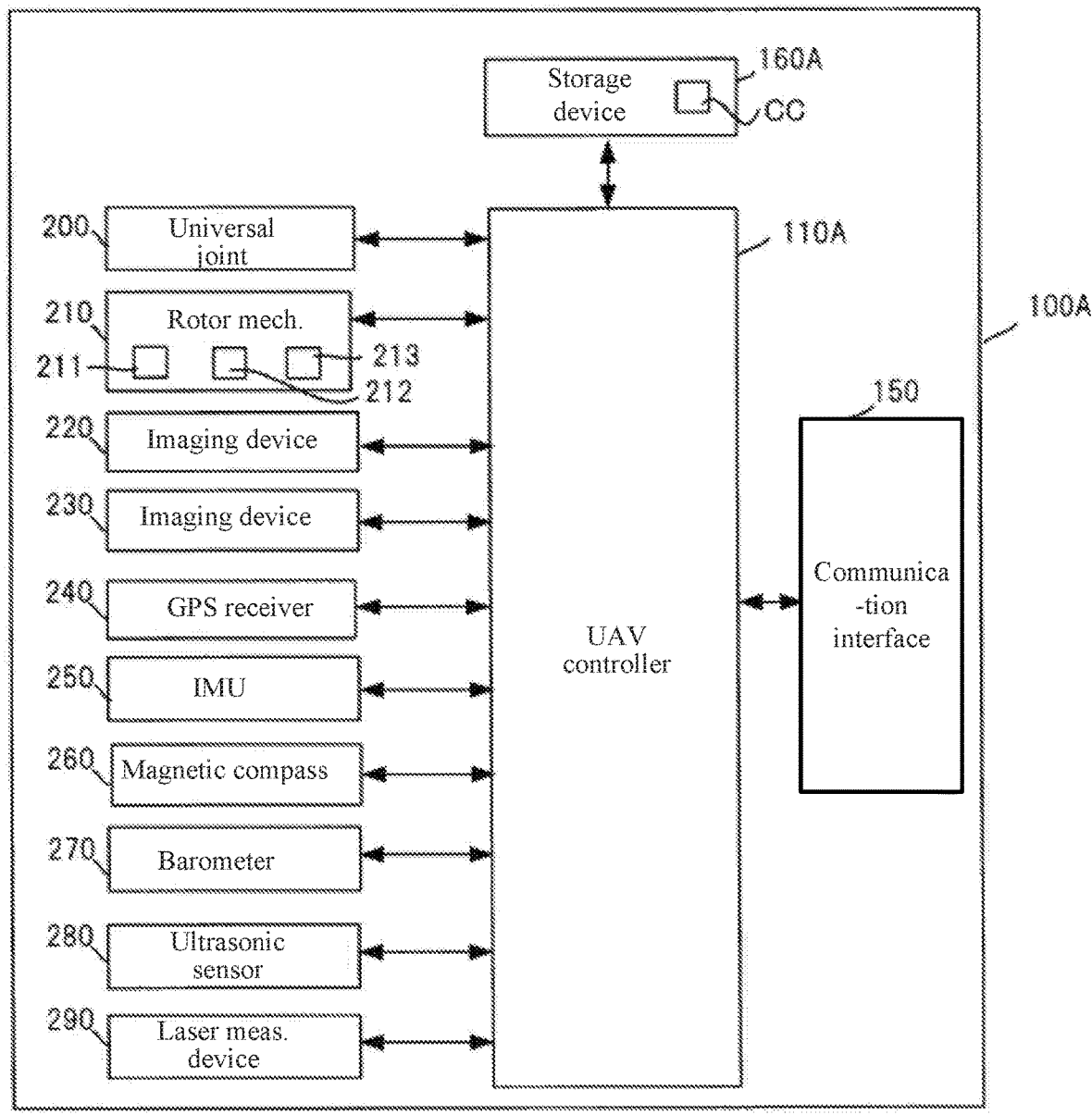
FIG. 22 is a schematic diagram of a hardware configuration of a UAV, according to another example embodiment.

FIG. 22 is a schematic diagram of a hardware configuration of the UAV 100A. Compared with the UAV 100, the UAV 100A includes a storage device 160A that replaces the storage device 160. In the UAV 100A shown in FIG. 22, the configurations that are the same as the UAV 100 shown in FIG. 4 are assigned with the same reference identification, the descriptions of which are omitted or simplified.

The storage device 160A includes functions of the storage device 160, and may store collaborative control information CC. The collaborative control information CC may include control information that ensures the multiple UAVs 100A of the same flight group to fly collaboratively. The collaborative control information may include relative location information of the multiple UAVs 100A of the same flight group. The relative location information may include distance information that indicates a distance between a reference location RP and each of the UAVs 100A. The relative location information may include direction information indicating a direction from the reference location RP to each of the UAVs 100A. The collaborative control information CC may also include imaging parameters (e.g., imaging direction information, field of view information). Before the multiple UAVs 100A fly in collaboration through flight operations of the transmitter 50, the collaborative control information CC may be stored in the storage device 160A.

The storage device 160A may store multiple different collaborative control information CC about the same flight group. In other words, the storage device 160A may store multiple different relative location information of the same flight group.

Figure 23:
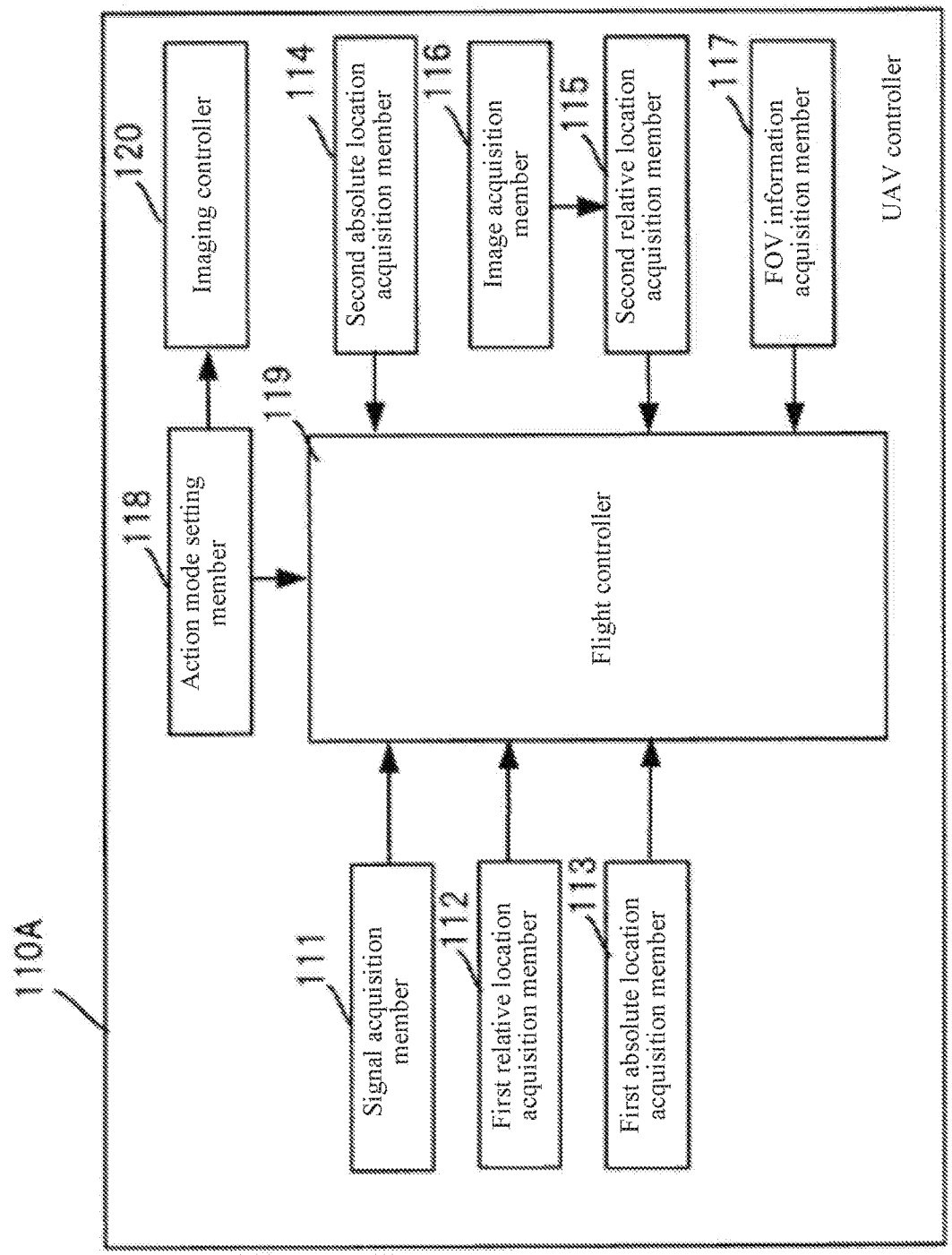
FIG. 23 is a schematic diagram of a functional configuration of the UAV, according to an example embodiment.

FIG. 23 is a schematic diagram of a functional configuration of a UAV controller 110A. The UAV controller 110A may include a signal acquisition member 111, a first relative location acquisition member 112, a first absolute location acquisition member 113, a second absolute location acquisition member 114, an image acquisition member 116, a second relative location acquisition member 115, a field of view ("FOV") information acquisition member 117, an action mode setting member 118, a flight controller 119, and an imaging controller 120.

The signal acquisition member 111 may be an example of a first acquisition member. The first relative location acquisition member 112 may be an example of a first acquisition member. The first absolute location acquisition member 113 may be an example of a computing member. The second absolute location acquisition member 114 may be an example of a second acquisition member. The second relative location acquisition member 115 may be an example of the computing member. The image acquisition member 116 may be an example of the first acquisition member. The FOV information acquisition member 117 may be an example of the first acquisition member. The flight controller 119 may be an example of a control member. The imaging controller 120 may be an example of the control member.

The signal acquisition member 111 may obtain various signals. The signal acquisition member 11 may obtain, through the communication interface 150, an instruction signal from the transmitter 50A. The instruction signal may be a signal instructing the flight control of the UAV 100A. The instruction signal may include throttle valve instruction information configured to cause the UAV 100A to ascend or descend. The instruction signal may include pitch instruction information configured to cause the UAV 100A to move forward or backward. The instruction signal may include roll instruction information configured to cause the UAV 100A to move forward and to the right (also referred to as "right forward movement") or to move forward and to the left (also referred to as "left forward movement"). The instruction signal may include yaw instruction information (an example of circling around instruction information) configured to cause the UAV 100A to circle around to the right or circle around to the left.

The first relative location acquisition member 112 may obtain relative location information of multiple UAVs 100A belonging to the same flight group. The first relative location acquisition member 112 may obtain the relative location information from the storage device 160. The first relative location acquisition member 112 may obtain the relative location information from an external device (e.g., transmitter 50A) through the communication interface 150.

The relative location information may include, using a reference location RP of the flight group as a reference, relative location information of the UAV 100A ("this UAV") relative to the reference location RP of the flight group. The relative location information may include relative location information of other UAVs ("other UAVs") relative to the reference location RP. Similar to the above descriptions, the reference location RP may include a middle location, a center location, a center of gravity location, or other reference location of the multiple UAVs 100A of the same flight group.

The relative location information may include, using any UAV 100A of the flight group as a reference, the relative location information of this UAV relative to the any UAV 100A. In other words, the location of any UAV 100A may be used as the reference location RP. The relative location information may include, using any UAV 100A of the flight group as the reference, relative location information of other UAVs 100A relative to the any UAV 100A.

When the relative location information of this UAV and other UAVs are included, the first relative location information acquisition member 112 may recognize and obtain relative location information of this UAV by referencing to the identification information of the UAV 100A associated with the relative location information.

The first absolute location acquisition member 113 may generate (e.g., calculate), based on the location information of the reference location RP and the relative location information of the UAV 100A relative to the reference location, location information (e.g., absolute location information) of the UAV 100A (an example of second flight location information). The location information of the reference location may be included in the instruction information from the transmitter 50A, or may be stored in the storage device 160 as previous computation results.

The second absolute location acquisition member 114 may obtain location information of the UAV 100A (an example of first flight location information) obtained through the GPS receiver 240. The second absolute location acquisition member 114 may obtain location information of the UAV 100A obtained through a device other than the GPS receiver 240.

The image acquisition member 116 may obtain images captured by the imaging device 220 or 230 of the UAV 100A. The image acquisition member 116 may obtain images captured by imaging device 220 or 230 of other UAVs 110A through the communication interface 150. The image acquisition member 115 may obtain images stored in the storage device 160. The images stored in the storage device 160 may be images captured by the UAV 100A, and/or images captured by other UAVs 100A.

The second relative location acquisition member 115 may obtain relative location information relative to any object (e.g., any other UAV 100A). The second relative location acquisition member 115 may obtain distance information indicating a distance relative to the any object. The second relative location acquisition member 115 may obtain distance information obtained through the ultrasonic sensor 280. The second relative location acquisition member 115 may obtain distance information obtained through the laser measurement device 290.

The second relative location acquisition member 115 may obtain images captured by the image acquisition member 116. The second relative location acquisition member 115 may calculate and obtain, based on the images, relative location information of the UAV 100A relative to a specific object (e.g., other UAV 100A) included in the images. The second relative location acquisition member 115 may extract a size of the specific object relative to the image, and calculate a distance relative to the specific object, to obtain distance information. If the actual size of the specific object is stored in the storage device a priori, the distance information may be obtained. The second relative location acquisition member 115 may calculate, based on a location of a region of the image mapped with the specific object, a direction of the specific object relative to the UAV 100A.

The second relative location acquisition member 115 may use multiple obtained images as a stereo image to calculate distance information of the specific object mapped in multiple images. Under this condition, even if the actual size of the specific object is unknown, the distance information may be obtained. For example, assuming in the 3 UAVs 100A belonging to the same flight group, one UAV 100A is at the front, two UAVs 100A are at the back, under this condition, the two UAVs 100A at the back may capture images of the one UAV 100A at the front. The second relative location acquisition member 115 may obtain, based on a triangular rule, relative location information (e.g., distance, direction information) of the one UAV 100A at the front relative to the two UAVs 100A at the back.

The FOV information acquisition member 117 may obtain FOV information of the imaging device 220 or 230 from the imaging device 220 or 230 of the UAV 100A. The FOV information acquisition member 117 may obtain, through the communication interface 150, FOV information of imaging device 220 or 230 of other UAVs 110A from other UAVs 100A.

The action mode setting member 118 may set the action mode of the UAV 100A for a flight. The action mode may include a single body action mode when a single UAV 100A is in flight. In the single body action mode, one UAV 100A may fly alone based on the instruction signal received from the transmitter 50A. The action mode may include a collaborative action mode in which multiple UAVs 100A of a same flight group may fly collaboratively. In the collaborative action mode, multiple UAVs 100A of the same flight group may fly collaboratively based on the instruction signal received from the transmitter 50A.

Therefore, the UAV 100A may determine whether to perform collaborative flight when multiple UAVs 100A are in flight based on whether the action mode is set as the collaborative action mode or the single body action mode. The action mode may be set through an operation member (not shown) of the UAV 100A, or may be set based on the instruction information from the transmitter 50A.

The collaborative action mode may include a circling around mode in which multiple UAVs 100A in the same flight group may circle around (e.g., rotate). The circling around mode may include multiple circling around modes, indicating the manners of the circling around.

A first circling around mode may be a circling around mode, in which, the distance between each UAV 100A and the reference location RP is fixed, and each UAV 100A circles around a center point that is the reference location RP. In other words, the first circling around mode may change the absolute location of each UAV 100A, then perform the circling around.

A second circling around mode may be a circling around mode, in which, the location of each UAV 100A is fixed, each UAV 100A circles around a center point that is the UAV 100 itself. In other words, in the second circling around mode, each UAV 100A circles around without changing the absolute location.

The flight controller 119 may fix the relative location relationship between the multiple UAVs 100A of the same flight group and control the flight of this UAV 100A. The flight controller 119 may fix the relation location relationship of the UAV 100A relative to the reference location RP, and control the flight of this UAV 100A. Under this condition, the relative location relationship of each UAV 100A relative to the reference location RP is fixed. Therefore, the relative location relationship among the multiple UAVs 100A of the flight group is also fixed.

Fixing the relative location relationship may include maintaining a distance of the UAV 100A relative to the reference location RP unchanged. Fixing the relative location relationship may also include maintaining an imaging direction of the imaging device 220 or 230 relative to a reference direction (e.g., a forward moving direction when the flight group moves forward) unchanged.

The flight controller 119 may maintain the relative location relationship of each UAV 100A unchanged based on the instruction signal from the transmitter 50A, to control the flight of the UAVs 100A. Therefore, the flight controller 119 may maintain the relative location relationship of each UAV 100A unchanged based on throttle valve instruction information from the transmitter 50A, to control the ascending or descending flight. The flight controller 119 may maintain the relative location relationship of each UAV 100A unchanged based on the pitch instruction information from the transmitter 50A, to control the forward moving or the backward moving in the flight. The flight controller 119 may maintain the relative location relationship of each UAV 100A unchanged based on roll instruction information from the transmitter 50A, to control the forward moving to the right or to the left in the flight. The flight controller 119 may maintain the relative location relationship of each UAV 100A unchanged based on the yaw instruction information from the transmitter 50A, to control the circling around to the right or to the left in the flight.

Regarding a control amount for controlling the flight of the UAV 100A based on the instruction signal from the transmitter 50A, the control amount of each UAV 100A may be the same. For example, when each UAV 100A receives the yaw instruction information, each UAV 100A may have the same circling around amount of the circling around or the same circling around angle.

When the action mode is set as the collaborative action mode, the flight controller 119 may fix the relative location relationship of the multiple UAVs 100A of the same flight group, to control the flight of the UAV 100A. When the action mode is not set as the collaborative action mode, the flight controller 119 may not fix the relative location relationship when controlling the flight of the UAV 100A.

When the action mode is set as the collaborative action mode, the flight controller 119 may change the circling around manner of each UAV 100A of the same flight group based on which circling around mode is set as the circling around mode for the UAV 100A.

In the first circling around mode, the flight controller 119 may perform controls such that the distance between each UAV 100A and the reference location RP is fixed, and each UAV 100A may perform circling around using the reference location RP as a center point. In other words, in the first circling around mode, the flight controller 119 may change the location of each UAV 100A, thereby causing each UAV 100A to circle around.

In the second circling around mode, the flight controller 119 may perform controls, such that the location of each UAV 100A is fixed, and each UAV 100A circles around using itself as a center point. In other words, in the second circling around mode, the flight controller 119 may cause each UAV 100A to circle around without changing the absolute location of each UAV 100A.

Based on multiple different relative location information of the same flight group, the flight controller 119 may control the flight of the multiple UAVs 100A to have different relative location relationships. Therefore, the UAV 100A may change the relative location relationship of multiple UAVs 100A through changing the relative location information.

When the action mode is set as the collaborative action mode, the imaging controller 120 may control, based on the number of UAVs 100A included in the same flight group, an FOV of the imaging device 220 or 230 of the UAV 100A. Information regarding the number of UAVs 100A included in the same flight group may be stored in the storage device 160 a priori. The imaging controller 120 may obtain the information regarding the number of UAVs 100A from the storage device 160.

The imaging controller 120 may obtain FOV information included in imaging parameters stored in the storage device 160, and may control the FOV of the imaging device 220 or 230 based on the FOV information.

The imaging controller 120 may calculate and obtain the FOV of the imaging device 220 or 230. For example, when there are 4 UAVs 100A in a flight group, the imaging controller 120 may calculate 90 degrees that divides a circumference, i.e., 360 degrees, evenly into 4 portions, and may use 90 degrees and more as the FOV of each of the 4 UAVs 100A. Under this condition, the imaging controller 120 may perform controls to make the FOV of each of the 4 UAVs 100A to be more than 90 degrees. For example, when there are 3 UAVs 100A forming a same flight group, the imaging member 120 may calculate 120 degrees to divide a circumference, i.e., 360 degrees, evenly into 3 portions, and may use 120 degrees and more as the FOV of each of the 3 UAVs 100A. Under this condition, the imaging controller 120 may perform controls to make the FOV of each of the 3 UAVs 100A to be more than 120 degrees.

When the action mode is set as the collaborative action mode, the imaging controller 120 may control, based on the number of UAVs 100A included in the same flight group, an imaging direction of the imaging device 220 or 230 of the UAV 100A.

The imaging controller 120 may obtain imaging direction information included in the imaging parameters that are stored in the storage device 160, and control, based on the imaging direction information, the imaging direction of the imaging device 220 or 230.

The imaging controller 120 may calculate and obtain the imaging direction of the imaging device 220 or 230. For example, when there are 4 UAVs 110A forming a same flight group, the imaging controller 120 may calculate and obtain imaging directions having a 90 degree difference, which evenly divides a circumference, i.e., 360 degrees, into 4 portions. When there are 3 UAVs 100A forming the same flight group, the imaging controller 120 may calculate and obtain imaging directions having a 120-degree difference, which evenly divides a circumference, i.e., 360 degrees, into 3 portions. The imaging controller 120 may control the imaging directions of the imaging device 220 or 230 to be the calculated imaging direction.

The imaging controller 120 may control the imaging directions such that, the directions of observing the locations of the multiple UAVs 100A from the reference location RP of the flight group are imaging directions of each of the UAVs 100A.

Figure 24:
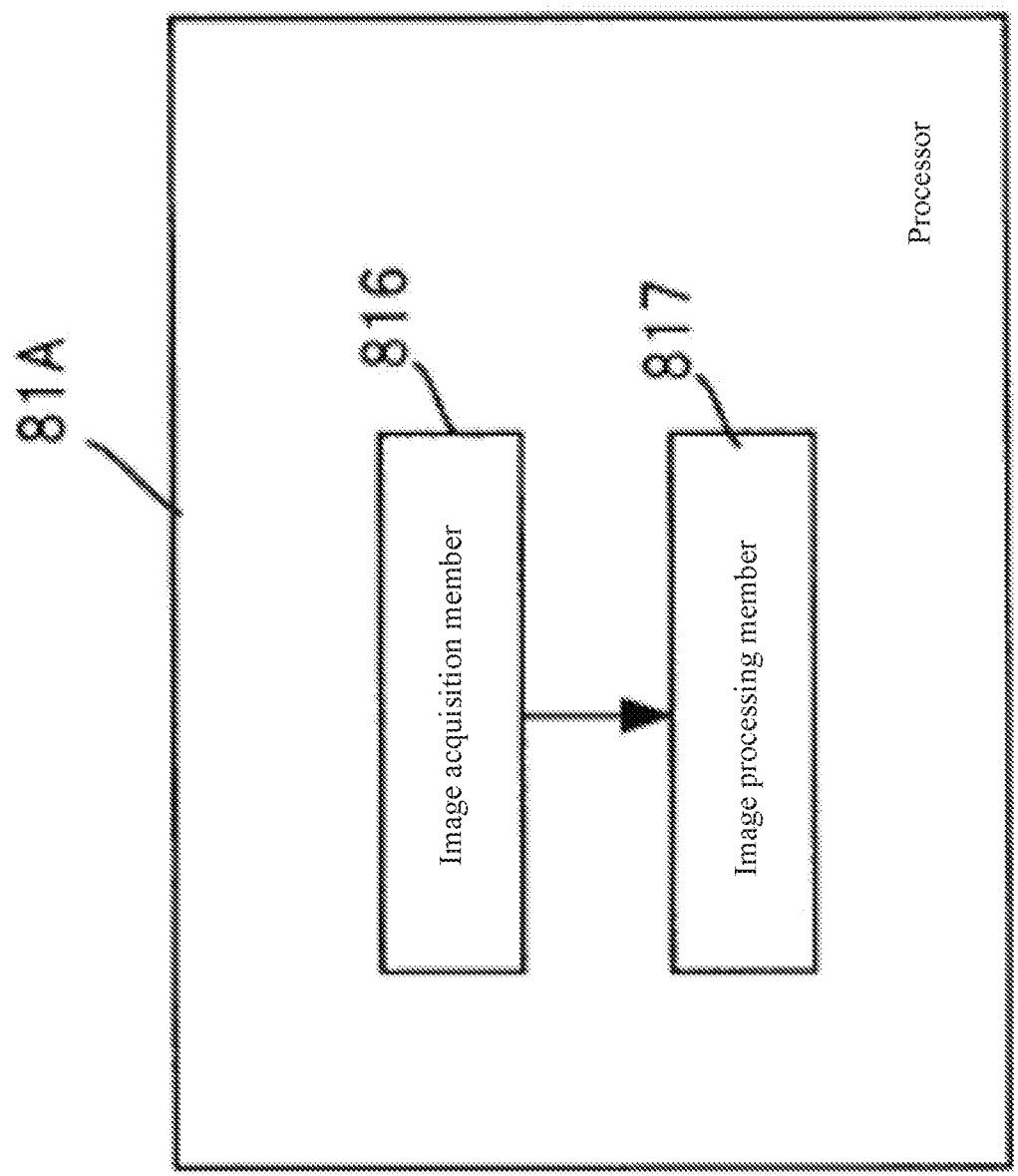
FIG. 24 is a schematic diagram of a functional configuration of a portable terminal, according to another example embodiment.

FIG. 24 is a schematic diagram of a functional configuration of a portable terminal 80A. A processor 81A may execute a program stored in the storage device 87. Therefore, the portable terminal 80A may have functions of an image acquisition member 816 and an image processing member 817.

The image acquisition member 816 may obtain images captured by each of the multiple UAVs 100A of the same flight group. The image acquisition member 816 may obtain the images through the interface member 82 or the wireless communication device 85.

The image processing member 817 may perform any suitable image processing on one or multiple images obtained by the image acquisition member 816. The image processing member 817 may generate, based on multiple images, a panoramic image or a stereo image. The image processing member 817 may generate the panoramic image by synthesizing multiple images having different imaging directions. When multiple images are used to cover a 360-degree omni-direction, the image processing member 817 may generate the omni-directional panoramic image. When two images of adjacent imaging directions included in the multiple images have an overlapping portion in the imaging range, the image processing member 817 may generate a stereo image. The two adjacent images may have an overlapping portion in the imaging range. When multiple images are used to cover the 360-degree omni-direction, the image processing member 817 may generate an omni-directional stereo image.

In addition, a device other than the portable terminal 80A may be used to perform image processing such as generating the panoramic image or the stereo image based on the captured images. In some embodiments, the transmitter 50A or any one or more than one of the UAV 100A, a Personal Computer ("PC") (not shown) may be used to perform the image processing. For example, during the flight of each UAV 100A, the image captured by each UAV 100A may be stored in a secure digital ("SD") card of the storage device 160 included in each UAV 100A. After each UAV 100A is landed, the multiple images stored in the SD card may be transferred to the PC to perform the image processing.

Next, the rotation manners of the rotor 211 corresponding to the types of the instruction signal from the transmitter 50A will be described.

The flight controller 119 may control, based on the instruction signal from the transmitter 50A, the flight of the UAV 100A. Under this condition, the flight controller 119 may control the rotation speed (e.g., the rotation speed in a unit time) of each rotor 211.

Figure 25:
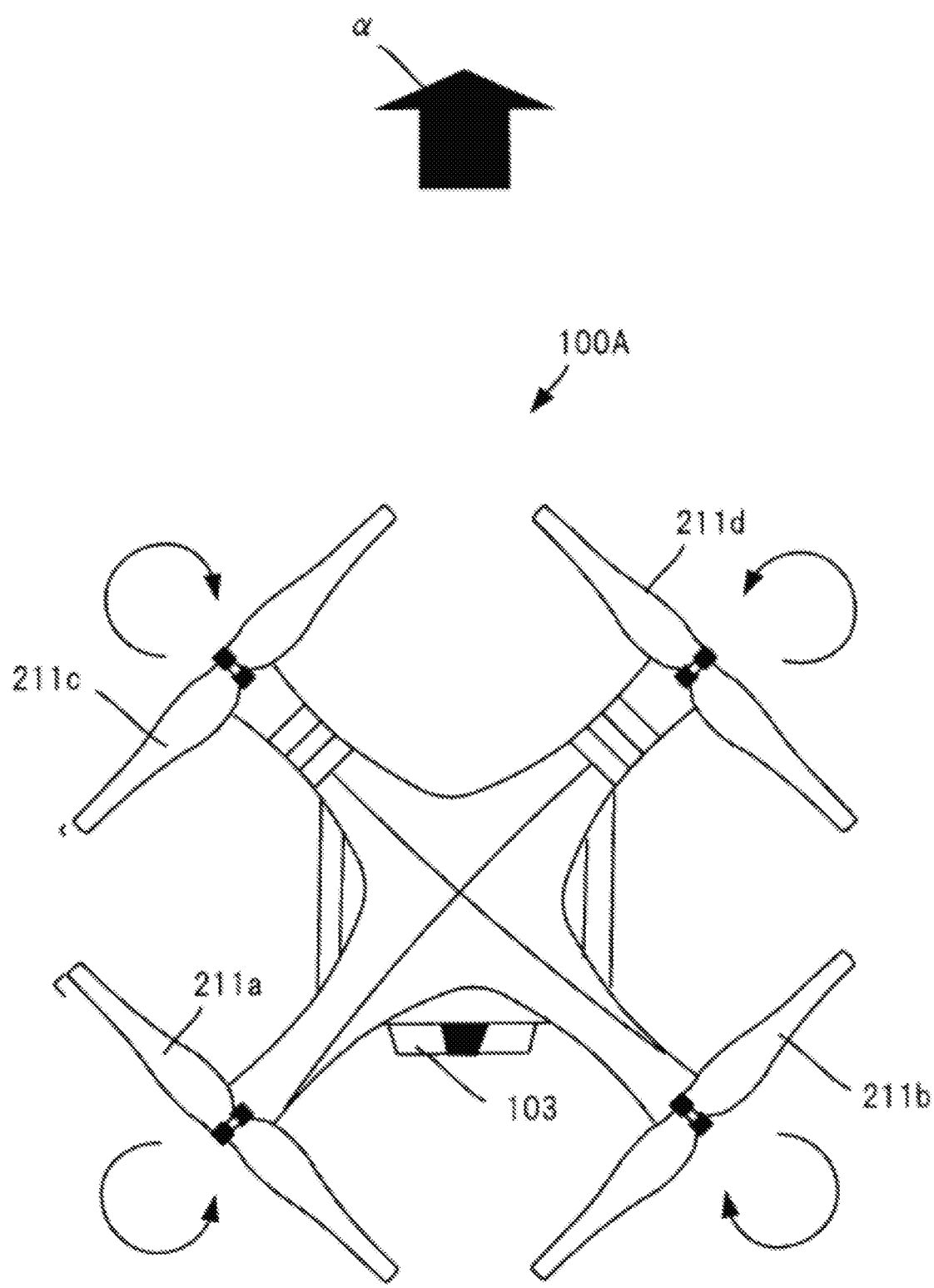
FIG. 25 is a schematic illustration of rotation methods of rotors corresponding to types of instruction signals from the transmitter, according to an example embodiment.

FIG. 25 illustrates rotation manners of the rotor 211 corresponding to types of the instruction signal from the transmitter 50A. As shown in FIG. 24, in a top view from above the UAV 100A, relative to the UAV body 102, a direction opposite to the direction where battery 103 is mounted (i.e., the direction indicated by the arrow α) may be the forward moving direction when the UAV 100A moves forward. The four rotors 211 may include rotor 211a, 211b, 211c, 211d. Rotors 211a, 211d may rotate counter-clockwise, and rotors 211b, 211c nay rotate clockwise. The instruction signal from the transmitter 50A may include at least one of throttle valve instruction information, pitch instruction information, roll instruction information, and yaw instruction information.

If the throttle valve instruction information is received, the flight controller 119 may control the rotation speeds of the four rotors 211a, 211b, 211c, 211d. The throttle valve instruction information may include ascending instruction information and descending instruction information. If the ascending instruction information is received, the flight controller 119 may increase the rotation speeds of the four rotors 211a~211d. If the rotation speeds of the four rotors 211a~211d are increased, the UAV 100A may ascend. If descending instruction information is received, the flight controller 119 may reduce the rotation speeds of the four rotors 211a~211d. If the rotation speeds of the four rotors 211a~211d are reduced, the UAV 100A may descend.

If the pitch instruction information is received, the flight controller 119 may control the rotation speeds of the rotors 211a, 211b located at the back of the UAV 100A, or the rotors 211c, 211d located at the front of the UAV 100A. The pitch instruction information may include moving-forward instruction information and moving-backward instruction information. If the moving-forward instruction information is received, the flight controller 119 may increase the rotation speeds of two rotors 211a, 211b. If the rotation speeds of two rotors 211a, 211b are increased, the UAV 100A may move forward in the direction indicated by the arrow α. If the moving-backward instruction information is received, the flight controller 119 may increase the rotation speeds of two rotors 211c, 211d. If the rotation speeds of two rotors 211c, 211d are increased, the UAV 100A may move backward.

If roll instruction information is received, the flight controller 119 may control the rotation speeds of rotors 211a, 211c that are located at the left side of the UAV 100A, or rotors 211b, 211d that are located at the right side of the UAV 100A. The roll instruction information may include right forward movement instruction information and left forward movement instruction information. If right forward movement instruction information is received, the flight controller 119 may increase the rotation speeds of two rotors 211a, 211c. If the rotation speeds of two rotors 211a, 211c are increased, the UAV 100A may move forward and to the right. If left forward movement instruction information is received, the flight controller 119 may increase the rotation speeds of two rotors 211b, 211d. If the rotation speeds of two rotors 211b, 211d are increased, the UAV 100A may move forward and to the left.

If the yaw instruction information is received, the flight controller 119 may control the rotation speeds of rotors 211a, 211d, or rotors 211b, 211c, which are located on the diagonal of the UAV 100A. The yaw instruction information may include right circling around instruction information and left circling around instruction information. If the right circling around instruction information is received, the flight controller 119 may increase the rotation speeds of two rotors 211b, 211c. If the rotation speeds of two rotors 211b, 211c are increased, the UAV 100A may circle around to the right. If the left circling around instruction information is received, the flight controller 119 may increase the rotation speeds of two rotors 211a, 211d. If the rotation speeds of two rotors 211a, 211d are increased, the UAV 100A may circle around to the left.

Next, a method for maintaining the relative location relationship of the multiple UAVs 100A will be described.

The flight controller 119 may control the flight of the UAV 100A such that the relative location information included in the collaborative control information CC that is stored (or set) in the storage device 160 is consistent with the relative location information obtained by the second relative location acquisition member 115.

The relative location information included in the collaborative control information CC is information obtained prior to the flight, or referred to as predictive value of the relative location information in a collaborative flight. The relative location information obtained by the second relative location acquisition member 115 is information obtained based on certain information during the flight, or may be referred to as the actual value of the relative location information in an actual collaborative flight.

The relative location information obtained by the second relative location acquisition member 115 may include information obtained from image captured by a UAV 100A photographing in directions of the other UAVs 100A.

The flight controller 119 may provide feedback, and may control flight such that the distance information and direction information between a UAV 100A and other UAVs 100A obtained through the captured images are fixed. As such, the distance information and the direction information may be maintained to be fixed, to maintain the relative location relationship between a UAV 100A and other UAVs 100A. In addition, because captured images are used, only imaging device 220 or 230 may be configured, and special sensors (e.g., the GPS receiver 240, the ultrasonic sensor 280, and the laser measurement device 290) need not be configured to maintain the relative location relationship.

The relative location information included in the collaborative control information CC may include distance information between a UAV 100A and the other UAVs 100A. The relative location information obtained by the second relative location acquisition member 115 may include distance information of a UAV 100A and other UAVs 100A. In other words, the flight controller 119 may control the flight of the UAV 100A, such that the distance information included in the collaborative control information CC is consistent with the distance information obtained by the second relative location acquisition member 115.

The distance information included in the collaborative control information CC may be information obtained prior to the flight, or may be referred to as a predictive value of the distance information during a collaborative flight. The distance information obtained by the second relative location acquisition member 115 may be information obtained based on certain information during the flight, or may be referred to as the actual value of the distance information during an actual collaborative flight.

The flight controller 119 may provide feedback, and control the flight such that the distance information between a UAV 100A and other UAVs 100A obtained by the ultrasonic sensor 280 or the laser measurement device 290 is fixed. As such, the distance information may be maintained to be fixed to maintain the relative location relationship between a UAV 100A and other UAVs 100A. In addition, distance information of increased accuracy may be obtained by the UAV 100A through the ultrasonic sensor 280 or the laser measurement device 290.

The flight controller 119 may control the flight of the UAV 100A such that location information of the UAV 100A obtained by the first absolute location acquisition member 113 and location information of the UAV 100A obtained by the second absolute location acquisition member 114 are consistent.

The location information of the UAV 100A obtained by the first absolute location acquisition member 113 may be information obtained prior to the flight, or may be referred to as a predictive value of the absolute location information of the UAV 100A during a collaborative flight. The location information of the UAV 100A obtained by the second absolute location acquisition member 114 may be information obtained based on certain information during the flight, or may be referred to as the actual value of the absolute location information of the UAV 100A during an actual collaborative flight.

The flight controller 119 may provide feedback, and control the flight such that location information of the UAV 100A obtained through the GPS receiver 240 is consistent with location information of the UAV 100A derived based on the relative location information prior to the flight. As such, the relative location relationship between the UAV 100A and other UAVs 100A may be maintained. In addition, the mounting of the GPS receiver 240 is relatively easy, making it simple to maintain the relative location relationship.

The flight controller 119 may control the flight of the UAV 100A, and maintain a difference between the FOV information of the UAV 100A (this UAV) obtained by the FOV information acquisition member 117 and the FOV information of the other UAVs 100A (other UAVs).

If the relative location relationship changes, then the field of views of each imaging device 220 or 230 of multiple UAVs 100A when photographing the same object to be imaged may change. Therefore, the difference between the FOVs of each imaging device 220 or 230 may change. To ensure that the FOV difference is fixed, the flight controller 119 may maintain the relative location relationship of multiple UAVs 100A by performing a feedback control of the UAV 100A. In addition, because the FOV information of the imaging device 220 or 230 is used, there is no need to configure special sensors (e.g., the GPS sensor 240, the ultrasonic sensor 280, or the laser measurement device 290) to maintain the relative location relationship.

Next, the flight shape of the multiple UAVs 100A that maintain the relative location relationship will be described.

Figure 26:
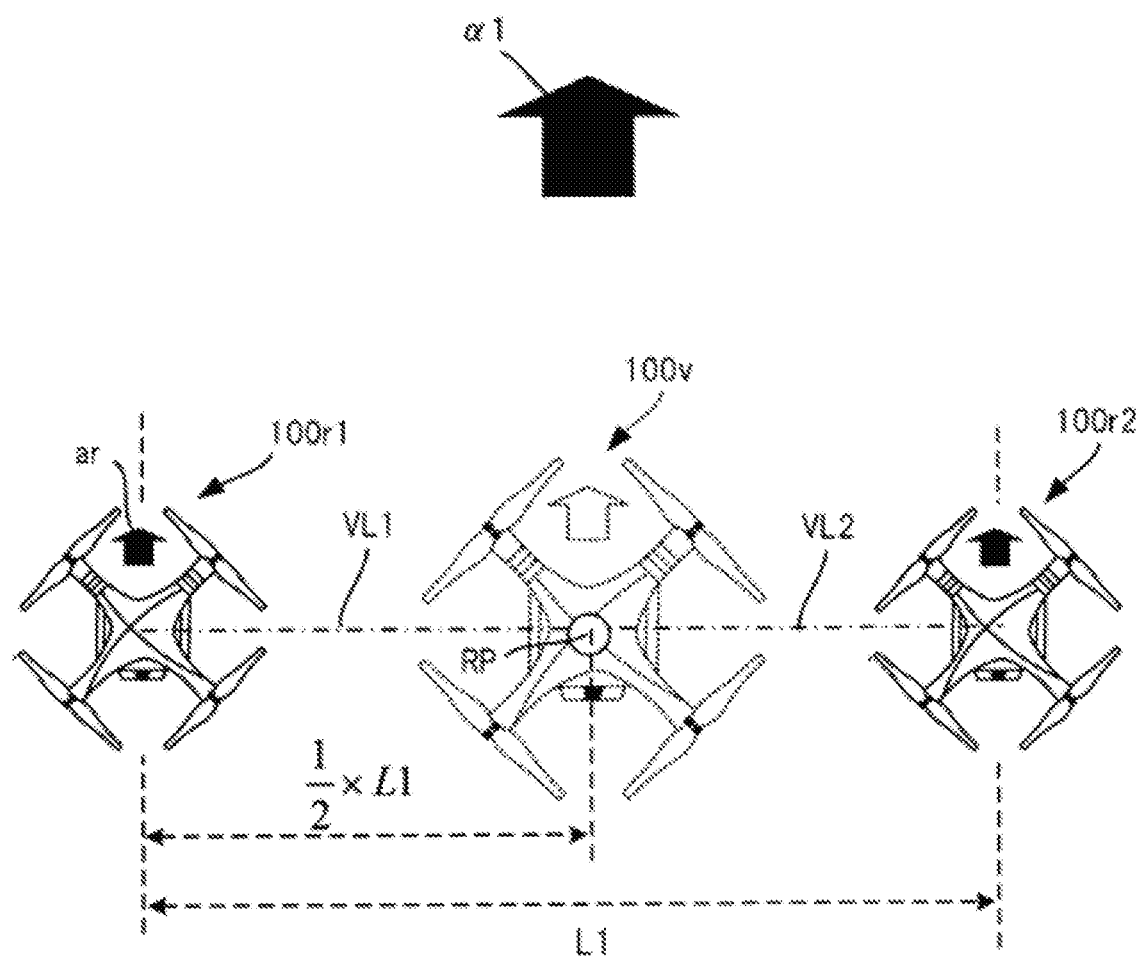
FIG. 26 is a schematic illustration of multiple UAVs that form a flight group and a virtual UAV located at a reference location, according to an example embodiment.

FIG. 26 schematically illustrates multiple UAVs 100A that form a flight group and a virtual UAV 100v located at a reference location RP. In FIG. 26, as an example of multiple UAVs 100A, two UAVs 100r1, 100r2 are shown. The virtual UAV 100v represents a virtual UAV located at the reference location RP. The virtual straight lines VL1, VL2 are straight lines that virtually connect the reference location RP, i.e., the virtual UAV 100v, and the UAVs 100r1, 100r2.

In FIG. 26, the two UAVs 100r1, 100r2 are symmetrically arranged relative to the reference location RP. Therefore, the virtual straight line VL1 connecting the reference location RP and UAV 100r1, and the virtual straight line VL2 connecting the reference location RP and the UAV 100r2 are on the same single straight line. In some embodiments, the multiple virtual straight lines VL1, VL2 may not be the same straight line.

In FIG. 26, moving directions of each UAV 100r1, 100r2 in the flight group when moving forward are the up direction indicated by the arrow α1. The moving direction of the flight group may change based on the instruction signal from the transmitter 50A.

In addition, in FIG. 26, the arrow ar depicted in each UAV 100A (e.g., UAV 100r1, 100r2) indicates the facing directions of the imaging device 220 or 230, i.e., the imaging direction. The same also applies to the following descriptions.

The transmitter 50A may instruct the flight control of each of UAVs 100r1, 100r2. The transmitter 50A may use the absolute location of the virtual UAV 100v as a reference to provide an instruction signal to each of the UAVs 100r1, 100r2. Each UAV 100A may fix the relative location relationship relative to the reference location RP, i.e., the virtual UAV 100v. Therefore, flight control of each UAV 100r1, 100r2 may be performed without changing the length of the virtual straight line VL, and without changing the location relationship of each UAV 100r1, 100r2 relative to the reference location RP.

In each UAV 100r1, 100r2, even if the instruction signal from the transmitter 50A includes any instruction information related to the flight (e.g., throttle valve instruction information, pitch instruction information, roll instruction information, and yaw instruction information), the flight controller 119 may still maintain the relative location relationship of the multiple UAVs 100r1, 100r2 that fly collaboratively unchanged, i.e., fix the relative location relationship, and control the flight based on the instruction information from the transmitter 50A. As such, each UAV 100r1, 100r2 may fly collaboratively based on the instruction signals from a single transmitter 50A. Based on the result of operating the virtual UAV 100v, the transmitter 50A may more easily instruct the flight control of the multiple UAVs 100r1, 100r2.

Figure 27:
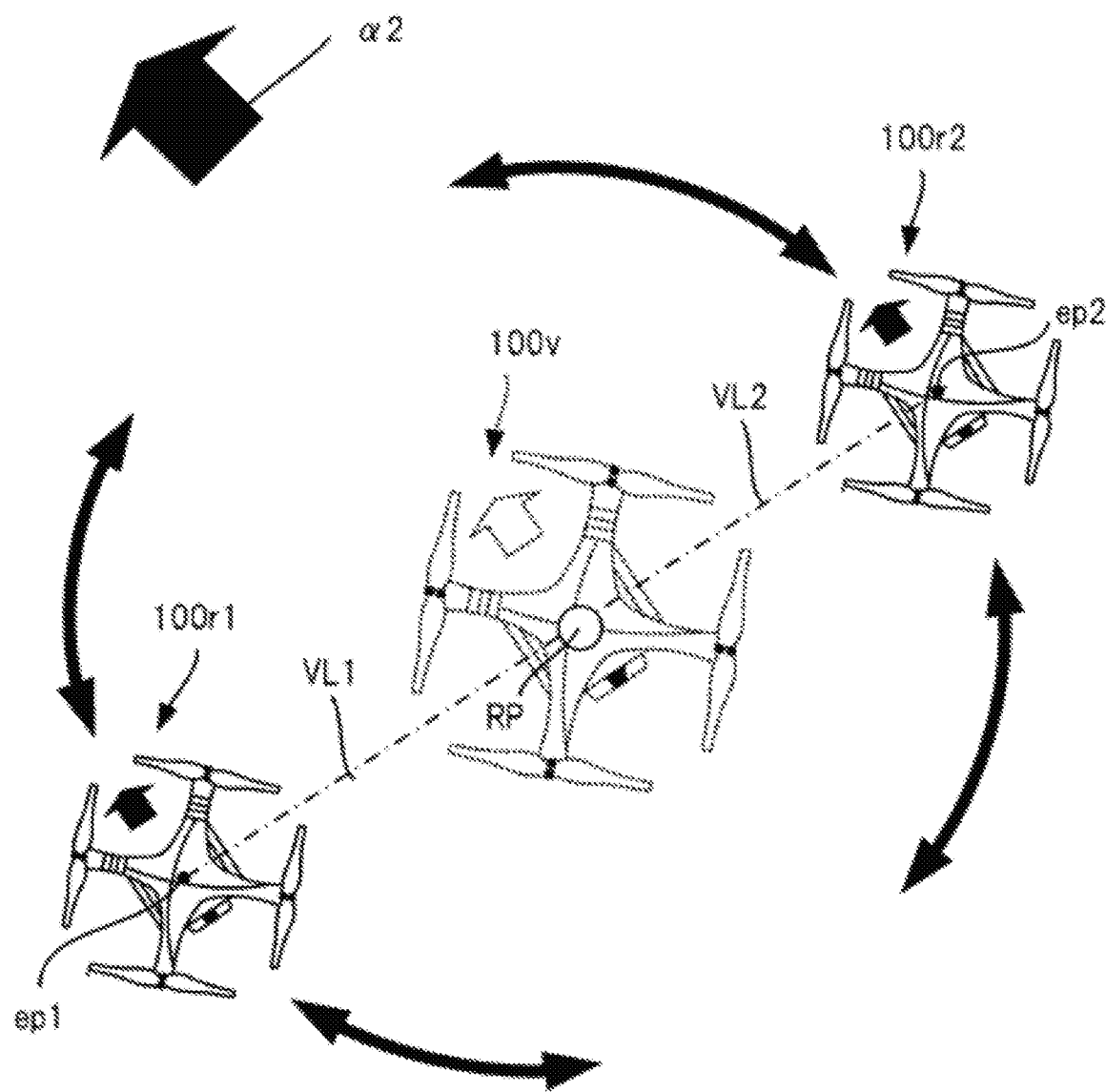
FIG. 27 is a schematic illustration of circling around of a UAV in a first circling around mode, according to an example embodiment.

FIG. 27 schematically illustrates each UAV 100A circles around when the action mode is set as the collaborative action mode and the first circling around mode.

In the first circling around mode, the distance between each UAV 100r1, 100r2 and the reference location RP is fixed. Each UAV 100r1, 100r2 may circle around using the reference location RP as a center point. In other words, the virtual straight line VL may circle around using the reference location RP as a center point. Each UAV 100r1, 100r2 located at the ends ep1, ep2 of the virtual straight lines VL1, VL2 may also circle around along with the virtual straight line VL. From the perspective of the transmitter 50A, the transmitter 50A transmits yaw instruction information to the virtual UAV 100v. Each UAV 100r1, 100r2 receives the yaw instruction information, and based on the yaw instruction information, fixes the relative location relationship and circles around.

In FIG. 27, the moving directions of each UAV 100r1, 100r2 in the flight group are the up-left direction indicated by the arrow α2. In other words, the moving directions of each UAV 100r1, 100r2 in the flight group may change from arrow α1 to arrow α2 based on the yaw instruction information from the transmitter 50A.

Based on the circling around in the first circling around mode, multiple UAVs 100A that fly collaboratively may circle around based on the rotation of the virtual straight line CL. Under this condition, the angle formed by the moving direction α2 and the virtual straight lines VL1, VL2 may not change. Therefore, even when each UAV 100r1, 100r2 circles around, the location relationship of the imaging ranges for imaging by the UAV 100r1, 100r2 may not change. As such, when generating a panoramic image based on multiple images captured by the UAV 100r1, 100r2, the location relationship of the captured images may not change because of the UAV 100r1, 100r2 that contributed to the generation of the panoramic image. Therefore, the operator of the transmitter 50A may operate multiple UAVs 100A based on the same interval that the virtual UAV 100v circles around. The virtual UAV 100v may include an imaging device having a wide imaging range.

Figure 28:
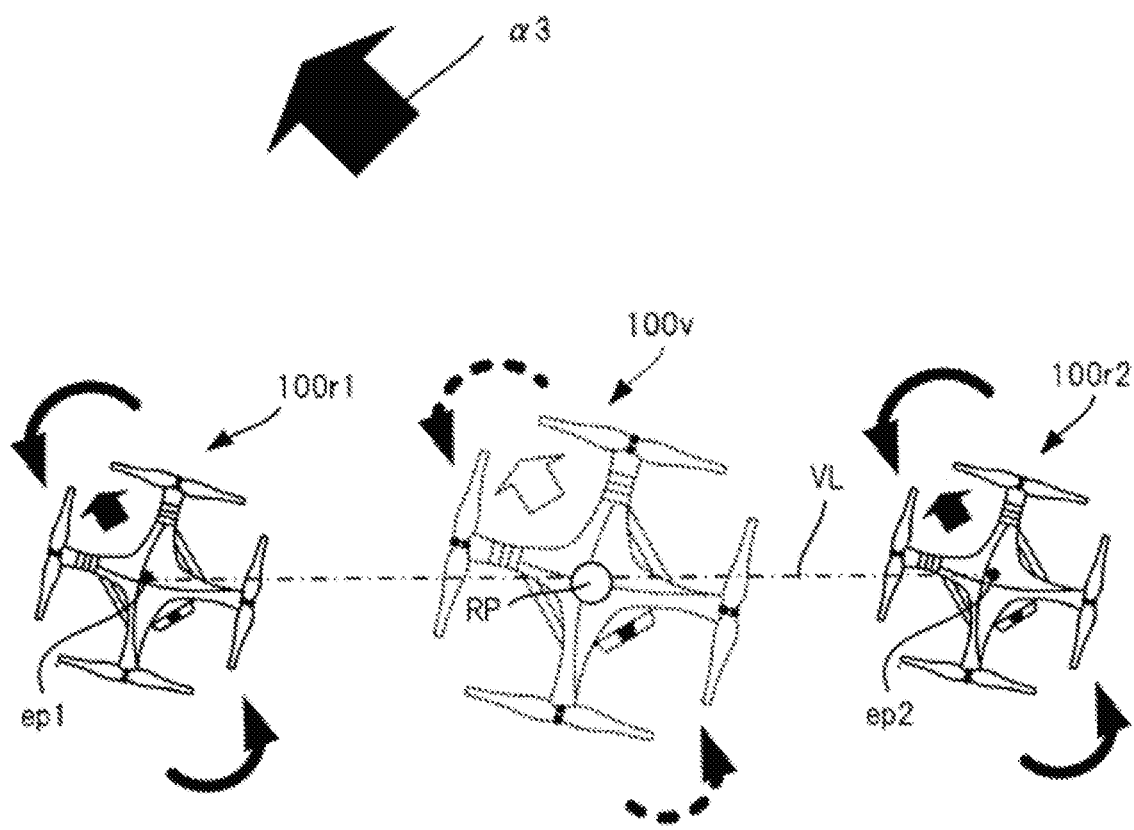
FIG. 28 is a schematic illustration of circling around of a UAV in a second circling around mode, according to an example embodiment.

FIG. 28 schematically illustrates circling around of each UAV 100A when the action mode is set as the collaborative action mode and the second circling around mode.

In the second circling around mode, the location of each UAV 100r1, 100r2 may be fixed, and each UAV 100r1, 100r2 may circle around using itself as a center point. That is, the virtual straight line VL does not circle around, and each UAV 100r1, 100r2 located at the ends ep1, ep2 of the virtual straight lien VL circles around at the ends ep1, ep2. Because the virtual straight line VL does not circle around, based only on the yaw instruction information, the absolute location of each UAV 100r1, 100r2 may not change. From the perspective of the transmitter 50A, the transmitter 50A may transmit the yaw instruction information to the virtual UAV 100v. Each UAV 100r1, 100r2 receives the yaw instruction information, and based on the yaw instruction information, fixes the relative location relationship and circles around.

In FIG. 28, the moving directions of the UAVs 100r1, 100r2 of the flight group are the up-left direction indicated by an arrow α3. In other words, the moving direction of each UAV 100r1, 100r2 of the flight group may change from arrow α1 to arrow α3 based on the yaw instruction information from the transmitter 50A.

Based on the circling around in the second circling around mode, the flight system 10A may make the multiple UAVs 100A that fly in collaboration circle around while the virtual straight line VL does not rotate. Therefore, compared with the first circling around mode, in the second circling around mode, the flight range of the flight of the multiple UAVs 100A based on the yaw instruction information becomes narrower. In other words, in the first circling around mode, the virtual straight line VL may rotate using the reference location RP as a center point. As such, the flight path of each UAV 100A in the flight group may have a circle shape. The inside of the circle may be the flight range needed for the circling around. In the second circling around mode, the straight line range indicated by the virtual straight line VL becomes the flight range needed for the circling around. Therefore, even if multiple UAVs 100A moves forward in a relatively narrow space, each UAV 100A may fly according to the yaw instruction information.

Figure 29:
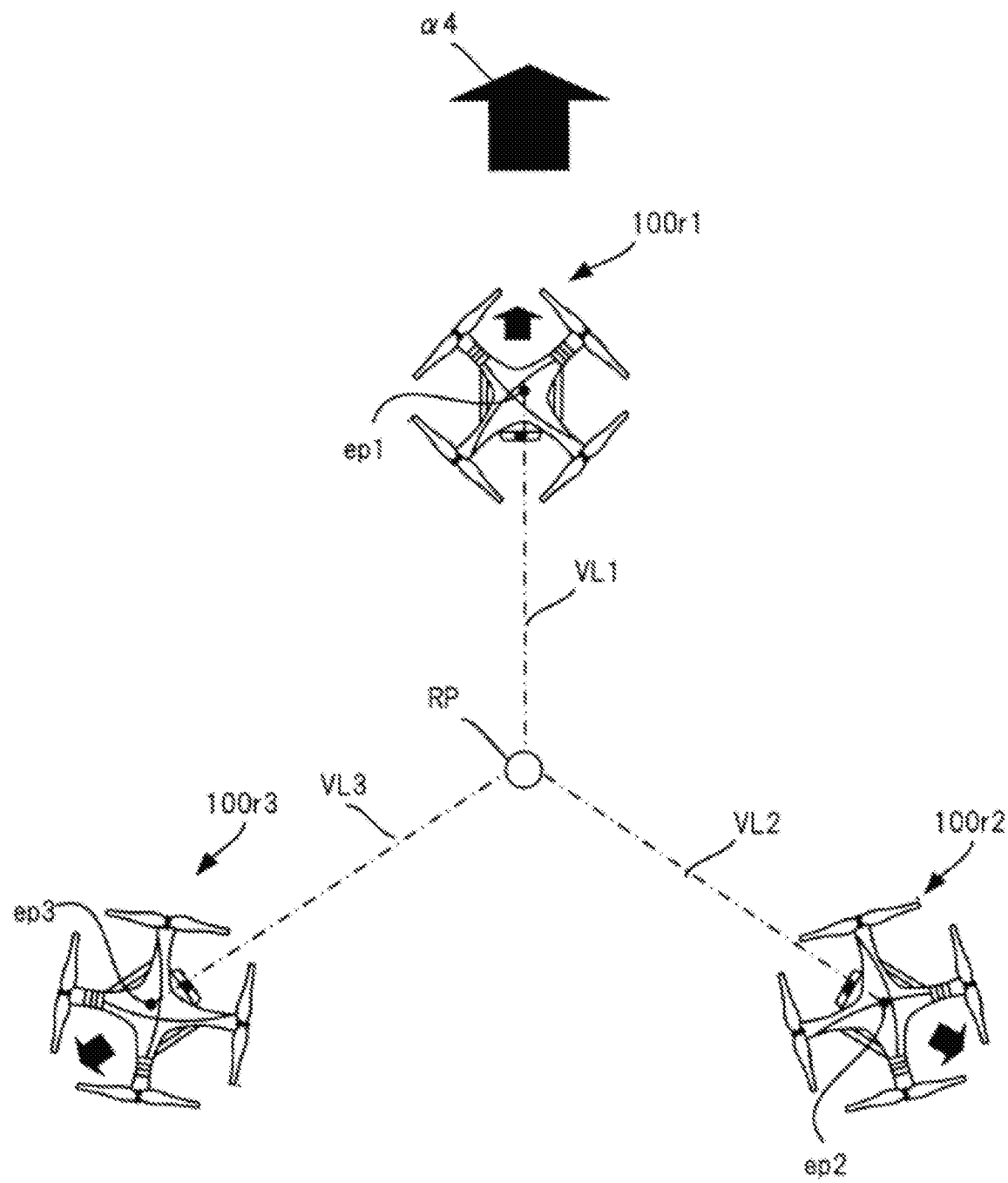
FIG. 29 is a schematic illustration of a first arrangement of 3 UAVs that form a flight group when they are in flight, according to an example embodiment.

FIG. 29 schematically illustrates a first arrangement of three UAVs 100r1, 100r2, 100r3 of the flight group during a flight.

In FIG. 29, three UAVs 100r1, 100r2, 100r3 are arranged at the locations of the apexes of an equilateral triangle and have an equal distance to the reference location RP. Each virtual straight line connecting the reference location RP and the three UAVs 100r1~100r3 may be represented by virtual straight lines VL1, VL2, VL3. The three UAVs 100r1~100r3 may be located at the ends ep1, ep2, ep3 of the virtual straight lines VL1~VL3. In FIG. 29, the moving directions of each UAV 100r1~100r3 may be the up-left direction indicated by an arrow α4.

In FIG. 29, the imaging direction of each UAV 100r1~100r3 may use the reference location RP as the starting point, and may be consistent with the extending directions of virtual straight lines VL1~VL3. Therefore, the imaging directions may have a uniform difference of 120 degrees. The imaging directions of each UAV 100r1~100r3 may be set through the imaging controller 120 of each UAV 100r1~100r3. In addition, the FOV of the imaging device 220 or 230 of each UAV 100r1~100r3 may be set to be more than 120 degrees.

Each UAV 100r1~100r3 may transmit images captured by imaging device 220 or 230 of each UAV 100r1~100r3 to the portable terminal 80A. The portable terminal 80A may receive the captured images from each UAV 100r1~100r3.

The portable terminal 80A may obtain multiple images captured in imaging directions separated by 120 degrees and using FOVs of more than 120 degrees. Under this condition, a panoramic image may be generated based on images captured by at least two of the UAVs 100r1~100r3. The portable terminal 80A may generate an omni-direction panoramic image based on the images captured by the UAVs 100r1~100r3.

In addition, based on the number of the UAVs 100A belonging to the same flight group, the arrangement of the multiple UAVs 100A of the flight group may be determined to ensure a panoramic image can be generated. In other words, based on the number of UAVs 100A, the first relative location acquisition member 112 may automatically arrange each UAV 100A. Under this condition, the first relative location acquisition member 112 of each UAV 100A may determine a configuration location of each UAV 100A relative to the reference location RP. For example, based on a sequence of the identification numbers of the UAVs 100A, the first relative location acquisition member 112 of each UAV 100A may arrange the UAV 100A such that the UAVs 100A have an equal distance and an equal angle relative to the reference location RP. Under this condition, the UAVs 100r1~100r3 may be arranged at the apexes of the equilateral triangle that has the reference location RP as the center of gravity.

Figure 30:
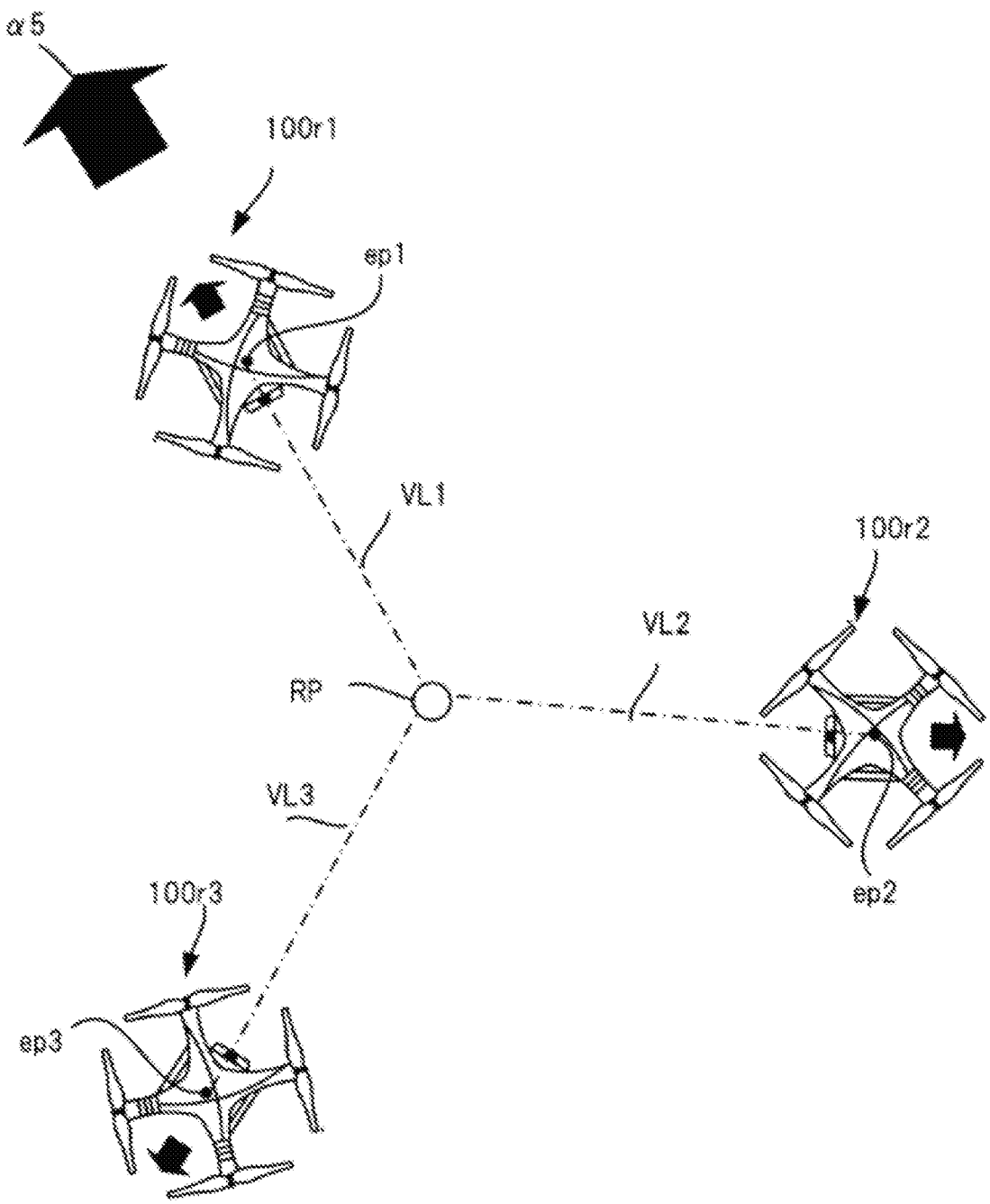
FIG. 30 is a schematic illustration of circling around of 3 UAVs shown in FIG. 29 in the first circling around mode, according to an example embodiment.

FIG. 30 schematically illustrates that the three UAVs 100r1, 100r2, 100r3 shown in FIG. 29 circle around in the first circling around mode.

In FIG. 30, the distances of each UAV 100r1, 100r2, 100r3 relative to the reference location RP may be fixed. Each UAV 100r1, 100r2, 100r3 may circle around using the reference location RP as a center point. In other words, the virtual straight lines VL1, VL2, VL3 may circle around using the reference location RP as a center point, and the UAVs 100r1~100r3 located at the ends ep1, ep2, ep3 of the virtual straight lines VL1~VL3 may correspondingly circle around. In other words, even when more than 3 UAVs 100A form a flight group, each UAV 100A may circle around in the first circling around mode. In FIG. 30, the circling around moving forward directions of each UAV 100r1~100r3 are the up-left direction indicated by an arrow α5.

In addition, although detailed descriptions are omitted, similar to the first circling around mode, even when more than 3 UAVs 100A form a flight group, each UAV 100A may circle around in the second circling around mode.

Figure 31:
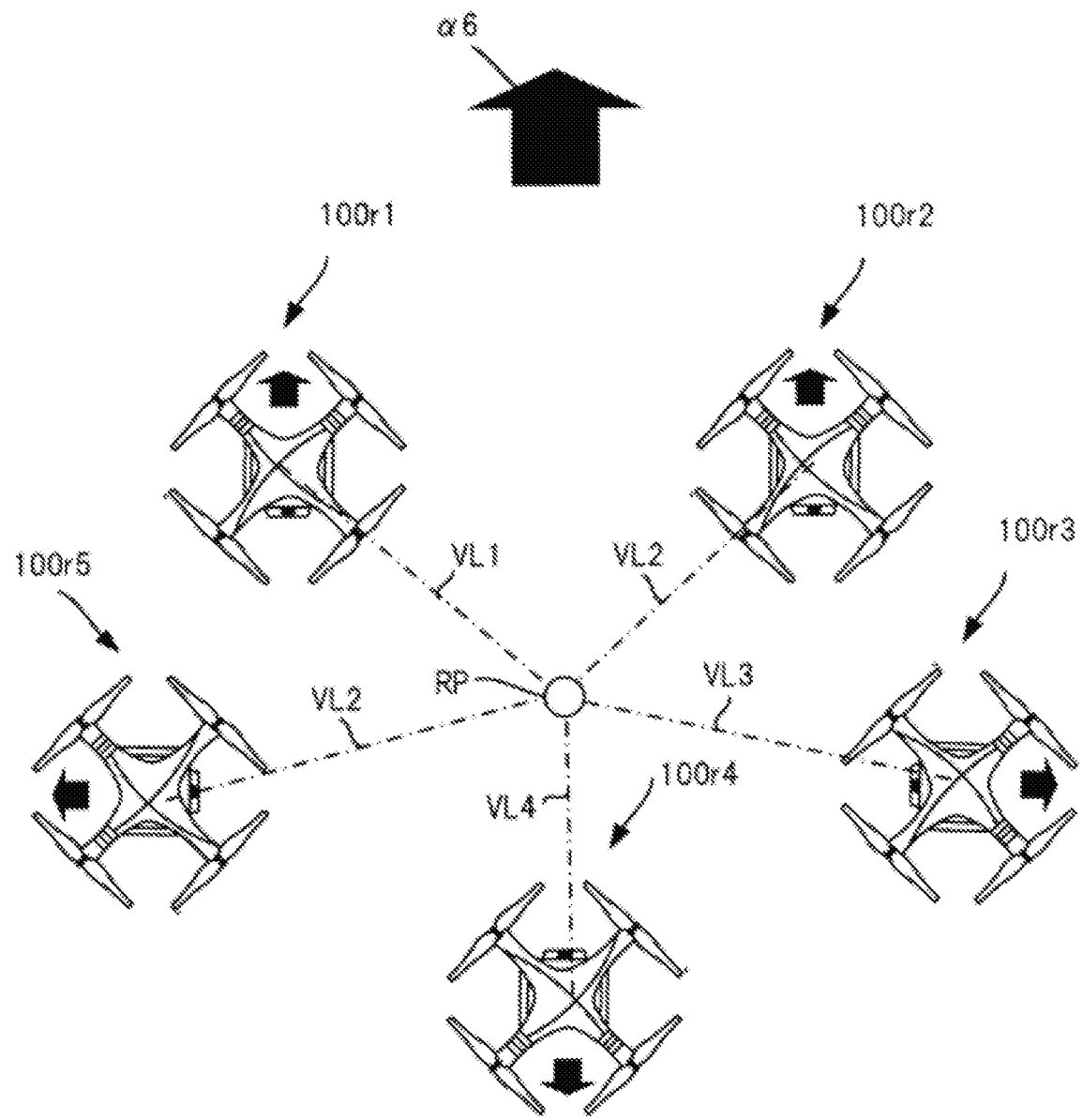
FIG. 31 is a schematic illustration of an arrangement of 5 UAVs that form a flight group when they are in flight, according to an example embodiment.

FIG. 31 schematically illustrates an arrangement of 5 UAVs 100r1, 100r2, 100r3, 100r4, 100r5 that forms a flight group during a flight.

In FIG. 31, using the reference location RP as a reference, 5 UAVs 100r1~100r5 may be arranged. Virtual straight lines VL1, VL2, VL3, VL4, VL5 may be used to connect the UAVs 100r1~100r5 and the reference location RP.

The imaging directions of two UAVs 100r1, 100r2 of the same flight group that are located at the front side (e.g., the moving direction α6 when the UAVs 100r1~100r5 move forward) may be the front direction (up direction). The imaging directions of 3 UAVs 100r3, 100r4, 100r5 of the same flight group that are located outside of the front side may have a difference of 90 degrees. Specifically, in FIG. 31, the imaging direction of UAV 100r3 may be the right direction, the imaging direction of the UAV 100r4 may be the back direction (down direction), the imaging direction of UAV 100r5 may be the left direction. In addition, each UAV 100r1~100r5 may set the FOV of the imaging device 220 or 230 to be greater than 90 degrees. Each imaging direction and each FOV may be set by the imaging controller 120 included in each UAV 100r1~100r5.

Each UAV 100r1~100r5 may transmit images captured by the imaging device 220 or 230 of each UAV 100r1~100r5 to the portable terminal 80A. The portable terminal 80A may receive the images captured by each UAV 100r1~100r5.

The imaging ranges of the imaging device 220 or 230 of UAVs 100r1, 100r2 may partially overlap. The portable terminal 80A may generate a stereo image based on images captured by the UAVs 100r1, 100r2.

In addition, the portable terminal 80A may obtain images captured at imaging directions separated by 90 degrees, and FOVs greater than 90 degrees. Under this condition, the panoramic image (e.g., an omni-directional panoramic image) may be generated based on images captured by at least one of UAVs 100r1, 100r2, and images captured by the UAVs 100r1~100r3.

As described above, in the flight system 10A, the UAV 100A may control, based on the number of UAVs forming the flight group, the field of view (e.g., greater than 90 degrees) and the imaging direction (e.g., having a difference of 90 degrees with each other). Thus, images suitable for generating a panoramic image or a stereo image may be obtained without the need to perform precise flight operations on the transmitter 50A. In particular, even when there is only one image having a degraded quality among the images captured by the multiple UAVs 100A, or when the location of the object to be imaged relative to the captured image has an offset, the quality of the panoramic image or the stereo image may be affected. The portable terminal 80A may obtain multiple images from the multiple UAVs 100A of the flight group in which the image quality degradation and the offset of the location of the object to be imaged relative to the captured image have been suppressed. Therefore, the portable terminal 80A may obtain an expected panoramic image or stereo image.

In addition, although detailed descriptions are omitted, when the transmitter 50A obtains yaw instruction information, each UAV 100r1~100r5 may use the circling around method of the first circling around mode or the second circling around mode to fix the relative location relationship, and to perform the circling around.

Figure 32A:
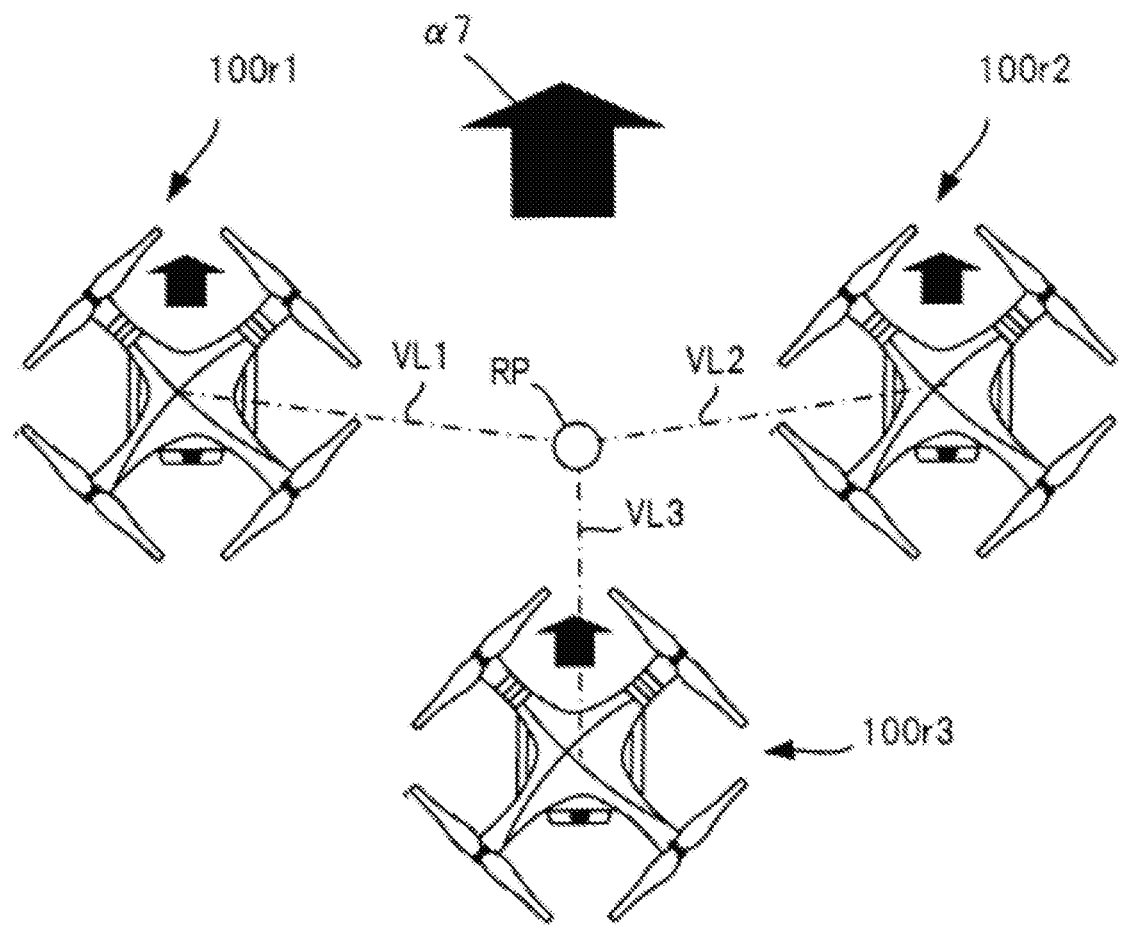
FIG. 32A is a schematic illustration of a second arrangement in a horizontal direction of 3 UAVs that form a flight group when they are in flight, according to an example embodiment.
Figure 32B:
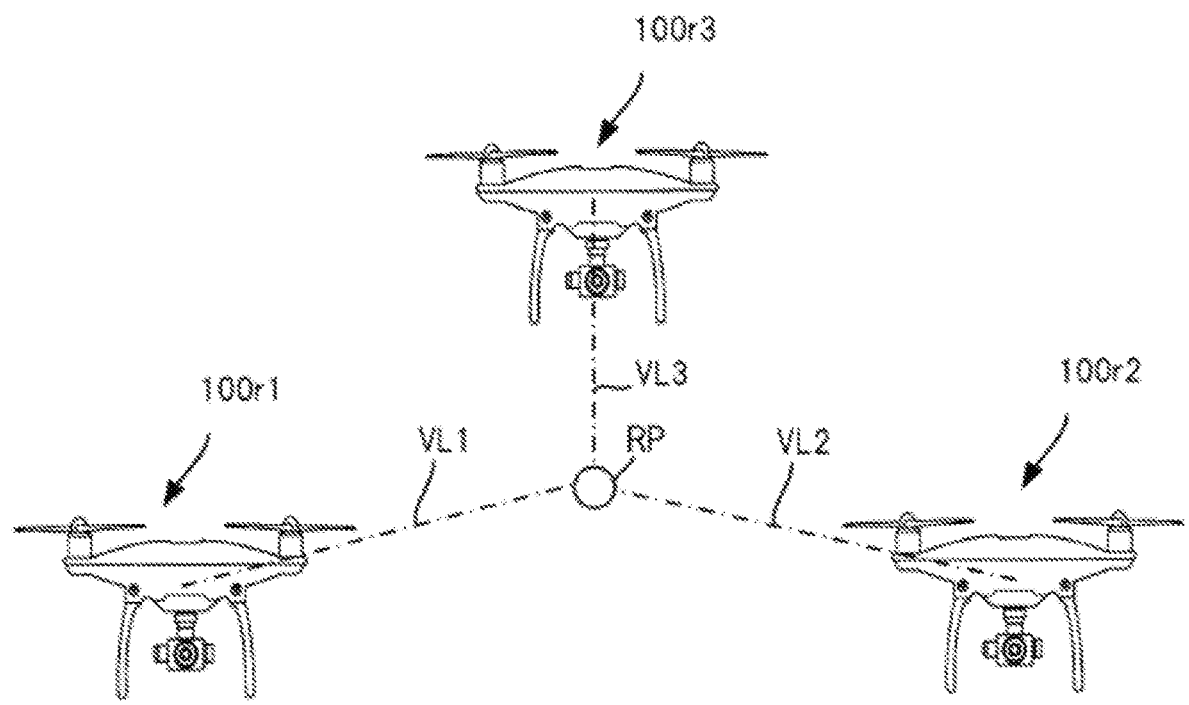
FIG. 32B is a schematic illustration of a second arrangement in a height direction of 3 UAVs that form a flight group when they are in flight, according to an example embodiment.

FIG. 32A schematically illustrates a second arrangement of the 3 UAVs 100r1, 100r2, 100r3 of the flight group during a flight in the horizontal direction. FIG. 32B schematically illustrates a second arrangement of the 3 UAVs 100r1, 100r2, 100r3 of the flight group during a flight in the height direction.

In FIG. 32A, FIG. 32B, 2 UAVs 100r1, 100r2 may fly at the front of the flight group (the moving direction is α7 when moving forward). 1 UAV 100r3 may fly at the back of the flight group. In addition, the 1 UAV 100r3 may fly at a height that is higher than the height of the 2 UAVs 100r1, 100r2. The imaging direction of each UAV 100r1~100r3 may be the moving direction when moving forward. The UAV 100r3 may fly at a height that is higher than the height of UAVs 100r1, 100r2. Therefore, it is easy to manage the flight of the UAVs 100r1, 100r2.

Each of the UAVs 100r1~100r3 may transmit images captured by the imaging device 220 or 230 of each of the UAVs 100r1~100r3 to the portable terminal 80A. The portable terminal 80A may receive the images captured by each of the UAVs 100r1~100r3.

In the imaging range of the imaging device 220 or 230 of the UAV 100r3, the UAVs 100r1, 100r2 that fly at the front of the flight group may be included. Under this condition, the images captured by the imaging device 220 or 230 of the UAV 100r3 may be mapped with the UAVs 100r1, 100r2. Under this condition, the operator of the transmitter 50A may confirm the images (images for operations) from the UAV 100r3 that are displayed at the portable terminal 80A, while instruct the flight control of the collaborative flight of the multiple UAVs 100r1~100r3.

The imaging ranges of the UAVs 100r1, 100r2 may partially overlap. Under this condition, the portable terminal 80A may generate a stereo image based on the images captured by the UAVs 100r1, 100r2.

In addition, the imaging device 230 of one of the 2 UAVs 100r1, 100r2 flying at the front may photograph the other one of the 2 UAVs 100r1, 100r2. Under this condition, the horizontal direction may be set as the imaging direction. The imaging device 230 may be fixedly configured at the UAV body 102, such that the UAVs may capture images of each other. Under this condition, even if it is not the front-back direction in the horizontal direction, but is the left-right direction, the UAV 100A may still obtain the relative location information (e.g., distance information) of the other UAVs 100A that are in the collaborative flight.

Based on the arrangements shown in FIG. 32A, FIG. 32B, when the flight system 10A performs operations using the transmitter 50A, the flight system 10A may provide images that have been mapped with at least a portion of the UAVs 100A in the flight group that are in a collaborative flight, to ensure it is easy for the operator to operate the transmitter 50A. Therefore, through the transmitter 50A, the operator may confirm, by observation, at least a portion of the UAVs 100A in the flight group, while operate the multiple UAVs 100A through simple operations, such that the multiple UAVs 100A arrives at a region expected to obtain a stereo image.

Next, the operations of the UAV 100A will be described.

Figure 33:
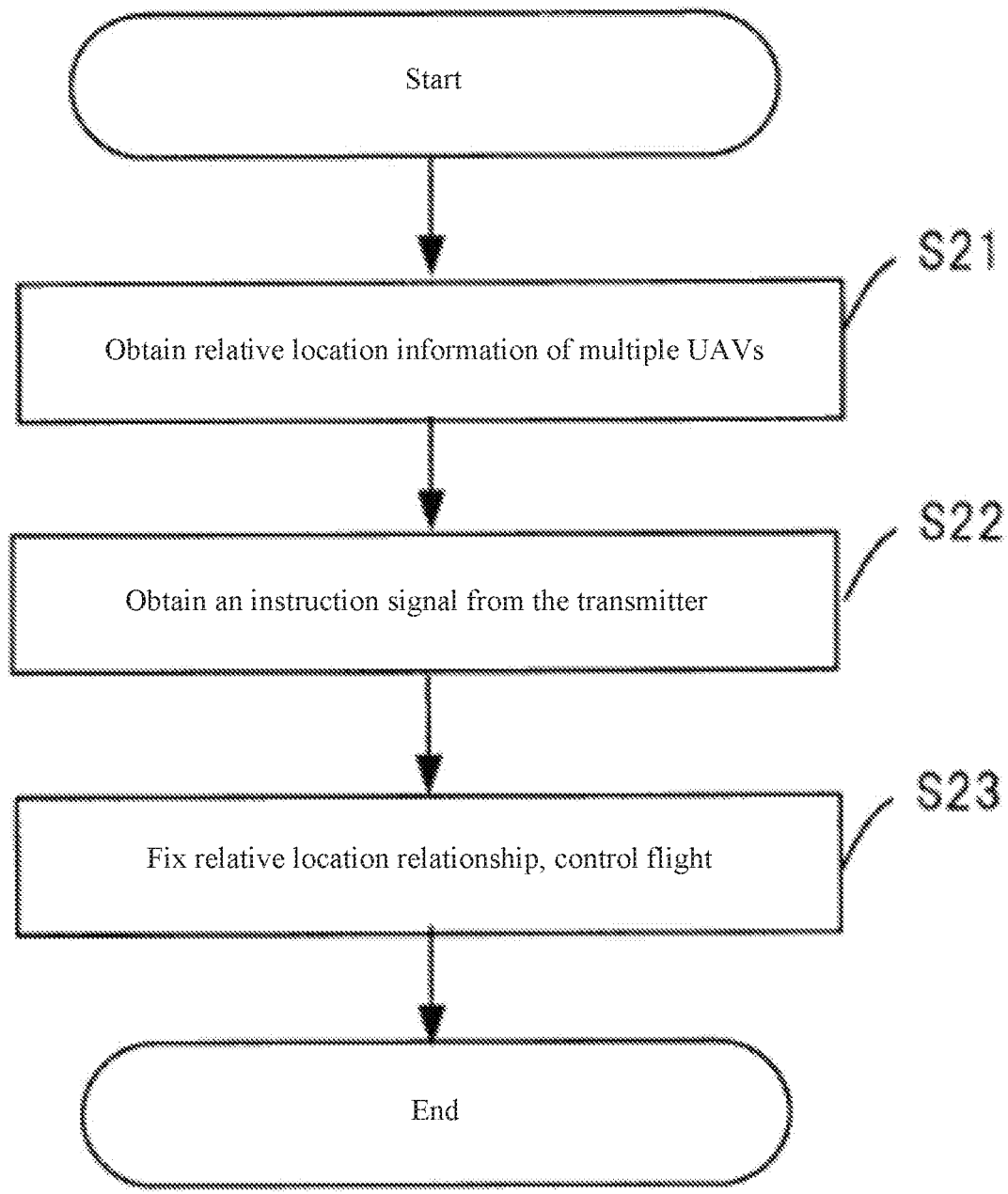
FIG. 33 is a flow chart illustrating operations of a UAV, according to an example embodiment.

FIG. 33 is a flow chart illustrating the operations of the UAV 100A. In addition, the multiple UAVs 100A in the same flight group may perform the same operations.

The flight controller 119 may obtain the collaborative control information CC stored in the storage device 160. The collaborative control information CC may include the relative location information of multiple UAVs 100A of the same flight group (S21). The signal acquisition member 111 may receive the instruction signal from the transmitter 50A (S22). Based on the instruction signal from the transmitter 50A, the flight controller 119 may fix the relative location relationship of the UAVs 100A included in the same flight group, thereby controlling the flight of the UAV 100A (this UAV 100A) (S23).

Through the UAV 100A, when receiving the flight control instructions through the transmitter 50A, the relative location information of multiple UAVs 100A of the flight group may be obtained. The flight operations of the UAVs 100A may be performed by a single transmitter 50A. Therefore, even if the flight path or flight location is not set a priori the UAV 100A may fix the relative location relationship between itself and the other UAVs 100A, and may fly in collaboration with the other UAVs 100A. Therefore, even when in a collaborative flight with other UAVs 100A, this UAV 100A may specify a flight path in real time using a single transmitter 50A. That is, the UAVs 100A may increase the flight flexibility in a collaborative flight.

Through the flight system 10A, when receiving flight control instructions through the transmitter 50A in the flight of each UAV 100A, the relative location information of multiple UAVs 100A of the flight group may be obtained. Each UAV 100A may be operated through a single transmitter 50A. Therefore, even for a flight path or flight location that is set a priori, the flight system 10A may fix the relative location relationship among the multiple UAVs 100A, such that the multiple UAVs 100A can fly in collaboration. Therefore, even when the multiple UAVs 100A in the flight system 10A fly in collaboration, the flight path may be specified in real time suing a single transmitter 50A. That is, the flight system 10A may increase the flight flexibility when multiple UAVs 100A fly in collaboration.

Embodiments are described above to illustrate the present disclosure. However, the technical scope of the present disclosure is not limited to the scope described above for various embodiments. A person having ordinary skills in the art can make modifications or improvements to the above embodiment. It is understood from the claims, such modifications or improvements all fall within the technical scope of the present disclosure.

The execution sequence of various processing, such as operations, steps, orders, and stages used in the device, system, program, and method described or illustrated in the claims, specification, and accompanying drawings, as long as there is no specific indication such as "before," "a priori," etc., and as along as the output of a previous processing is not used in the a subsequent processing, they may be realized in any suitable sequence. Regarding the operations processes in the claims, specification, and accompany drawings, for convenience, "first," "next," may have been used for description purposes, which do not necessarily indicate that the implementation should follow such an order.

DESCRIPTIONS OF REFERENCE NUMERALS 10, 10A Flight system
50, 50A Transmitter
53L Left control joystick
53R Right control joystick
61 Transmitter controller
63 Wireless communication device
65 Interface member
80, 80A Portable terminal
81, 81A Processor
82 Interface member
83 Operation member
85 Wireless communication device
87 Storage device
88 Display screen 100, 100A, 100r1, 100r2, 100r3, 100r4, 100r5 UAV
102 UAV body
103 Battery
110, 110A UAV controller
111 Signal acquisition member
112 First relative location acquisition member
113 First absolute location acquisition member
114 Second absolute location acquisition member
115 Second relative location acquisition member
116 Image acquisition member
117 FOV information acquisition member
118 Action mode setting member
119 Flight controller
120 Imaging controller
150 Communication interface
160 Storage device
200 Universal joint
210 Rotor mechanism
211, 211a, 211b, 211c, 211d Rotor
212 Driving electric motor
213 Current sensor
220, 230 Imaging device
230 Imaging device
240 GPS receiver
250 Inertial Measurement Unit
260 Magnetic compass
270 Barometer
280 Ultrasonic sensor
290 Laser measurement device
811 UAV specifying member
812 Location information acquisition member
813 Relative location processing member
814 Imaging information processing member
816 Image acquisition member
817 Image processing member
AN1, AN2 Antenna
B1 Power button
B2 RTH button
L1 Remote status display
L2 Battery remaining capacity display
OPS operation member assembly
G11, G12, G13, G14 UAV images

What is claimed is:

1. A location processing device, comprising:
a memory storing a program code; and
a processor configured to execute the program code to:
select multiple flight vehicles to form a flight group; and
determine first relative location information of the multiple flight vehicles of the flight group; and
instruct an operation device to control the multiple flight vehicles by controlling a flight of one flight vehicle of the flight group while maintaining relative location relationships of the multiple flight vehicles included in the first relative location information.

2. The location processing device of claim 1, wherein the processor is further configured to execute the program code to determine relative location information of each of the multiple flight vehicles relative to a reference location of the multiple flight vehicles of the flight group as the first relative location information.

3. The location processing device of claim 2, wherein the processor is further configured to execute the program code to establish and determine an association between identification information of each of the multiple flight vehicles and the relative location information of each of the flight vehicles recognized based on the identification information.

4. The location processing device of claim 1, wherein the first relative location information comprises relative location information of the multiple flight vehicles in a three-dimensional space.

5. The location processing device of claim 4, wherein the first relative location information comprises distance information of the multiple flight vehicles in a horizontal direction.

6. The location processing device of claim 4, wherein the first relative location information comprises distance information of the multiple flight vehicles in a gravity direction.

7. The location processing device of claim 6, further comprising:
a display configured to display multiple flight vehicle images of the multiple flight vehicles;
wherein the processor is further configured to execute the program code to:
receive an input; and
change the first relative location information by changing locations of the multiple flight vehicle images displayed at the display based on the input.

8. The location processing device of claim 7, wherein the display is configured to change the locations of the multiple flight vehicle images based on a drag operation, and to display distance information among the multiple flight vehicles.

9. The location processing device of claim 1, wherein the processor is further configured to execute the program code to:
receive an input; and
determine the first relative location information based on distance information of the multiple flight vehicles included in the input.

10. The location processing device of claim 6, wherein the processor is further configured to execute the program code to:
obtain location information of each of the multiple flight vehicles; and
determine the first relative location information based on second relative location information, the second relative location information comprises relative location information obtained based on a difference between the location information of the multiple flight vehicles.

11. A location processing method, comprising:
selecting multiple flight vehicles and forming a flight group including the selected multiple flight vehicles; and
determining first relative location information of the multiple flight vehicles of the flight group; and
instructing an operation device to control the multiple flight vehicles by controlling a flight of one flight vehicle of the flight group while maintaining relative location relationships of the multiple flight vehicles included in the first relative location information.

12. The location processing method of claim 11, wherein determining the first relative location information comprises:
determining relative location information of each of the multiple flight vehicles relative to a reference location of the multiple flight vehicles of the flight group as the first relative location information.

13. The location processing method of claim 12, wherein determining the first relative location information comprises:
establishing and determining an association between identification information of each of the multiple flight vehicles and the relative location information of each of the flight vehicles recognized based on the identification information.

14. The location processing method of claim 12, wherein the first relative location information comprises relative location information of the multiple flight vehicles in a three-dimensional space.

15. The location processing method of claim 14, wherein the first relative location information comprises distance information of the multiple flight vehicles in a horizontal direction.

16. The location processing method of claim 14, wherein the first relative location information comprises distance information of the multiple flight vehicles in a gravity direction.

17. The location processing method of claim 16, further comprising:
   displaying multiple flight vehicle images representing the multiple flight vehicles; and
   receiving an input;
   wherein determining the first relative location information comprises changing the first relative location information by changing locations of the displayed multiple flight vehicle images based on the input.

18. The location processing method of claim 17, wherein displaying the flight vehicle images comprises displaying distance information of the multiple flight vehicles based on the locations of the multiple flight vehicle images changed based on a drag operation.

19. The location processing device of claim 2, wherein the reference location includes at least one of a horizontal direction reference location or a height direction reference location, the horizontal direction reference location including at least one of a horizontal direction middle location, a center location, or a center of gravity location of the multiple flight vehicles of the flight group, and the height direction reference location including at least one of a height direction middle location, the center location, or the center of gravity location of the multiple flight vehicles of the flight group.

20. The location processing device of claim 1, wherein maintaining the relative location relationships of the multiple flight vehicles includes maintaining a distance between the one flight vehicle and each of the multiple flight vehicles of the flight group to be fixed.

* * * * *